US007995572B2

(12) United States Patent
Kusama et al.

(10) Patent No.: US 7,995,572 B2
(45) Date of Patent: Aug. 9, 2011

(54) COMMUNICATION PATH MONITORING SYSTEM AND COMMUNICATION NETWORK SYSTEM

(75) Inventors: Kazuhiro Kusama, Tokyo (JP); Shuji Maeda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 652 days.

(21) Appl. No.: 11/490,373

(22) Filed: Jul. 21, 2006

(65) Prior Publication Data

US 2006/0256711 A1    Nov. 16, 2006

Related U.S. Application Data

(63) Continuation-in-part of application No. 11/175,144, filed on Jul. 7, 2005, now abandoned.

(30) Foreign Application Priority Data

Nov. 1, 2004  (JP) .................................. 2004-317740
Oct. 27, 2005 (JP) .................................. 2005-312483

(51) Int. Cl.
 *H04L 12/28* (2006.01)
(52) U.S. Cl. ........ 370/389; 370/216; 370/248; 370/392; 370/401
(58) Field of Classification Search ........................ None
See application file for complete search history.

(56) References Cited

U.S. PATENT DOCUMENTS

| | | | | |
|---|---|---|---|---|
| 2001/0034853 A1* | 10/2001 | Takatama et al. | ................. | 714/4 |
| 2003/0147352 A1* | 8/2003 | Ishibashi et al. | ............. | 370/248 |
| 2003/0165114 A1 | 9/2003 | Kusama et al. | | |
| 2005/0180431 A1 | 8/2005 | Kinoshita et al. | | |
| 2005/0237927 A1* | 10/2005 | Kano et al. | ..................... | 370/216 |
| 2006/0092941 A1* | 5/2006 | Kusama | ........................ | 370/392 |
| 2006/0104210 A1* | 5/2006 | Nielsen | ........................ | 370/248 |

FOREIGN PATENT DOCUMENTS

| | | |
|---|---|---|
| JP | 2003-258903 | 9/2003 |
| WO | WO 2004/032434 | 4/2004 |

OTHER PUBLICATIONS

Xu, et al., "PSPF Server Based Network Topology Discovery", vol. 24, No. 9, Aug. 2004, pp. 98-100.

(Continued)

*Primary Examiner* — Duc C Ho
(74) *Attorney, Agent, or Firm* — Antonelli, Terry, Stout & Kraus, LLP.

(57) ABSTRACT

Information that is not dependent on how a GMPLS switch or an MPLS router is set up (information independent of the type of GMPLS switch or MPLS router) is used to obtain attribute values of communication paths and manage communication path configurations in a communication network. Provided is a communication path management system for managing a communication network system in which a communication path is established by transferring communication path establishment control information between data switching apparatuses, including: an information collecting module which collects the communication path establishment control information; an information accumulating module which accumulates the communication path establishment control information collected by the information collecting module; and an information searching module which searches the communication path establishment control information accumulated by the information accumulating module, wherein which communication path is established is derived from the communication path establishment control information searched by the information searching module.

18 Claims, 47 Drawing Sheets

OTHER PUBLICATIONS

Multiprotocol Label Switching (MPLS) Traffic Engineering Management Information Base, IETF Internet-Draft, draft-ietf-mpls-te-mib-14.text by Cheenu Srinivasan et al.

"An OSPF Topology Server: Design and Evaluation", IEEE J. Selected Areas in Communications, vol. 20, No. 4, May 2002 Shaikh et al.

Xu, et al., "OSPF Server Based Network Topology Discovery", vol. 24, No. 8, Aug. 2004, pp. 98-100.

Hideki Yaginuma, et al., "A study on Multi-layered Network Management Method for GMPLS Network", Technical Report of IEICE, TM2004-31, vol. 104, No. 165, pp. 19-24, Jul. 2, 2004.

* cited by examiner

CONTROL MESSAGE FORWARDING APPARATUS A41

GMPLS EXTENDED RSVP-TE MESSAGE

EXAMPLE OF GMPLS EXTENDED RSVP-TE MESSAGE

GMPLS EXTENDED OSPF-TE LINK STATE ADVERTISEMENT MESSAGE

EXAMPLE OF GMPLS EXTENDED OSPF-TE LINK STATE ADVERTISEMENT MESSAGE

| LINK END A | | LINK END B | |
|---|---|---|---|
| ROUTER'S IDENTIFIER A | I/F IDENTIFIER A | ROUTER'S IDENTIFIER B | I/F IDENTIFIER B |
| 192.168.100.1 | 1002 | 192.168.100.2 | 1001 |
| 192.168.100.2 | 1001 | 192.168.100.1 | 1002 |
| 192.168.100.2 | 1002 | 192.168.100.3 | 1001 |
| 192.168.100.3 | 1001 | 192.168.100.2 | 1002 |

INTERFACE CONNECTION RELATION MANAGEMENT TABLE

PATH ESTABLISHMENT CONTROL INFORMATION ACCUMULATING TABLE

| CAPTURE POINT INFORMATION | | IP HEADER INFORMATION | | RSVP INFORMATION | | | | | | | | LINK IDENTIFIER | | REFRESH TIMEOUT TIME |
|---|---|---|---|---|---|---|---|---|---|---|---|---|---|---|
| CAPTURE DATE/TIME | MONITORING AGENT IDENTIFIER | SENDER IP ADDRESS | DESTINATION IP ADDRESS | RSVP MESSAGE TYPE | SESSION IDENTIFIER | REFRESH PERIOD | LABEL | RSVP_HOP | SENDER_TEMPLATE | OTHER RSVP OBJECTS 1 | OTHER RSVP OBJECTS 2 | ... | OTHER RSVP OBJECTS n | UPSTREAM I/F IDENTIFIER | DOWNSTREAM I/F IDENTIFIER | |
| 2004/6/1 10:20:30 351 | 10.20.2.1 | 192.168.100.1 | 192.168.100.2 | PATH | dst=192.168.100.3, tunnelId=1 extId=192.168.100.1 | 30 | — | IPv4Addr= 192.168.100.1, IF_ID=1002 | tunnel_src= 192.168.100.1, lspId=1 | label_req= (SC=LSC) | — | — | — | | 1001 | 2004/6/1 10:23:07 851 |
| 2004/6/1 10:20:30 450 | 10.20.3.1 | 192.168.100.2 | 192.168.100.3 | PATH | dst=192.168.100.3, tunnelId=1 extId=192.168.100.1 | 30 | — | IPv4Addr= 192.168.100.1, IF_ID=1002 | tunnel_src= 192.168.100.1, lspId=1 | label_req= (SC=LSC) | — | — | — | 1002 | 1001 | 2004/6/1 10:23:07 950 |
| 2004/6/1 10:20:30 650 | 10.20.3.1 | 192.168.100.3 | 192.168.100.2 | RESV | dst=192.168.100.3, tunnelId=1 extId=192.168.100.1 | 30 | 30001 | IPv4Addr= 192.168.100.3, IF_ID=1001 | tunnel_src= 192.168.100.1, lspId=1 | | — | — | — | 1002 | 1001 | 2004/6/1 10:23:08 150 |
| 2004/6/1 10:20:30 721 | 10.20.2.1 | 192.168.100.2 | 192.168.100.1 | RESV | dst=192.168.100.3, tunnelId=1 extId=192.168.100.1 | 30 | 30012 | IPv4Addr= 192.168.100.2, IF_ID=1001 | tunnel_src= 192.168.100.1, lspId=1 | | — | — | — | 1002 | 1001 | 2004/6/1 10:23:08 321 |

LINK STATE INFORMATION ACCUMULATING TABLE

| CAPTURE POINT INFORMATION | | | IP HEADER INFORMATION | | OSPF LINK STATE INFORMATION | | | | |
|---|---|---|---|---|---|---|---|---|---|
| CAPTURED DATE/TIME | CAPTURED MONITORING AGENT IDENTIFIER | SENDER IP ADDRESS | DESTINATION IP ADDRESS | ADVERTISING ROUTER'S IDENTIFIER | LINK IDENTIFIER | LINK ATTRIBUTE 1 | LINK ATTRIBUTE 2 | ... | LINK ATTRIBUTE n |
| 2004/6/1 10:19:30 400 | 10.20.2.1 | 192.168.100.1 | 224.0.0.5 | 192.168.100.1 | 192.168.100.2 | link_local_id =1002 | link_remote_id =1001 | | metric=1 |
| 2004/6/1 10:19:30 910 | 10.20.2.2 | 192.168.100.2 | 224.0.0.5 | 192.168.100.1 | 192.168.100.2 | link_local_id =1002 | link_remote_id =1001 | | metric=1 |
| 2004/6/1 10:19:31 410 | 10.20.2.2 | 192.168.100.2 | 224.0.0.5 | 192.168.100.2 | 192.168.100.3 | link_local_id =1002 | link_remote_id =1001 | | metric=1 |
| 2004/6/1 10:19:31 420 | 10.20.2.1 | 192.168.100.1 | 224.0.0.5 | 192.168.100.2 | 192.168.100.3 | link_local_id =1002 | link_remote_id =1002 | | metric=1 |
| 2004/6/1 10:19:30 442 | 10.20.2.1 | 192.168.100.1 | 224.0.0.5 | 192.168.100.2 | 192.168.100.1 | link_local_id =1001 | link_remote_id =1002 | | metric=1 |
| 2004/6/1 10:19:30 450 | 10.20.2.2 | 192.168.100.2 | 224.0.0.5 | 192.168.100.3 | 192.168.100.1 | link_local_id =1001 | link_remote_id =1002 | | metric=1 |
| 2004/6/1 10:19:30 920 | 10.20.2.1 | 192.168.100.1 | 224.0.0.5 | 192.168.100.3 | 192.168.100.2 | link_local_id =1001 | link_remote_id =1002 | | metric=1 |

FIG. 10

| CAPTRURED POINT INFORMATION | | INTERFACE IDENTIFIER | INTERFACE ATTRIBUTE | |
| --- | --- | --- | --- | --- |
| CAPTURED DATE/TIME | ROUTER'S IDENTIFIER | | IP ADDRESS | OPERATIONAL STATE |
| 2004/6/1 10:19:25 | 192.168.100.1 | 1001 | — | NORMAL |
| 2004/6/1 10:19:26 | 192.168.100.1 | 1002 | — | NORMAL |
| 2004/6/1 10:19:27 | 192.168.100.2 | 1001 | — | NORMAL |
| 2004/6/1 10:19:28 | 192.168.100.2 | 1002 | — | NORMAL |
| 2004/6/1 10:19:29 | 192.168.100.2 | 1001 | — | NORMAL |
| 2004/6/1 10:19:30 | 192.168.100.2 | 1002 | — | NORMAL |
| | | | | |

I/F STATE INFORMATION ACCUMULATING TABLE

*FIG.11*

| STATE CHANGE DATE/TIME | ROUTER'S IDENTIFIER | DATA INCOMING INTERFACE INFORMATION | | DATA OUTGOING INTERFACE INFORMATION | | OPERATIONAL STATE | SESSION IDENTIFIER | SENDER_ TEMPLATE |
|---|---|---|---|---|---|---|---|---|
| | | INCOMING INTERFACE IDENTIFIER | INCOMING LABEL | OUTGOING INTERFACE IDENTIFIER | OUTGOING LABEL | | | |
| 2004/6/1 10:20:30 721 | 192.168.100.1 | — | — | 1002 | 30012 | busy | dst=192.168.100.3, tunnelId=1 extId=192.168.100.1 | tunnel_src= 192.168.100.1, lspId=1 |
| 2004/6/1 10:20:30 721 | 192.168.100.2 | 1001 | 30012 | 1002 | 30001 | busy | dst=192.168.100.3, tunnelId=1 extId=192.168.100.1 | tunnel_src= 192.168.100.1, lspId=1 |
| 2004/6/1 10:20:30 650 | 192.168.100.3 | 1001 | 30001 | — | — | busy | dst=192.168.100.3, tunnelId=1 extId=192.168.100.1 | tunnel_src= 192.168.100.1, lspId=1 |

CROSS CONNECTION INFORMATION ACCUMULATING TABLE

FIG.12

| STATE CHANGE DATE/TIME | ROUTER'S IDENTIFIER | DATA INCOMING INTERFACE INFORMATION | | DATA OUTGOING INTERFACE INFORMATION | | OPERATIONAL STATE | SESSION IDENTIFIER | SENDER_TEMPLATE |
|---|---|---|---|---|---|---|---|---|
| | | INCOMING INTERFACE IDENTIFIER | INCOMING LABEL VALUE | OUTGOING INTERFACE IDENTIFIER | OUTGOING LABEL VALUE | | | |
| 2004/6/1 10:20:30 351 | 192.168.100.1 | — | — | 1002 | — | idle | dst=192.168.100.3, tunnelId=1 extId=192.168.100.1 | tunnel_src= 192.168.100.1, lspId=1 |
| 2004/6/1 10:20:30 351 | 192.168.100.2 | 1001 | — | — | — | idle | dst=192.168.100.3, tunnelId=1 extId=192.168.100.1 | tunnel_src= 192.168.100.1, lspId=1 |

CROSS CONNECTION INFORMATION ACCUMULATING TABLE (AFTER RECEPTION OF 521)

*FIG.22A*

| STATE CHANGE DATE/TIME | ROUTER'S IDENTIFIER | DATA INCOMING INTERFACE INFORMATION | | DATA OUTGOING INTERFACE INFORMATION | | OPERATIONAL STATE | SESSION IDENTIFIER | SENDER_TEMPLATE |
|---|---|---|---|---|---|---|---|---|
| | | INCOMING INTERFACE IDENTIFIER | INCOMING LABEL VALUE | OUTGOING INTERFACE IDENTIFIER | OUTGOING LABEL VALUE | | | |
| 2004/6/1 10:20:30 351 | 192.168.100.1 | — | — | 1002 | — | idle | dst=192.168.100.3, tunnelId=1 extId=192.168.100.1 | tunnel_src= 192.168.100.1, lspId=1 |
| 2004/6/1 10:20:30 450 | 192.168.100.2 | 1001 | — | 1002 | — | idle | dst=192.168.100.3, tunnelId=1 extId=192.168.100.1 | tunnel_src= 192.168.100.1, lspId=1 |
| 2004/6/1 10:20:30 450 | 192.168.100.3 | 1001 | — | — | — | idle | dst=192.168.100.3, tunnelId=1 extId=192.168.100.1 | tunnel_src= 192.168.100.1, lspId=1 |
| | | | | | | | | |

CROSS CONNECTION INFORMATION ACCUMULATING TABLE (AFTER RECEPTION OF 522)

*FIG.22B*

| STATE CHANGE DATE/TIME | ROUTER'S IDENTIFIER | DATA INCOMING INTERFACE INFORMATION | | DATA OUTGOING INTERFACE INFORMATION | | OPERATIONAL STATE | SESSION IDENTIFIER | SENDER_ TEMPLATE |
|---|---|---|---|---|---|---|---|---|
| | | INCOMING INTERFACE IDENTIFIER | INCOMING LABEL VALUE | OUTGOING INTERFACE IDENTIFIER | OUTGOING LABEL VALUE | | | |
| 2004/6/1 10:20:30 351 | 192.168.100.1 | — | — | 1002 | — | idle | dst=192.168.100.3, tunnelId=1 extId=192.168.100.1 | tunnel_src= 192.168.100.1, lspId=1 |
| 2004/6/1 10:20:30 650 | 192.168.100.2 | 1001 | — | 1002 | 30001 | idle | dst=192.168.100.3, tunnelId=1 extId=192.168.100.1 | tunnel_src= 192.168.100.1, lspId=1 |
| 2004/6/1 10:20:30 650 | 192.168.100.3 | 1001 | 30001 | — | — | busy | dst=192.168.100.3, tunnelId=1 extId=192.168.100.1 | tunnel_src= 192.168.100.1, lspId=1 |

CROSS CONNECTION INFORMATION ACCUMULATING TABLE (AFTER RECEPTION OF 523)

FIG.22C

| 110 | 1101 | 1102 | 1103 | | 1104 | | 1105 | 1106 | 1107 |
|---|---|---|---|---|---|---|---|---|---|
| | STATE CHANGE DATE/TIME | ROUTER IDENTIFIER | DATA INCOMING INTERFACE INFORMATION | | DATA OUTGOING INTERFACE INFORMATION | | OPERATION STATE | SESSION IDENTIFIER | SENDER_ TEMPLATE |
| | | | INCOMING INTERFACE IDENTIFIER 11031 | INCOMING LABEL VALUE 11032 | OUTGOING INTERFACE IDENTIFIER 11041 | OUTGOING LABEL VALUE 11042 | | | |
| | 2004/6/1 10:20:30 721 | 192.168.100.1 | — | — | 1002 | 30012 | busy | dst=192.168.100.3, tunnelId=1 extId=192.168.100.1 | tunnel_src= 192.168.100.1, lspId=1 |
| | 2004/6/1 10:20:30 721 | 192.168.100.2 | 1001 | 30012 | 1002 | unknown | busy | dst=192.168.100.3, tunnelId=1 extId=192.168.100.1 | tunnel_src= 192.168.100.1, lspId=1 |
| | 2004/6/1 10:20:30 650 | 192.168.100.3 | 1001 | unknown | — | — | busy | dst=192.168.100.3, tunnelId=1 extId=192.168.100.1 | tunnel_src= 192.168.100.1, lspId=1 |

CROSS CONNECTION INFORMATION ACCUMULATING TABLE (OF WHEN 523 IS MISSING)

*FIG.22D*

| ROUTER IDENTIFIER | DEVICE TYPE | DISPLAYED DEVICE NAME | INSTALLATION LOCATION |
|---|---|---|---|
| 192.168.100.1 | LSC_SW | OSAKA1 | OSAKA |
| 192.168.100.2 | LSC_SW | NAGOYA1 | NAGOYA |
| 192.168.100.3 | LSC_SW | TOKYO1 | TOKYO |
| 192.168.100.4 | LSC_SW | KANAZAWA1 | KANAZAWA |
| 192.168.100.5 | PSC_SW | OSAKA_PSC1 | OSAKA |
| 192.168.100.6 | PSC_SW | TOKYO_PSC1 | TOKYO |
|  |  |  |  |

DEVICE MANAGEMENT TABLE

PATH MANAGEMENT TABLE

| TYPE OF PATH | SESSION IDENTIFIER | LSP_ID | ESTABLISHMENT STATUS | PASSING POINT LIST |
|---|---|---|---|---|
| LSC | dst=192.168.100.3, tunnelId=1, extId=192.168.100.1 | 1 | established | ((nodeId=192.168.100.1, IF_ID=1002, label=30012), (nodeId=192.168.100.2, IF_ID=1001, label=30012), (nodeId=192.168.100.2, IF_ID=1002, label=30001), (nodeId=192.168.100.3, IF_ID=1002, label=30001)) |
| | | | | |

*FIG.24A*

PATH MANAGEMENT TABLE

| TYPE OF PATH | SESSION IDENTIFIER | LSP_ID | ESTABLISHMENT STATUS | PASSING POINT LIST |
|---|---|---|---|---|
| LSC | dst=192.168.100.3, tunnelId=1, extId=192.168.100.1 | 1 | establishing | — |

PATH ESTABLISHMENT CONTROL INFORMATION ACCUMULATING TABLE

| CAPTURE POINT INFORMATION | | IP HEADER INFORMATION | | RSVP INFORMATION | | | | | | | | LINK IDENTIFIER | | REFRESH TIMEOUT TIME |
|---|---|---|---|---|---|---|---|---|---|---|---|---|---|---|
| CAPTURE DATE/TIME | MONITORING AGENT IDENTIFIER | SENDER IP ADDRESS | DESTINATION IP ADDRESS | RSVP MESSAGE TYPE | SESSION IDENTIFIER | REFRESH PERIOD | LABEL | RSVP_HOP | SENDER_TEMPLATE | OTHER RSVP OBJECTS 1 | OTHER RSVP OBJECTS 2 | ... | OTHER RSVP OBJECTS n | UPSTREAM I/F IDENTIFIER | DOWNSTREAM I/F IDENTIFIER | |
| 2004/6/1 10:20:30 351 | 10.20.2.1 | 192.168.100.1 | 192.168.100.2 | PATH | dst=192.168.100.3 tunnelId=1 extId=192.168.100.1 | 30 | — | IPv4Addr= 192.168.100.1, IF_ID=1002 | tunnel_src= 192.168.100.1, lspId=1 | label_req= (SC=LSC) | protection =(P=0, S=0)) | — | — | 1002 | 1001 | 2004/6/1 10:23:07 851 |
| 2004/6/1 10:20:30 450 | 10.20.3.1 | 192.168.100.2 | 192.168.100.3 | PATH | dst=192.168.100.3 tunnelId=1 extId=192.168.100.1 | 30 | — | IPv4Addr= 192.168.100.2, IF_ID=1002 | tunnel_src= 192.168.100.1, lspId=1 | label_req= (SC=LSC) | protection =(P=0, S=0)) | — | — | 1002 | 1001 | 2004/6/1 10:23:07 950 |
| 2004/6/1 10:20:30 650 | 10.20.3.1 | 192.168.100.3 | 192.168.100.2 | RESV | dst=192.168.100.3 tunnelId=1 extId=192.168.100.1 | 30 | 30001 | IPv4Addr= 192.168.100.3, IF_ID=1001 | tunnel_src= 192.168.100.1, lspId=1 | — | — | — | — | 1002 | 1001 | 2004/6/1 10:23:08 150 |
| 2004/6/1 10:20:30 721 | 10.20.2.1 | 192.168.100.2 | 192.168.100.1 | RESV | dst=192.168.100.3 tunnelId=1 extId=192.168.100.1 | 30 | 30012 | IPv4Addr= 192.168.100.2, IF_ID=1001 | tunnel_src= 192.168.100.1, lspId=1 | — | — | — | — | 1002 | 1001 | 2004/6/1 10:23:08 321 |
| 2004/6/1 10:20:30 830 | 10.20.2.1 | 192.168.100.1 | 192.168.100.2 | PATH | dst=192.168.100.3 tunnelId=1 extId=192.168.100.1 | 30 | — | IPv4Addr= 192.168.100.1, IF_ID=1002 | tunnel_src= 192.168.100.1, lspId=2 | label_req= (SC=LSC) | protection =(P=1, S=1)) | — | — | 1003 | 1001 | 2004/6/1 10:23:08 330 |
| 2004/6/1 10:20:30 950 | 10.20.3.1 | 192.168.100.1 | 192.168.100.4 | PATH | dst=192.168.100.3 tunnelId=1 extId=192.168.100.1 | 30 | — | IPv4Addr= 192.168.100.2, IF_ID=1002 | tunnel_src= 192.168.100.1, lspId=2 | label_req= (SC=LSC) | protection =(P=1, S=1)) | — | — | 1003 | 1001 | 2004/6/1 10:23:08 450 |
| 2004/6/1 10:20:31 150 | 10.20.3.1 | 192.168.100.3 | 192.168.100.4 | RESV | dst=192.168.100.3 tunnelId=1 extId=192.168.100.1 | 30 | 30001 | IPv4Addr= 192.168.100.3, IF_ID=1001 | tunnel_src= 192.168.100.1, lspId=2 | — | — | — | — | 1002 | 1003 | 2004/6/1 10:23:08 650 |
| 2004/6/1 10:20:31 321 | 10.20.2.1 | 192.168.100.4 | 192.168.100.1 | RESV | dst=192.168.100.3 tunnelId=1 extId=192.168.100.1 | 30 | 30012 | IPv4Addr= 192.168.100.2, IF_ID=1001 | tunnel_src= 192.168.100.1, lspId=2 | — | — | — | — | 1003 | 1001 | 2004/6/1 10:23:08 821 |

| TYPE OF PATH | SESSION IDENTIFIER | LSP_ID | ESTABLISHMENT STATUS | PASSING POINT LIST | PROTECTION STATE |
|---|---|---|---|---|---|
| LSC | dst=192.168.100.3, tunnelId=1, extId=192.168.100.1 | 1 | established | ((nodeId=192.168.100.1, IF_ID=1002, label=30012), (nodeId=192.168.100.2, IF_ID=1001, label=30012), (nodeId=192.168.100.2, IF_ID=1002, label=30001), (nodeId=192.168.100.3, IF_ID=1002, label=30001)) | P=0, S=0 |
| LSC | dst=192.168.100.3, tunnelId=1, extId=192.168.100.1 | 2 | established | ((nodeId=192.168.100.1, IF_ID=1003, label=30020), (nodeId=192.168.100.4, IF_ID=1001, label=30020), (nodeId=192.168.100.4, IF_ID=1002, label=30002), (nodeId=192.168.100.3, IF_ID=1002, label=30002)) | P=1, S=1 |

PATH MANAGEMENT TABLE

*FIG. 29*

| STATE CHANGE DATE/ TIME | ROUTER IDENTIFIER | DATA INCOMING INTERFACE INFORMATION | | DATA OUTGOING INTERFACE INFORMATION | | OPERATION STATE | SESSION IDENTIFIER | SENDER_ TEMPLATE | PROTECTION STATE |
|---|---|---|---|---|---|---|---|---|---|
| | | INCOMING INTERFACE IDENTIFIER | INCOMING LABEL VALUE | OUTGOING INTERFACE IDENTIFIER | OUTGOING LABEL VALUE | | | | |
| 2004/6/1 10:20:30 721 | 192.168.100.1 | — | — | 1002 | 30012 | busy | dst=192.168.100.3, tunnelId=1 extId=192.168.100.1 | tunnel_src= 192.168.100.1, lspId=1 | P=0, S=0 |
| 2004/6/1 10:20:30 721 | 192.168.100.2 | 1001 | 30012 | 1002 | 30001 | busy | dst=192.168.100.3, tunnelId=1 extId=192.168.100.1 | tunnel_src= 192.168.100.1, lspId=1 | P=0, S=0 |
| 2004/6/1 10:20:30 650 | 192.168.100.3 | 1001 | 30001 | — | — | busy | dst=192.168.100.3, tunnelId=1 extId=192.168.100.1 | tunnel_src= 192.168.100.1, lspId=1 | P=0, S=0 |
| 2004/6/1 10:20:31 321 | 192.168.100.1 | — | — | 1003 | 30020 | busy | dst=192.168.100.3, tunnelId=1 extId=192.168.100.1 | tunnel_src= 192.168.100.1, lspId=2 | P=1, S=1 |
| 2004/6/1 10:20:31 321 | 192.168.100.4 | 1001 | 30020 | 1002 | 30002 | busy | dst=192.168.100.3, tunnelId=1 extId=192.168.100.1 | tunnel_src= 192.168.100.1, lspId=2 | P=1, S=1 |
| 2004/6/1 10:20:31 150 | 192.168.100.3 | 1001 | 30002 | — | — | busy | dst=192.168.100.3, tunnelId=1 extId=192.168.100.1 | tunnel_src= 192.168.100.1, lspId=2 | P=1, S=1 |

CROSS CONNECTION INFORMATION ACCUMULATING TABLE

*FIG. 30*

| CAPTURE POINT INFORMATION | | IP HEADER INFORMATION | | RSVP INFORMATION | | | | | | | | LINK IDENTIFIER | | |
|---|---|---|---|---|---|---|---|---|---|---|---|---|---|---|
| CAPTURE DATE/TIME | MONITORING AGENT IDENTIFIER | SENDER IP ADDRESS | DESTINATION IP ADDRESS | RSVP MESSAGE TYPE | SESSION IDENTIFIER | REFRESH PERIOD | LABEL | RSVP_HOP | SENDER_TEMPLATE | OTHER RSVP OBJECTS 1 | OTHER RSVP OBJECTS 2 | ... | OTHER RSVP OBJECTS n | UPSTREAM I/F IDENTIFIER | DOWNSTREAM I/F IDENTIFIER | REFRESH TIMEOUT TIME |
| 2004/6/1 10:20:30 351 | 10.20.2.1 | 192.168.100.1 | 192.168.100.2 | PATH | dst=192.168.100.3, tunnelId=1 extId=192.168.100.1 | 30 | — | IPv4Addr= 192.168.100.1, IF_ID=1002 | tunnel_src= 192.168.100.1, lspId=1 | label_req= (SC=LSC) | lsp_tunnel_ ifid=2002 | — | — | 1002 | 1001 | 2004/6/1 10:23:07 851 |
| 2004/6/1 10:20:30 450 | 10.20.2.1 | 192.168.100.2 | 192.168.100.3 | PATH | dst=192.168.100.3, tunnelId=1 extId=192.168.100.1 | 30 | — | IPv4Addr= 192.168.100.2, IF_ID=1002 | tunnel_src= 192.168.100.1, lspId=1 | label_req= (SC=LSC) | lsp_tunnel_ ifid=2002 | — | — | 1002 | 1001 | 2004/6/1 10:23:07 950 |
| 2004/6/1 10:20:30 650 | 10.20.3.1 | 192.168.100.3 | 192.168.100.2 | RESV | dst=192.168.100.3, tunnelId=1 extId=192.168.100.1 | 30 | 30001 | IPv4Addr= 192.168.100.3, IF_ID=1001 | tunnel_src= 192.168.100.1, lspId=1 | — | — | — | — | 1002 | 1001 | 2004/6/1 10:23:08 150 |
| 2004/6/1 10:20:30 721 | 10.20.3.1 | 192.168.100.2 | 192.168.100.1 | RESV | dst=192.168.100.3, tunnelId=1 extId=192.168.100.1 | 30 | 30012 | IPv4Addr= 192.168.100.2, IF_ID=1001 | tunnel_src= 192.168.100.1, lspId=1 | — | lsp_tunnel_ ifid=2002 | — | — | 1002 | 1001 | 2004/6/1 10:23:08 321 |
| 2004/6/1 10:20:30 830 | 10.20.3.1 | 192.168.100.5 | 192.168.100.1 | PATH | dst=192.168.100.6, tunnelId=1 extId=192.168.100.5 | 30 | — | IPv4Addr= 192.168.100.5, IF_ID=1002 | tunnel_src= 192.168.100.5, lspId=2 | label_req= (PSC=PSC) | — | — | — | 1002 | 1001 | 2004/6/1 10:23:08 330 |
| 2004/6/1 10:20:30 950 | 10.20.2.1 | 192.168.100.1 | 192.168.100.3 | PATH | dst=192.168.100.6, tunnelId=1 extId=192.168.100.5 | 30 | — | IPv4Addr= 192.168.100.1, IF_ID=1002 | tunnel_src= 192.168.100.5, lspId=2 | label_req= (SC=PSC) | — | — | — | 2002 | 2001 | 2004/6/1 10:23:08 450 |
| 2004/6/1 10:20:31 150 | 10.20.2.1 | 192.168.100.3 | 192.168.100.6 | PATH | dst=192.168.100.6, tunnelId=1 extId=192.168.100.5 | 30 | — | IPv4Addr= 192.168.100.3, IF_ID=1001 | tunnel_src= 192.168.100.5, lspId=2 | label_req= (SC=PSC) | — | — | — | 2002 | 2001 | 2004/6/1 10:23:08 660 |
| 2004/6/1 10:20:31 321 | 10.20.3.1 | 192.168.100.6 | 192.168.100.3 | RESV | dst=192.168.100.6, tunnelId=1 extId=192.168.100.5 | 30 | 100002 | IPv4Addr= 192.168.100.6, IF_ID=1001 | tunnel_src= 192.168.100.5, lspId=2 | — | — | — | — | 2002 | 2001 | 2004/6/1 10:23:08 821 |
| 2004/6/1 10:20:31 450 | 10.20.2.1 | 192.168.100.3 | 192.168.100.1 | RESV | dst=192.168.100.6, tunnelId=1 extId=192.168.100.5 | 30 | 100001 | IPv4Addr= 192.168.100.3, IF_ID=1001 | tunnel_src= 192.168.100.5, lspId=2 | — | — | — | — | 2002 | 2001 | 2004/6/1 10:23:08 950 |
| 2004/6/1 10:20:31 605 | 10.20.2.1 | 192.168.100.1 | 192.168.100.5 | RESV | dst=192.168.100.6, tunnelId=1 extId=192.168.100.5 | 30 | 100003 | IPv4Addr= 192.168.100.1, IF_ID=1001 | tunnel_src= 192.168.100.5, lspId=2 | — | — | — | — | 2002 | 2001 | 2004/6/1 10:23:08 105 |

PATH ESTABLISHMENT CONTROL INFORMATION ACCUMULATING TABLE

FIG. 33

| TYPE OF PATH | SESSION IDENTIFIER | LSP_ID | ESTABLISHMENT STATUS | PASSING POINT LIST |
|---|---|---|---|---|
| LSC | dst=192.168.100.3, tunnelId=1, extId=192.168.100.1 | 1 | established | ((nodeId=192.168.100.1, IF_ID=1002, label=30012), (nodeId=192.168.100.2, IF_ID=1001, label=30012), (nodeId=192.168.100.2, IF_ID=1002, label=30001), (nodeId=192.168.100.3, IF_ID=1002, label=30001)) |
| PSC | dst=192.168.100.6, tunnelId=1, extId=192.168.100.5 | 1 | established | ((nodeId=192.168.100.5, IF_ID=2002, label=100003), (nodeId=192.168.100.1, IF_ID=2001, label=100003), (nodeId=192.168.100.1, IF_ID=2002, label=100001), (LSC_LSP, dst=192.168.100.3,tunnelId=1,extId=192.168.100.1), (nodeId=192.168.100.3, IF_ID=2001, label=100001), (nodeId=192.168.100.3, IF_ID=2002, label=100002), (nodeId=192.168.100.6, IF_ID=2001, label=100002)) |
|  |  |  |  |  |

PATH MANAGEMENT TABLE

*FIG. 34*

| STATE CHANGE DATE/TIME | ROUTER IDENTIFIER | DATA INCOMING INTERFACE INFORMATION | | DATA OUTGOING INTERFACE INFORMATION | | OPERATION STATE | SESSION IDENTIFIER | SENDER_TEMPLATE |
|---|---|---|---|---|---|---|---|---|
| | | INCOMING INTERFACE IDENTIFIER | INCOMING LABEL VALUE | OUTGOING INTERFACE IDENTIFIER | OUTGOING LABEL VALUE | | | |
| 2004/6/1 10:20:30 721 | 192.168.100.1 | — | — | 1002 | 30012 | busy | dst=192.168.100.3, tunnelId=1 extId=192.168.100.1 | tunnel_src= 192.168.100.1, lspId=1 |
| 2004/6/1 10:20:30 721 | 192.168.100.2 | 1001 | 30012 | 1002 | 30001 | busy | dst=192.168.100.3, tunnelId=1 extId=192.168.100.1 | tunnel_src= 192.168.100.1, lspId=1 |
| 2004/6/1 10:20:30 650 | 192.168.100.3 | 1001 | 30001 | — | — | busy | dst=192.168.100.3, tunnelId=1 extId=192.168.100.1 | tunnel_src= 192.168.100.1, lspId=1 |
| 2004/6/1 10:20:31 605 | 192.168.100.5 | — | — | 2002 | 100003 | busy | dst=192.168.100.6, tunnelId=1 extId=192.168.100.5 | tunnel_src= 192.168.100.5, lspId=1 |
| 2004/6/1 10:20:31 605 | 192.168.100.1 | 2001 | 100003 | 2002 | 100001 | busy | dst=192.168.100.6, tunnelId=1 extId=192.168.100.5 | tunnel_src= 192.168.100.5, lspId=1 |
| 2004/6/1 10:20:31 450 | 192.168.100.3 | 2001 | 100001 | 2002 | 100002 | busy | dst=192.168.100.6, tunnelId=1 extId=192.168.100.5 | tunnel_src= 192.168.100.5, lspId=1 |
| 2004/6/1 10:20:31 321 | 192.168.100.6 | 2001 | 100002 | — | — | busy | dst=192.168.100.6, tunnelId=1 extId=192.168.100.5 | tunnel_src= 192.168.100.5, lspId=1 |

CROSS CONNECTION INFORMATION ACCUMULATING TABLE

FIG. 35

INTERFACE CONNECTION RELATION MANAGEMENT TABLE

210 — 2101 — 2102 — 2103
21011, 21012, 21021, 21022

| LINK END A | | LINK END B | | SERVER LAYER CONNECTION |
|---|---|---|---|---|
| ROUTER IDENTIFIER A | I/F IDENTIFIER A | ROUTER IDENTIFIER B | I/F IDENTIFIER B | |
| 192.168.100.1 | 1002 | 192.168.100.2 | 1001 | - |
| 192.168.100.2 | 1001 | 192.168.100.1 | 1002 | — |
| 192.168.100.2 | 1002 | 192.168.100.3 | 1001 | — |
| 192.168.100.3 | 1001 | 192.168.100.2 | 1002 | — |
| 192.168.100.5 | 2002 | 192.168.100.1 | 2001 | — |
| 192.168.100.1 | 2001 | 192.168.100.5 | 2002 | — |
| 192.168.100.3 | 2002 | 192.168.100.6 | 2001 | — |
| 192.168.100.6 | 2001 | 192.168.100.3 | 2002 | — |
| | | | | |

FIG. 37A

| LINK END A | | LINK END B | | SERVER LAYER CONNECTION |
|---|---|---|---|---|
| ROUTER IDENTIFIER A | I/F IDENTIFIER A | ROUTER IDENTIFIER B | I/F IDENTIFIER B | |
| 192.168.100.1 | 1002 | 192.168.100.2 | 1001 | — |
| 192.168.100.2 | 1001 | 192.168.100.1 | 1002 | — |
| 192.168.100.2 | 1002 | 192.168.100.3 | 1001 | — |
| 192.168.100.3 | 1001 | 192.168.100.2 | 1002 | — |
| 192.168.100.5 | 2002 | 192.168.100.1 | 2001 | — |
| 192.168.100.1 | 2001 | 192.168.100.5 | 2002 | — |
| 192.168.100.3 | 2002 | 192.168.100.6 | 2001 | — |
| 192.168.100.6 | 2001 | 192.168.100.3 | 2002 | — |
| 192.168.100.1 | 2002 | 192.168.100.3 | 2001 | LSC_LSP, dst=192.168.100.3, tunnelId=1, extId=192.168.100.1 |
| 192.168.100.3 | 2001 | 192.168.100.1 | 2002 | LSC_LSP, dst=192.168.100.3, tunnelId=1, extId=192.168.100.1 |
| | | | | |

INTERFACE CONNECTION RELATION MANAGEMENT TABLE

FIG. 37B

COMMUNICATION PATH MONITORING SYSTEM AND COMMUNICATION NETWORK SYSTEM

CROSS-REFERENCE TO RELATED APPLICATIONS

This application is a continuation-in-part of earlier U.S. Pat. Ser. No. 11/175,144, filed on Jul. 7, 2005 now abandoned based on Japanese Patent Application P2004-317740 filed on Nov. 1, 2004, the disclosure of which is incorporated in its entirety herein by reference.

CLAIM OF PRIORITY

The present application claims priority from Japanese patent applications P2005-312483 filed on Oct. 27, 2005 and P2004-317740 filed on Nov. 1, 2004, the contents of which are hereby incorporated by reference into this application.

BACKGROUND OF THE INVENTION

This invention relates to a communication path monitoring system for a communication network that uses a link state routing protocol to determine the route of a communication path to be established and that uses a signaling protocol to establish the communication path, as well as to a communication network system composed of the communication network and the communication path monitoring system.

GMPLS (IETF, Internet-Draft, draft-ietf-ccamp-gmpls-architecture-07.txt, Eric Mannie et al., "Generalized Multi-Protocol Label Switching Architecture") is one of techniques for controlling the communication quality of a communication network. This technique sets, by way of a signaling protocol such as GMPLS extended RSVP-TE (IETF, RFC 3473, L. Berger et al., "Generalized Multi-Protocol Label Switching (GMPLS) Signaling Resource ReserVation Protocol-Traffic Engineering (RSVP-TE) Extensions"), an LSP (Label Switched Path), which is a virtual communication path, in a communication network composed of network devices such as a wavelength switch, a time division multiplexer and a packet switch.

In such a communication network, keeping track of the route and operational state of a communication path is important in order to enable the communication network's administrator or management system to make the communication network recover from a network failure.

An example of a method used in MPLS to keep track of the route and operational state of a communication path is disclosed by Cheenu Srinivasan et al., in "Multiprotocol Label Switching (MPLS) Traffic Engineering Management Information Base", IETF, Internet-Draft, draft-ietf-mpls-te-mib-14.txt (hereinafter referred to as "the IETF Internet draft"). According to this technique, a network management system can obtain, from an MPLS router, the state of an LSP and the LSP's attribute information such as route information by using SNMP (Simple Network Management Protocol, IETF RFC 3416).

Disclosed by Aman Shaikh et al., in "An OSPF Topology Server: Design and Evaluation", IEEE J. Selected Areas in Communications, vol. 20, No. 4, May 2002 (hereinafter referred to as "Shaikh et al.") is a technique of checking the stability of route control in a large-scale network by capturing and collecting link state advertisements of OSPF ("OSPF Version 2", IETF RFC 2328), which is an IP network routing protocol.

In networks that are actually run, various types of GMPLS switch and MPLS router are installed in mixed and varied manners.

The technique disclosed in the IETF Internet draft needs for GMPLS switches and MPLS routers to have an SNMP agent function and a management information base. In practice, however, GMPLS switches and MPLS routers do not always have the two because of development cost or other limitations. Then this technique cannot be applied.

Moreover, in what format information is stored in the management information base is not specified in the technique disclosed in the IETF Internet draft, and varies depending on the type of GMPLS switch or MPLS router employed. It is therefore necessary for a monitoring manager to even out the differences in format used to store information in the management information base. The monitoring manager has to develop, for each and every type of GMPLS switch or MPLS router it manages, software to even out the format differences, and developing the software costs money.

The technique disclosed in Shaikh et al. relates to analyzing a link state routing protocol in an IP network, and is not applicable to management of communication paths in a connection-oriented network such as one composed of GMPLS switches or MPLS routers.

SUMMARY OF THE INVENTION

It is therefore an object of this invention to obtain attribute values of communication paths by using information that is not dependent on how a GMPLS switch or an MPLS router is set up (information independent of the type of GMPLS switch or MPLS router), and thus manage communication path configurations in a communication network.

In this invention, signaling protocol messages exchanged between GMPLS switches or between MPLS routers are captured first. The captured signaling protocol messages are accumulated as path establishment information, which is used to derive communication paths established in a network to be managed.

Secondly, link state advertisements of a routing protocol which are exchanged between GMPLS switches or between MPLS routers are captured. The captured routing protocol link state advertisements are accumulated as link state information, which is used to find out the topology and link state of the network to be managed. The link state information and the accumulated path establishment information are compiled to obtain, by analogy, a cross connection state in GMPLS switches or MPLS routers, and the obtained cross connection state is accumulated as cross connection information, which is used to find out the route of a connection path.

GMLPS allows control information such as a signaling protocol and a routing protocol to be exchanged via transmission lines different from those used to transmit user data, and indeed such a configuration is often employed. GMPLS is an expanded framework of MPLS, and makes it possible to control switch devices of various layers such as fiber switches, wavelength switches and division multiplexing switches as well as labeled packet switches. Control signals have far smaller information amount than broad band user data handled by these switches, and therefore far fewer physical links than links for user data are needed to build a network for transferring control signals. Accordingly, capturing control information of a GMPLS network is easy from the view point of the number of capture points, and this invention utilizes this fact. Theoretically, this invention is also applicable to MPLS, although MPLS is not as desirable as GMPLS in terms of the number of capture points.

Thirdly, the accumulated path establishment information and cross connection information are compiled to derive communication paths that are included in a designated link or in a link where a failure has occurred.

Fourthly, upon capturing a control signal to disconnect a communication path, the cross connection information is used to track back an upstream hop. Path establishment information at the upstream hop is examined to judge whether a control signal to disconnect a path has been captured at the upstream hop.

This invention obtains a list of communication paths and the operational state and route of a communication path solely from information that is not dependent on the type of MPLS router or GMPLS switch, and thus makes it possible to manage the configuration of a communication path in a network whatever type of MPLS router or GMPLS switch constitutes the network, which has been impossible with prior art.

BRIEF DESCRIPTION OF THE DRAWINGS

The present invention can be appreciated by the description which follows in conjunction with the following figures, wherein:

FIG. 8 is a configuration diagram of an interface connection relation management table according to the first embodiment;

FIG. 9 is a configuration diagram of a path establishment control information accumulating table according to the first embodiment;

FIG. 10 is a configuration diagram of a link state information accumulating table according to the first embodiment;

FIG. 11 is a configuration diagram of an I/F state information accumulating table according to the first embodiment;

FIG. 12 is a configuration diagram of a cross connection information accumulating table according to the first embodiment;

FIG. 22A is a diagram showing a transition of data in the cross connection information accumulating table according to the first embodiment;

FIG. 22B is a diagram showing a transition of data in the cross connection information accumulating table according to the first embodiment;

FIG. 22C is a diagram showing a transition of data in the cross connection information accumulating table according to the first embodiment;

FIG. 22D is a diagram showing a transition of data in the cross connection information accumulating table according to the first embodiment;

FIG. 24A is a configuration diagram of a path management table according to the first embodiment;

FIG. 24B is a configuration diagram of a path management table according to the first embodiment;

FIG. 28 is a configuration diagram of a path establishment control information accumulating table according to the forth embodiment;

FIG. 29 is a configuration diagram of a path management table according to the forth embodiment;

FIG. 30 is a configuration diagram of a cross connection information accumulating table according to the forth embodiment;

FIG. 33 is a configuration diagram of a path establishment control information accumulating table according to the fifth embodiment;

FIG. 34 is a configuration diagram of a path management table according to the fifth embodiment;

FIG. 35 is a configuration diagram of a cross connection information accumulating table according to the fifth embodiment;

FIG. 37A is configuration diagrams of an interface connection relation management table according to fifth embodiment; and FIG. 37B is configuration diagrams of an interface connection relation management table according to fifth embodiment.

DETAILED DESCRIPTION OF THE PREFERRED EMBODIMENTS

First Embodiment

A first embodiment of this invention will be described below.

Described in the first embodiment is a case where GMPLS extended RSVP-TE is employed as a signaling protocol and GMPLS extended OSPF-TE is employed as a link state routing protocol. However, this embodiment is applicable in a similar manner to other protocols such as IS-IS ("OSI IS-IS Intra-domain Routing Protocol", IETF RFC 1142) and GMPLS CR-LDP (IETF RFC 3472, "Generalized Multi-Protocol Label Switching (GMPLS) Signaling Constraint-based Routed Label Distribution Protocol (CR-LDP) Extensions").

Figure 1:
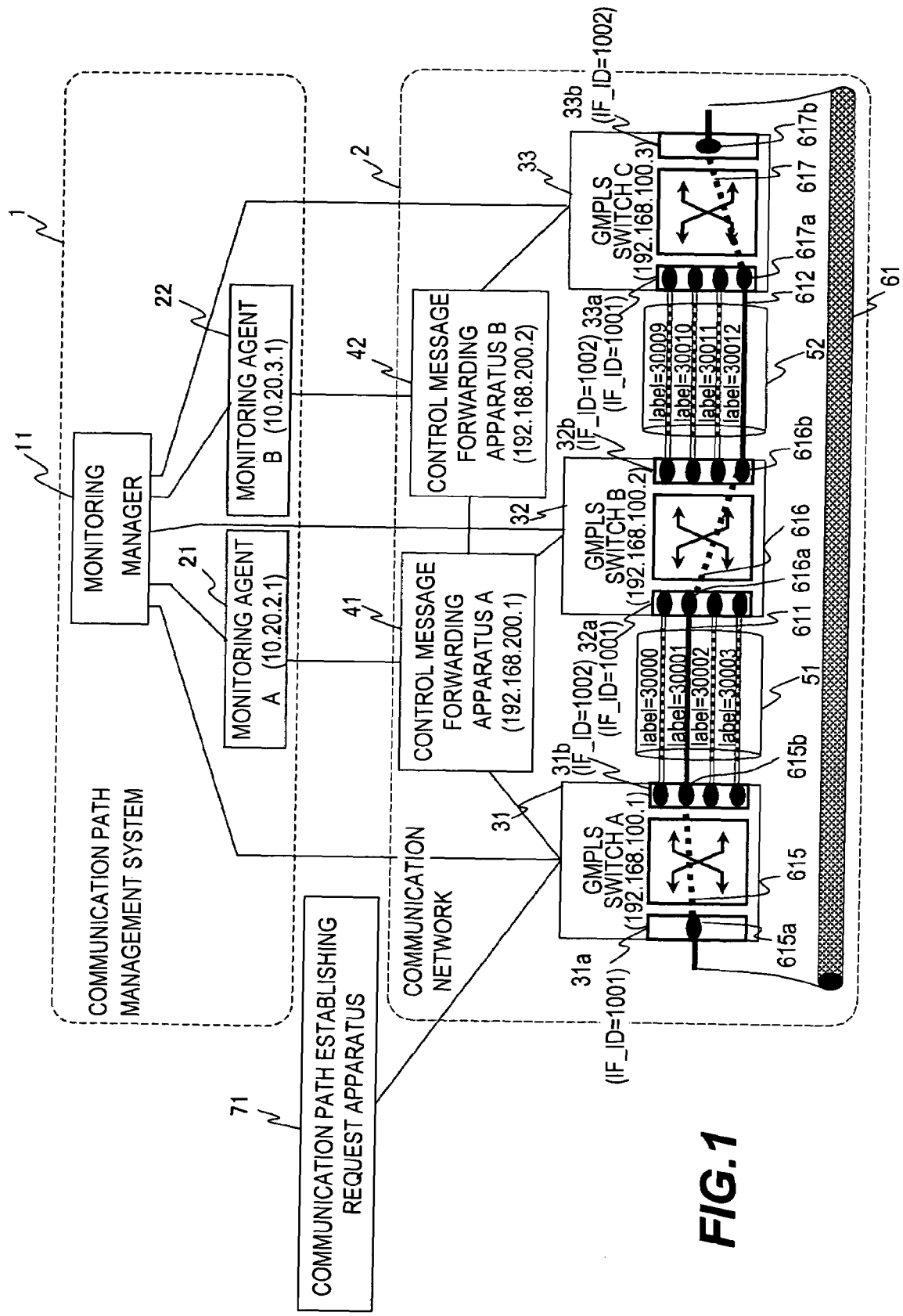
FIG. 1 is a block diagram of a network system according to a first embodiment.

FIG. 1 is a block diagram of a network system according to the first embodiment of this invention.

The network system of the first embodiment is a GMPLS network in which GMPLS extended RSVP-TE and GMPLS extended OSPF-TE messages are exchanged over a link that is not a to-be-established communication path 61.

A communication path management system 1 of the first embodiment is composed of a monitoring manager 11, a monitoring agent A 21 and a monitoring agent B 22. The communication path management system 1 can have an arbitrary number of monitoring agents, and as many monitoring agents as necessary are provided in accordance with the scale and topology of a communication network 2 to be managed.

The communication network 2 is a network managed by the communication path management system 1.

The communication network 2 is composed of one or more GMPLS switches A 31 to C 33, one or more links 51 and 52, which are used to transmit user data between the GMPLS switches, and control message forwarding apparatus A and B, which transfer control information to the GMPLS switches. The GMPLS switches each have one or more interfaces to exchange user data.

The GMPLS switches are uniquely identified by their respective router's identifiers throughout the communication network 2. For instance, the router's identifier of the GMPLS switch A 31 is 192.168.100.1 in FIG. 1.

Each interface is identified, within the GMPLS switch to which the interface belongs, by an interface identifier whereas it is uniquely identified by a combination of the router's identifier of the GMPLS switch and the interface identifier throughout the communication network 2. For example, in FIG. 1, an interface 31b has an interface identifier 1002, and is uniquely identified throughout the communication network 2 by a combination [192.168.100.1, 1002].

Each link is uniquely identified by a link identifier throughout the communication network 2. A link identifier is a combination of the router's identifier and interface identifier of an interface to which a link in question is connected. For example, a link 51, which in FIG. 1 connect [192.168.100.1, 1002] and [192.168.100.2, 1001] to each other, has a link identifier [192.168.100.1, 1002, 192.168.100.2, 1001].

The communication network 2 is controlled in conformity with GMPLS, and user data is transmitted over the communication path 61 once the path is established. The communication path 61 is composed of one or more cross connections and one or more partial connections.

"Partial connection" is a term defined in this specification, and refers to those denoted by 611 and 612 in a detailed illustration of the communication path 61 shown in FIG. 1. In other words, a partial connection is a band resource within each link between the GMPLS switches, communication interfaces at the two ends of the link serve as the end points of the partial connection. For instance, when the GMPLS switches are wavelength switches, a partial connection is provided for each wavelength between communication paths. Each partial connection is identified, within the link where the partial connection is located, by a label whereas it is uniquely identified throughout the communication network 2 by a combination of the link identifier of the line and the label. For example, a partial connection 611 in FIG. 1 is identified, within a link 51, by a label "label=30001".

"Cross connection" refers to those denoted by 615 to 617 in the detailed illustration of the communication path 61 shown in FIG. 1. In other words, a cross connection is the connection between two partial connections that have end points on a GMPLS switch. Each cross connection is identified, within its relevant GMPLS switch, by a combination of the interface identifier of the incoming interface, the label at the incoming interface, the interface identifier of the outgoing interface, and the label at the outgoing interface whereas it is uniquely identified throughout the communication network 2 by a combination of the aforementioned interface identifiers and labels and the router's identifier of the GMPLS switch. For instance, a cross connection 616 in FIG. 1 is identified, within the GMPLS switch B, by [1001, 30001, 1002, 30012].

A communication path establishing request apparatus 71 is, for example, an operation terminal, or a network management system of a device (element) management system, or an application system of a storage management server, a video server, or the like, and requests the communication path 61 to be established. Only one communication path establishing request apparatus is shown in FIG. 1, but an arbitrary number of communication path establishing request apparatus are set up in accordance with the number of end points of communication paths to be established.

A protocol employable by the communication path establishing request apparatus 71 in requesting the GMPLS network 2 to establish the communication path 61 is, for example, telnet (IETF, RFC 854) or the like to input a command, or a signaling protocol such as RSVP-TE or O-UNI (Optical Internetworking Forum, User Network Interface (UNI) 1.0 Signaling Specification), or an application protocol such as HTTP (IETF RFC 1945), SIP (IETF RFC 2543) or RTSP (IETF RFC 2326), or a remote procedure call protocol such as SOAP (World Wide Web Consortium, SOAP Version 1.2) or IIOP (Object Management Group, CORBA™/IIOP™ Specification).

As the communication path establishing request apparatus 71 requests establishment of the communication path 61, the GMPLS switch A 31, the GMPLS switch B 32 and the GMPLS switch C 33 send and receive messages according to a signaling protocol (GMPLS extended RSVP-TE, for example) among one another, to thereby form the cross connections 615 to 617 in the GMPLS switches. Then the partial connections 611 and 612 are connected to each other, thus establishing the communication path 61.

The GMPLS switch A 31, the GMPLS switch B 32 and the GMPLS switch C 33 can obtain a network topology by sending and receiving messages of GMPLS extended OSPF-TE, which is one of routing protocols. GMPLS extended OSPF-TE messages are exchanged via the control message forwarding apparatus A, which is denoted by 41, and the control message forwarding apparatus B, which is denoted by 42.

The GMPLS switch A 31, the GMPLS switch B 32 and the GMPLS switch C 33 send, to the monitoring manager 11, attribute values indicative of the operational state or the like of the interfaces between the GMPLS switches in a management format such as MIB-II (Management Information Base for Network Management of TCP/IP-based internets: MIB-II, IETF RFC 1158) with the use of SNMP (Simple Network Management Protocol, IETF RFC 3416) or other similar protocols. MIB-II is, unlike the IETF Internet draft, installed in most of network appliances and how MIB-II is installed varies only a little. Accordingly, the use of MIB-II does not conflict with "managing a communication path by using information that is not dependent on how a GMPLS switch or an MPLS router is set up (information independent of the type of GMPLS switch or MPLS router)", which is an object to be solved by this invention.

GMPLS does not need for user data and a signaling protocol to be transferred on the same route. In this embodiment, user data is transferred via the GMPLS switches A 31, B 32 and C 33 (the communication interfaces 31a, 31b, 32a, 32b, 33a and 33b) whereas GMPLS extended RSVP-TE and GMPLS extended OSPF-TE messages are transferred via the control message forwarding apparatus A 41 and/or the control message forwarding apparatus B 42.

An I/F identifier unique within the same GMPLS switch is assigned to each communication interface. The description of this embodiment is given on the assumption that the I/F identifiers of the interfaces 31a, 31b, 32a, 32b, 33a and 33b are 1001, 1002, 1001, 1002, 1001 and 1002, respectively.

GMPLS extended RSVP-TE and GMPLS extended OSPF-TE messages may be encapsulated by a tunneling protocol such as Generic Routing Encapsulation (IETF RFC 2784).

The control message forwarding apparatus A 41 and the control message forwarding apparatus B 42 are devices having a packet transferring function such as IP (Internet Protocol) routers or IEEE 802.3D MAC bridges. The control message forwarding apparatus A 41 and B 42 also copy GMPLS extended RSVP-TE and GMPLS extended OSPF-TE messages to be transferred, and transfer the copies to the monitoring agent A 21 or the monitoring agent B 22. In order to give the control message forwarding apparatus A 41 and B 42 this copy function, for example, a method widely known as port mirroring and installed in IP routers and MAC bridges is employed. In port mirroring, copies of all packets that pass through a VLAN or a communication interface are sent, packet by packet, to a communication interface that is independent of the original transfer destination. An optical method using an optical splitter, a magnetic method to capture a leaking magnetic flux, an electric method using an electric splitter, and the like may also be employed.

The monitoring agent A 21 and the monitoring agent B 22 receive copies of GMPLS extended RSVP-TE and GMPLS extended OSPF-TE messages from the GMPLS switches, and add the monitoring agent identifiers as well as the time of the capture to the message copies before sending the copies to the monitoring manager 11.

The monitoring manager 11 uses the messages sent from the monitoring agents A 21 and B 22 to accumulate and analyze GMPLS extended RSVP-TE and GMPLS extended OSPF-TE messages exchanged within the communication network 2. Derived in this way is what communication path has been established, which is controlled with a GMPLS extended RSVP-TE message 60 shown in FIGS. 6A and 6B.

The control message forwarding apparatus A 41 and B 42 sometimes transfer other control information than GMPLS extended RSVP-TE and GMPLS extended OSPF-TE messages (for example, ICMP and IP routing information), in addition to a diversity of GMPLS extended RSVP-TE and GMPLS extended OSPF-TE messages. Since the data amount is enormous when every one of such messages is to be sent to the monitoring manager 11 via the monitoring agents, it is preferable if data that is not needed by the monitoring manager 11 is screened out and is not sent by the monitoring agents. This filtering processing may be performed by either the monitoring agents or the control message forwarding apparatus.

The configuration and operation of the monitoring manager 11 will be described next.

Figure 2:
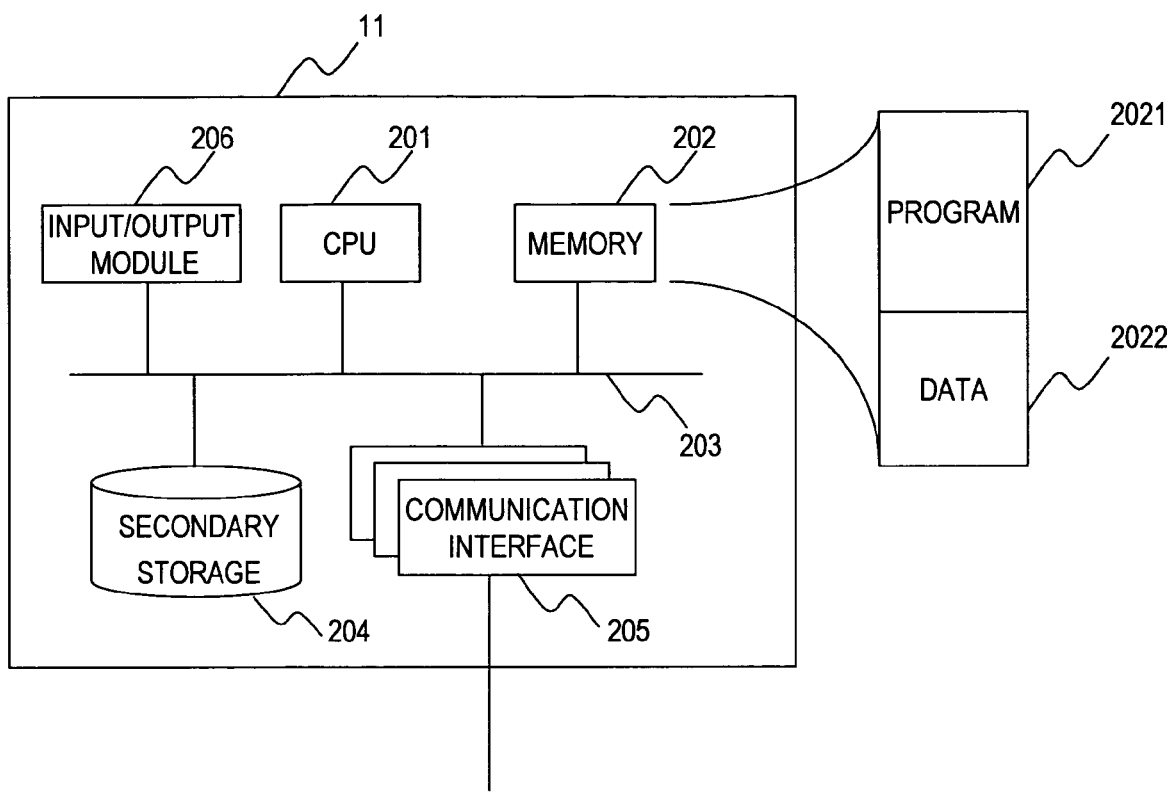
FIG. 2 is a block diagram of a monitoring manager according to the first embodiment.

FIG. 2 is a block diagram of the monitoring manager 11.

The monitoring manager 11 is composed of a CPU 201, a memory 202, an internal communication line (bus or the like) 203, secondary storage 204, communication interfaces 205, 205, 205 . . . , and an input/output module 206.

The communication interfaces 205, 205, 205 . . . are connected to the monitoring agents A 21 and B 22. The communication interfaces 205, 205, 205 . . . receive control signals such as a routing protocol and a signaling protocol from the control message forwarding apparatus A 41 and B 42.

The memory 202 stores, as shown on the right hand side of FIG. 2, a program 202 executed by the CPU 201 and data 2022 used upon execution of the program 202 in accordance with the need.

The monitoring agents A 21 and B 22 have a configuration similar to that of the monitoring manager 11, except that communication interfaces 205, 205, 205 . . . of the monitoring agents A 21 and B 22 are connected to the monitoring manager 11 and to the control message forwarding apparatus A 41 and B 42. The number of communication interfaces 205, 205, 205 . . . in the monitoring agents A 21 and B 22 may not match the number of communication interfaces 205, 205, 205 . . . in the monitoring manager 11, depending on how the load is balanced, how an address system is built, or the like. Furthermore, the monitoring agents A 21 and B 22 may have no input/output module 206 and secondary storage 204.

Figure 3:
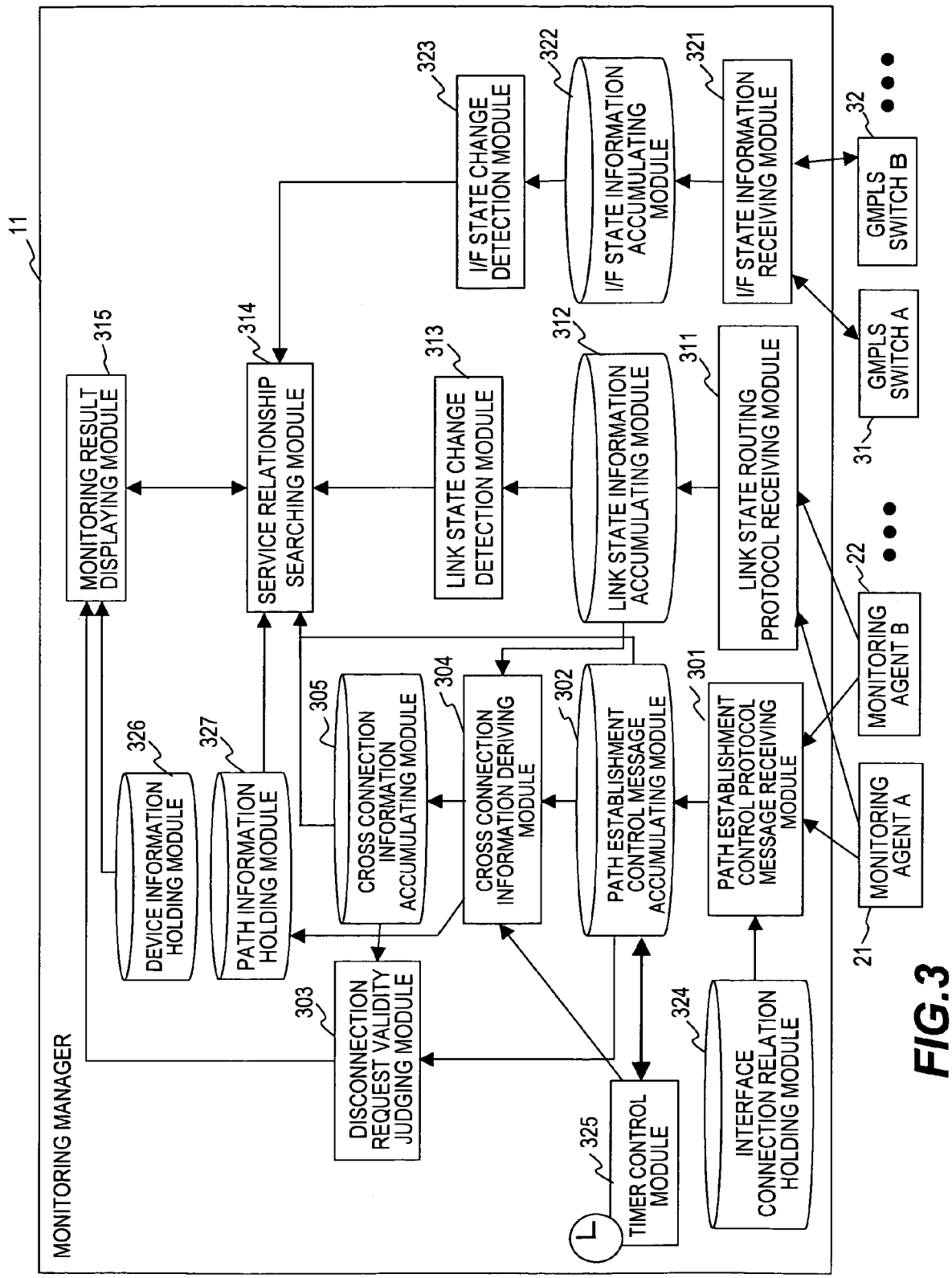
FIG. 3 is a functional block diagram of the monitoring manager according to the first embodiment.

FIG. 3 is a functional block diagram of the monitoring manager 11.

The monitoring manager 11 is composed of a path establishment control protocol message receiving module 301, a path establishment control information accumulating module 302, a disconnection request validity judging module 303, a cross connection information deriving module 304, a cross connection information accumulating module 305, a link state route control protocol receiving module 311, a link state information accumulating module 312, a link state change detection module 313, a service relationship searching module 314, a monitoring result displaying module 315, an I/F state information receiving module 321, an I/F state information accumulating module 322, an I/F state change detection module 323, an I/F connection relation holding module 324, a timer management module 325, a device information holding module 326 and path information holding module 327. The I/F connection relation holding module 324 is not an indispensable component and may be omitted.

The path establishment control protocol message receiving module 301 receives, from the monitoring agents, notifications of the capture of GMPLS extended RSVP-TE messages. The captured information are, as will be described later with reference to FIG. 4, copies of GMPLS extended RSVP-TE messages which are made by the control message forwarding apparatus A 41 and B 42 and to which the data and time of the capture as well as the identifiers of the control message forwarding apparatus where the copies are captured are added.

The path establishment control protocol message receiving module 301 then derives the link identifiers of links controlled by those messages. For instance, in the case where RSVP_HOP is {192.168.100.1, 1002}, which represents the interface 31b of the GMPLS switch A, {192.168.100.1, 1002, 192.168.100.2, 1001} is derived as the link identifier of the link that is controlled by this RSVP-TE message by obtaining {192.168.100.2, 1001}, which represents the interface 32a of the GMPLS switch B, namely, the opposing interface of the interface 31b.

Also, a refresh timeout time is derived from a capture date/time and a refresh period.

The derived link identifier and a refresh timeout time are stored, along with the message, in a table format, in the path establishment control information accumulating module 302.

The cross connection information deriving module 304 judges that a communication path is created when a record entry added to the path establishment control information accumulating module 302 holds a PATH message, and that a communication path is deleted when the record entry holds a PATH_TEAR message. When judging that a communication path has been created, the cross connection information deriving module 304 adds a record entry to a table of the path information holding module 327. When it is judged that a communication path has been deleted, a relevant record entry is removed from the table of the path information holding module 327. Details of how to detect path creation and path deletion will be described later with reference to FIGS. 9, 24A, and 24B.

When a record entry is added to the path establishment control information accumulating module 302, the cross connection information deriving module 304 further associates entries of messages that share the same GMPLS switch and the same session with each other. Formation and removal of a cross connection is thus detected. Upon detection of formation and removal of a cross connection, a table is updated in the cross connection information accumulating module 305. Details of how formation and removal of a cross connection is detected will be described later with reference to FIGS. 9 and 12.

The link state route control protocol receiving module 311 receives, from the monitoring agents, notifications of the capture of LS UPDATE messages of GMPLS extended OSPF-TE messages, and stores the notifications in a table of the link state information accumulating module 312. The captured information are, as will be described later with reference to FIG. 4, LS UPDATE messages of copies of GMPLS extended OSPF-TE messages which are made by the control message forwarding apparatus A 41 and B 42 and to which the date/time of the capture as well as the identifiers of the monitoring agents where the copies are captured are added. The link state change detection module 313 monitors the table of the link state information accumulating module 312 and, when detecting a failure in a link between the GMPLS switches in the communication network 2 to be managed, notifies the service relationship searching module 314 of the failure as well as the identifier of the link.

The I/F state information receiving module 321 receives, from the GMPLS switches, information about the operational state of their interfaces, and stores the information in a table of the I/F state information accumulating module 322. The I/F state change detection module 323 monitors the table of the I/F state information accumulating module 322 and, when detecting a failure in a communication interface of one of the GMPLS switches in the communication network 2 to be managed, notifies the service relationship searching module 314 of the failure as well as the identifier of the communication interface.

Information (SNMP message) about an interface operational state which the I/F state information receiving module 321 receives from the GMPLS switches contains data that overlaps with OSPF information received by the link state route control protocol receiving module 311. This makes the I/F state information receiving module 321, the I/F state information accumulating module 322 and the I/F state change detection module 323 dispensable components in this embodiment. However, an SNMP message is more convenient than an OSPF message since the former makes early failure detection possible.

When a notification of a link failure between the GMPLS switches is received from the link state change detection module 313, the service relationship searching module 314 derives a list of the communication paths 61, 61, 61 . . . that pass through the failed link from the information in the path establishment control information accumulating module 302 and from other information. When a notification of a communication interface failure is received from the I/F state change detection module 323, the service relationship searching module 314 derives a list of the communication paths 61, 61, 61 . . . that pass through the failed communication interface from the information in the cross connection information accumulating module 305 and from other information. Details will be given later with reference to FIG. 15 about processing of deriving a list of the communication paths 61, 61, 61 . . . that pass through a failed communication interface.

The derived list is outputted to the monitoring result displaying module 315 and displayed on the input/output module 206. Details of how to displaying the derived list will be described later with reference to FIGS. 25, 26A and 26B.

The disconnection request validity judging module 303 monitors record entries of the path establishment control information accumulating module 302 and, when a record entry added thereto is a PATH_TEAR message indicating a path disconnection request, judges whether the request is a valid one made by a starting point node or a request for unplanned disconnection made at the discretion of an intermediate node. When it is judged as a result that the request is for unplanned disconnection, a message to that effect is outputted to the monitoring result displaying module 315 and displayed on the input/output module 206. Details of the judging processing will be described later with reference to FIGS. 16, 17 and 18.

The monitoring result displaying module 315 receives a search request from an operator of the communication path management system 1 via the input/output module 206. Using the information in the path establishment control information accumulating module 302 and the information in the cross connection information accumulating module 305, the monitoring result displaying module 315 derives a list of the communication paths 61, 61, 61 . . . that pass through a link designated by the search request, and has the input/output module 206 display the list. Details will be described later with reference to FIG. 13 about processing of deriving a list of the communication paths 61, 61, 61 . . . that pass through a designated link based on a search request.

The device information holding module 326 keeps the device configuration of the GMPLS switches A31 to C33. The device information holding module 326 may also keep names of the devices, installation location and other attributes as information that makes it easy for a network administrator operating the monitoring manager device 11 to understand the network configuration. The device information may be used when the monitoring result displaying module 315 displays the communication path list.

Next, the configuration and operation of the monitoring agent A 21 and the monitoring agent B 22 will be described.

The monitoring agent A 21 and the monitoring agent B 22 have a configuration similar to that of the monitoring manager 11 which is shown in FIG. 2, except that communication interfaces 205, 205, 205 . . . of the monitoring agents A 21 and B 22 are connected to the monitoring manager 11 and to the GMPLS switches A 31, B 32 and C 33. The number of components may vary from each monitoring agent.

Figure 4:
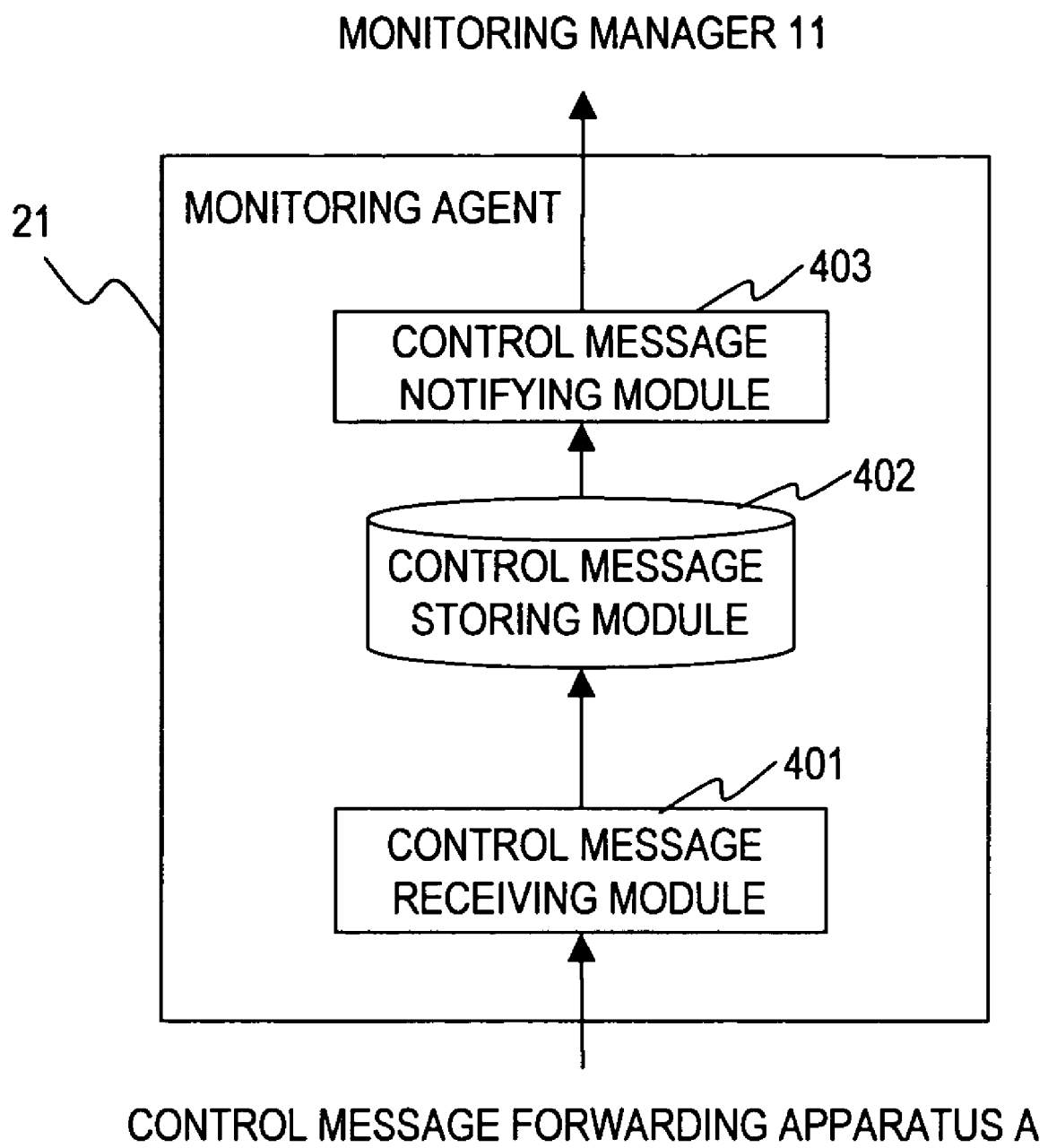
FIG. 4 is a functional block diagram of a monitoring agent according to the first embodiment.

FIG. 4 is a functional block diagram of the monitoring agents A 21 and B 22.

The monitoring agent A 21 is composed of a control message receiving module 401, a control message storing module 402 and a control message notifying module 403.

The control message receiving module 401 receives copies of GMPLS extended RSVP-TE messages and copies of GMPLS extended OSPF-TE link state advertisement messages from the control message forwarding apparatus A 41 and others. The received message copies are stored in a table of the control message storing module 402. The table of the control message storing module 402 has a column configuration mostly similar to that of a path establishment information accumulating table shown in FIG. 9 and of a link state information accumulating table shown in FIG. 10. The difference is that the table of the control message storing module 402 does not contain link identification information 8042 and capture monitoring agent identifiers 8012 and 9012. The time a message copy is received is stored in a capture date/time field. The time the message is copied may be additionally entered in the capture date/time field by the control message forwarding apparatus. This improves the time precision. Furthermore, the accuracy in determining the order of arrival of messages can be improved if system clocks of the monitoring agents or system clocks of the control message forwarding apparatus are corrected with the use of NTP (The Network Time Protocol, IETF RFC 1305) or GPS (Global Positioning System) as shown in "Framework for IP Performance Metrics" (IETF RFC 2330).

The control message notifying module 403 monitors the table of the control message storing module 402. When a GMPLS extended RSVP-TE message is added to the table, the control message notifying module 403 sends, to the path establishment control protocol message receiving module 301 of the monitoring manager 11, the added record entry along with the identifier of the monitoring agent where the message is captured. When a GMPLS extended OSPF-TE link state advertisement message is added to the table, the control message notifying module 403 sends, to the link state route control protocol receiving module 311 of the monitoring manager 11, the added record entry along with the identifier of the monitoring agent where the message is captured.

The transmission of such messages and identifiers to the monitoring manager 11 can be timed to various events, for example, each time a new entry is added, or at each elapse of a given time period, or each time the amount of data to be transmitted reaches a preset value.

Figure 5:
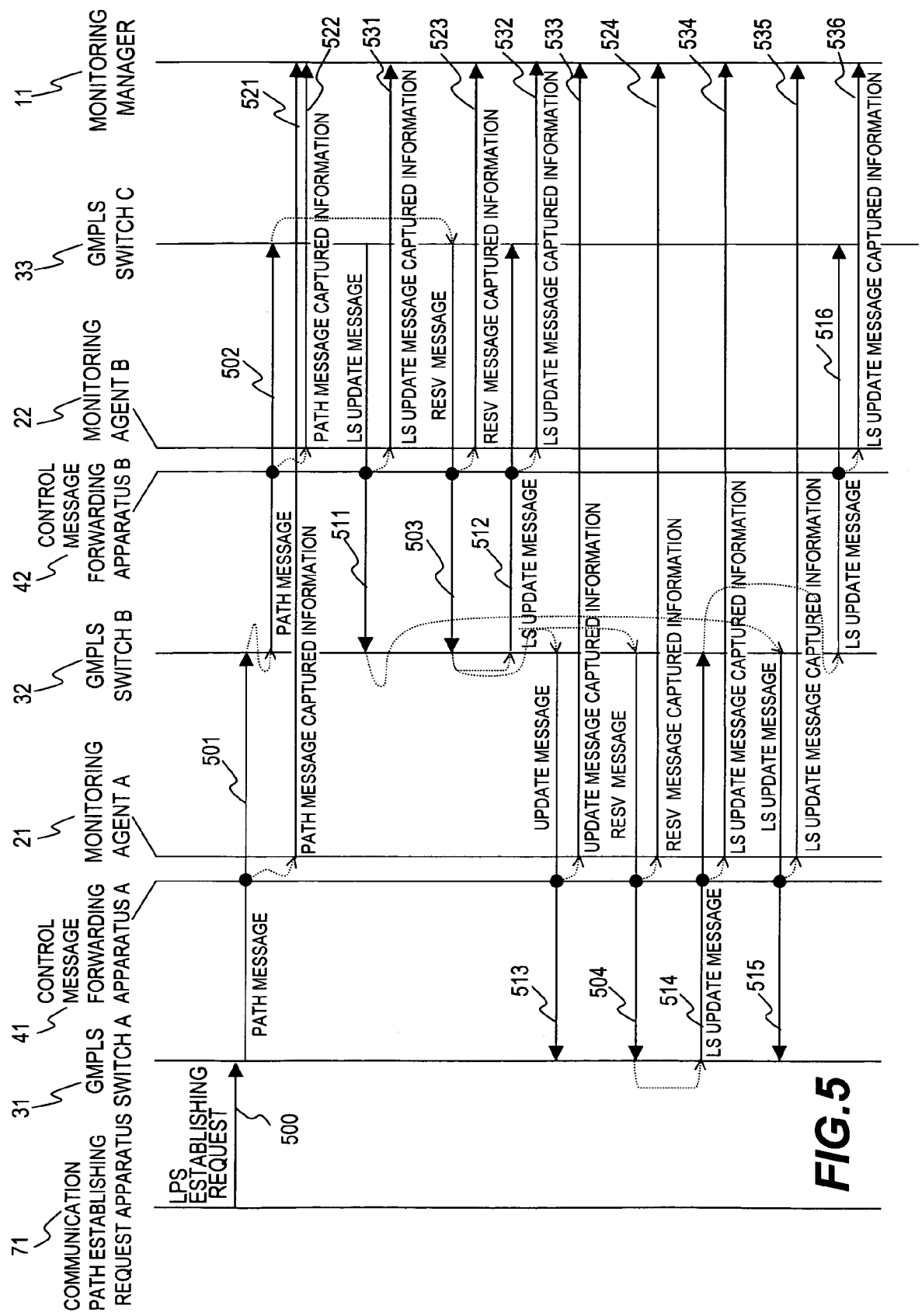
FIG. 5 is a sequential diagram for establishing and opening a path to capture messages and for capturing a link state advertisement.

FIG. 5 is a sequential diagram for establishing and opening a path to capture messages and for capturing a link state advertisement.

The sequence shown in FIG. 5 includes phenomena conforming to operation rules of GMPLS extended RSVP-TE and GMPLS extended OSPF-TE plus exchanges with the communication path management system 1 according to this invention. In other words, in this sequence, the control message forwarding apparatus A 41 and B 42 make copies of GMPLS extended RSVP-TE and GMPLS extended OSPF-TE messages, and the monitoring agent A 21 and the monitoring agent B 22 adds capture point information to the copies to send the copies and the capture point information to the monitoring manager 11. Messages 521 to 524 and 531 to 536 shown in FIG. 5 are messages after capture point information is added.

Although not shown in FIG. 5, a link state is exchanged on GMPLS extended OSPF-TE messages irrespective of whether a communication path is established. In other words, the messages may be exchanged prior to the sequence 500.

When the communication path establishing request apparatus 71 sends an LSP establishing request to the GMPLS switch A 31 (500), the GMPLS switches A 31 to C 33 exchange GMPLS extended RSVP-TE PATH messages and RESV messages (501, 502, 503, 504). Thus, the partial connections 611 and 612 and the cross connections 615 to 617 are allocated, and the GMPLS switches A 31 to C 33 establish the communication path 61.

The control message forwarding apparatus A 41 and B 42 copy RSVP messages exchanged among the GMPLS switches, and send the copies to the monitoring agent A 21 or the monitoring agent B 22. The monitoring agents A 21 and B 22 send, as described above, captured messages along with the monitoring agent identifiers and the time of the capture to the monitoring manager 11 (521 to 524). The monitoring manager 11 stores the received RSVP messages, monitoring agent identifiers, and capture time in the path establishment control information accumulating module 302.

The GMPLS switches A 31 to C 33 exchange link state advertisements when there is a change in state of links between the GMPLS switches. Link state advertisements are exchanged as GMPLS extended OSPF-TE LS UPDATE messages.

The state of a link refers to whether there is a failure in the link and the allocated band resource amount of the like. A band resource is measured by the number of partial connections 611, 611, 611 . . . , attributes of each partial connection 611 (the sum value of a requested band), and the like. Examples of how link state advertisements are exchanged due to a change in allocated band resource of a link are shown in FIG. 5 by 511 to 516.

The control message forwarding apparatus A 41 and B 42 copy GMPLS extended OSPF-TE messages exchanged among the GMPLS switches, and send the copies to the monitoring agent A 21 or the monitoring agent B 22. The monitoring agents A 21 and B 22 send, as described above, captured messages along with the monitoring agent identifiers and the time of the capture to the monitoring manager 11 (531 to 536). The monitoring manager 11 stores the received GMPLS extended OSPF-TE messages, monitoring agent identifiers, and capture time in the link state information accumulating module 312.

Figure 6A:
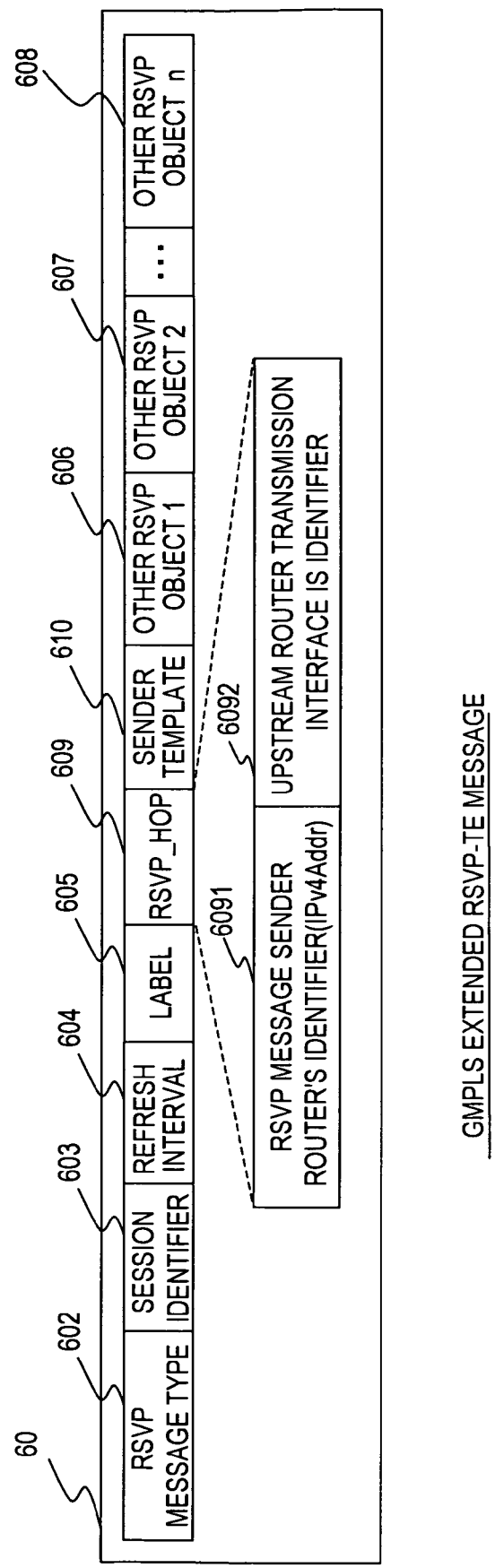
FIG. 6A is a diagram of a GMPLS extended RSVP-TE message format according to the first embodiment.

FIG. 6A is a diagram of a GMPLS extended OSPF-TE message format, and shows fields related to the communication path management system 1.

The GMPLS extended RSVP-TE message 60 contains an RSVP message type field 602, a session identifier field 603, a refresh interval field 604, a label field 605, an RSVP_HOP field 609, SENDER_TEMPLATE 610, and other RSVP object fields 606 to 608.

The RSVP message type field 602 is for an identifier indicating which one of a PATH message, an RESV message and a PATH_TEAR message this message is.

A GMPLS extended RSVP-TE message is transmitted by Internet Protocol or the like, and accordingly is attached with an IP header inside a network.

In the case where a GMPLS extended RSVP-TE message is encapsulated by GRE (Generic Routing Encapsulation), a GRE header is also added to the head of the message.

The RSVP_HOP field 609 is for an identifier 6091 of an RSVP message sender router and a communication interface identifier 6092 of an upstream router. The RSVP_HOP field 609 indicates the communication interface of the RSVP message sender GMPLS switch which constitutes a partial connection allocated to the communication path 61 to be established.

Figure 6B:
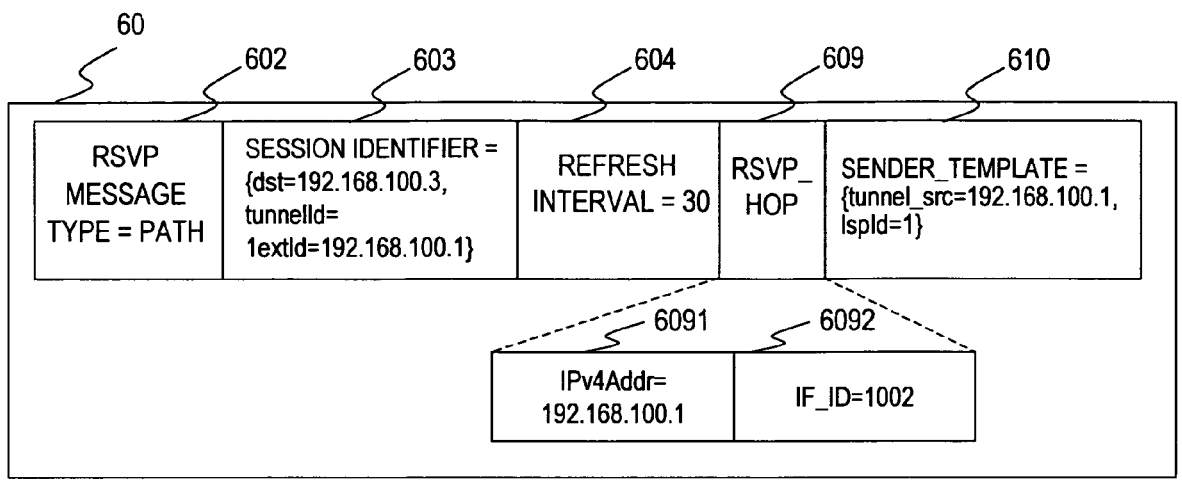
FIG. 6B shows an example of a GMPLS extended RSVP-TE message according to the first embodiment.

FIG. 6B shows, as an example of a GMPLS extended RSVP-TE message, the message in the sequence 501 of FIG. 5. "IPv4Addr" and "IF_ID" in the RSVP_HOP field 609 indicate the interface 31*b* of the GMPLS switch A 31. When this message is stored in the table of the path establishment control information accumulating module by the path establishment control protocol message receiving module, as described above, {192.168.100.2, 1001}, which represents the interface 32*a* of the GMPLS switch B 32, namely, the opposing interface of the interface 31*b* of the GMPLS switch A 31 indicated by the RSVP_HOP, is also stored in the table. In this way, the link identifier of the link that is controlled by this RSVP-TE message is derived.

Figure 7A:
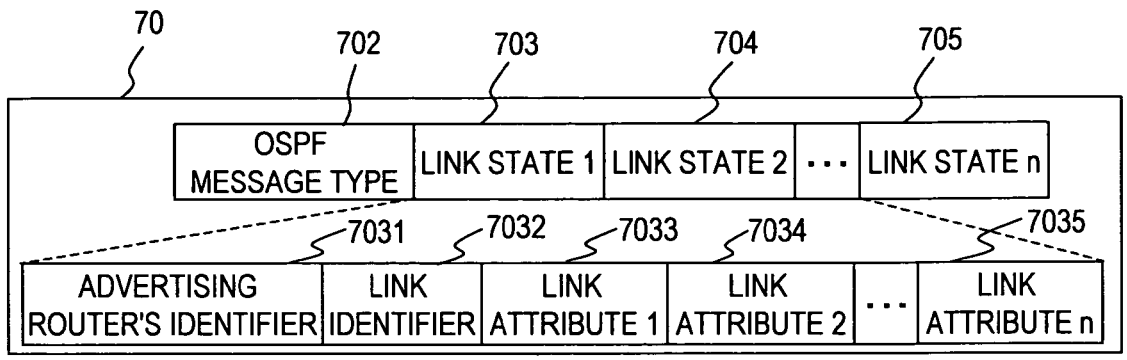
FIG. 7A is a diagram of a GMPLS extended OSPF-TE link state advertisement message format according to the first embodiment.

FIG. 7A is a diagram of a GMPLS extended OSPF-TE link state advertisement message format, and shows fields related to the communication path management system 1.

A GMPLS extended OSPF-TE link state advertisement message 70 contains an OSPF message type field 702 and one or more link state fields 703 to 705. The OSPF message type field 702 is for an identifier indicating that this message conveys a link state advertisement.

The link state fields 703 to 705 each contain an advertising router's identifier 7031, a link identifier 7032, and one or more link attributes 7033 to 7035.

A GMPLS extended OSPF-TE message is transmitted by Internet Protocol or the like, and accordingly is attached with an IP header inside a network.

In the case where a GMPLS extended OSPF-TE message is encapsulated by Generic Routing Encapsulation (GRE), a GRE header is also added to the head of the message.

Figure 7B:
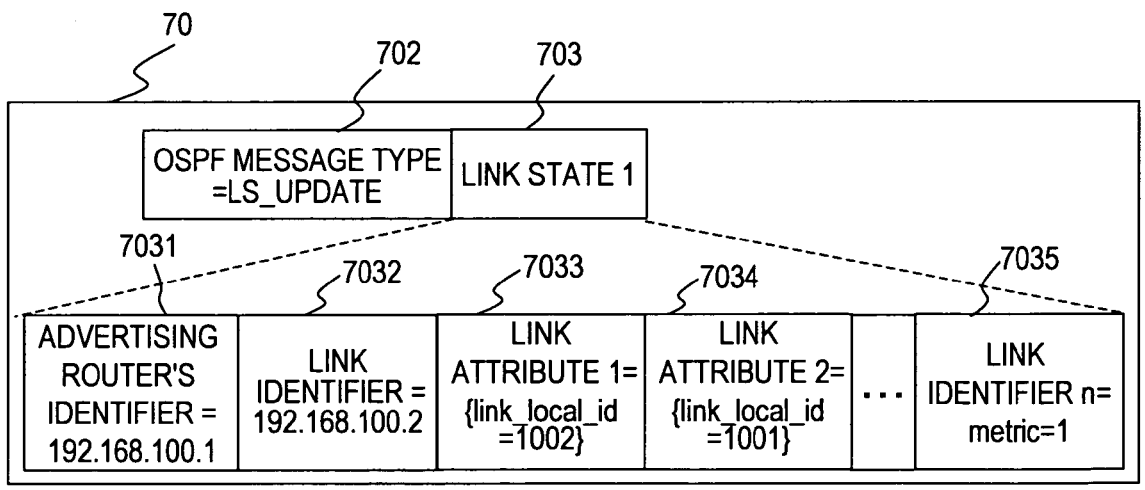
FIG. 7B shows an example of a GMPLS extended OSPF-TE link state advertisement according to the first embodiment.

FIG. 7B shows an example of a GMPLS extended OSPF-TE message indicating that the link 51 between the interface 31*b* of the GMPLS switch A 31 and the interface 32*a* of the GMPLS switch B 32 is working normally.

FIG. 8 is a configuration diagram of an interface connection relation management table 210.

The interface connection relation management table 210 is held in the I/F connection relation holding module 324.

The interface connection relation management table 210 contains a link end A 2101 and a link end B 2102. The link end A 2101 and the link end B 2102 indicate identification information of two connected communication interfaces. In other words, each entry in the interface connection relation management table 210 is equivalent to a link identifier. The link end A 2101 contains a router's identifier A 21011 and an interface identifier A 21012. The link end B 2102 contains a router's identifier B 21021 and an interface identifier B 21022.

Data in the interface connection relation management table 210 may be manually set by a network administrator in advance to be kept permanently, or may be derived from information stored in the link state information accumulating module 312. Processing for when the latter is employed is described. Entries of a link state information accumulating table 90 are examined in chronological order. A combination [an advertising router's identifier 9031, link_local_id shown in a link attribute one 9033, a link identifier 9032, and link_remote_id shown in a link attribute two 9034] represents a link identifier. In the case of an entry indicating a failure, the entry of the link identifier is deleted from the interface connection relation management table 210. Otherwise, the entry is overwritten. This is executed for every entry of the link state information accumulating table 90, to thereby bring the interface connection relation management table 210 up to date.

The example of FIG. 8 shows that the communication interfaces 31*b* and 32*a* are connected bidirectionally and that the communication interfaces 32*b* and 33*a* are connected bidirectionally. As mentioned above, the assumption is that the I/F identifiers of the communication interfaces 31*b*, 32*a*, 32*b* and 33*a* are 1002, 1001, 1002 and 1001, respectively.

FIG. 9 is a configuration diagram of a path establishment control information accumulating table 80.

The path establishment control information accumulating table 80 is held in the path establishment control information accumulating module 302.

The path establishment control information accumulating table 80 contains columns of a capture point information 801, IP header information 802, RSVP information 803, a link identifier 804 and a refresh timeout time 805. Entries of the table hold GMPLS extended RSVP-TE messages and other messages received from the monitoring agents A 21 and B 22.

The capture point information 801 contains a capture date/time 8011 and the capturer monitoring agent identifier 8012. The capture date/time 8011 indicates the time when a GMPLS extended RSVP-TE message is captured. The capturer monitoring agent identifier 8012 indicates the identifier of the monitoring agent that has captured the message.

The IP header information 802 contains a sender IP address 8021 and a destination IP address 8022. Stored as 8021 and 8022 is information extracted from the IP header of the captured GMPLS extended RSVP-TE message packet.

The RSVP information 803 contains an RSVP message type 8031, a session identifier 8032, a refresh interval 8033, a label 8034, an RSVP_HOP 8038, SENDER_TEMPLATE 8039, and other RSVP objects 8035 to 8037. Stored in those fields is the exact data contained in the captured GMPLS extended RSVP-TE message.

The link identifier 804 holds a link identifier derived by the path establishment control protocol message receiving module 301 by searching the table of the link state information accumulating module 312 or of the I/F connection relation holding module 324 with the RSVP_HOP object.

Specifically, in the case of a PATH message, a value entered in the IF_ID field of IF_ID TLV which is contained in the RSVP_HOP object is stored as an upstream I/F identifier 8041. Then the identifier of a connection destination interface which is indicated by the IPv4Addr field and IF_ID field of IF_ID TLV is obtained by consulting with the I/F connection relation holding module 324. The obtained connection destination interface identifier is stored as a downstream I/F identifier 8042. In the case of an RESV message, a value entered in the IF_ID field of IF_ID TLV which is contained in the RSVP_HOP object is stored as the downstream I/F identifier 8042. Then the identifier of a connection destination interface which is indicated by the IPv4Addr field and IF_ID field of IF_ID TLV is obtained by consulting with the I/F connection relation holding module 324. The obtained connection destination interface identifier is stored as the upstream I/F identifier 8041.

In the example of FIG. 9, the PATH message captured information 521 and 522 and RESV message captured information 523 and 524 of FIG. 5 are received, and four entries for the four notifications are held.

The entry in the first row is for a PATH message. Therefore, in the first row, 1002 which is the value entered in the IF_ID field of the RSVP_HOP 8038 is stored as the upstream I/F identifier 8041. Then the interface connection relation table 210 is searched for an entry whose link end A field holds a combination (192.168.100.1, 1002), which is a combination of the values entered in the IPv4Addr field and IF_ID field of the RSVP_HOP 8038. The link end B field of the found entry is looked up to obtain a value entered as the I/F identifier B. The obtained value, 1001, is stored as the downstream I/F identifier 8042.

In the second row entry of FIG. 9, values obtained by the same procedure as the one employed in the first row are stored as the upstream I/F identifier 8041 and the downstream I/F identifier 8042.

The entry in the third row of FIG. 9 is for an RESV message. Therefore, in the third row, 1001 which is the value entered in the IF_ID field of the RSVP_HOP 8038 is stored as the downstream I/F identifier 8042. Then the interface connection relation table 210 is searched for an entry whose link end A field holds a combination (192.168.100.3, 1001), which is a combination of the values entered in the IPv4Addr field and IF_ID field of the RSVP_HOP 8038. The link end B field of the found entry is looked up to obtain a value entered as the I/F identifier B. The obtained value, 1002, is stored as the upstream I/F identifier 8041.

In the fourth row entry of FIG. 9, values obtained by the same procedure as the one employed in the third row are stored as the upstream I/F identifier 8041 and the downstream I/F identifier 8042.

The refresh timeout time 805 is derived from the capture date/time 8011 and the refresh period 8033. According to RSVP Version 1 (IETF, RFC 2205, R. Braden et al., "Resource ReSerVation Protocol (RSVP)— Version 1 Functional Specification"), which is the premise of GMPLS RSVP-TE, a timeout time L is expressed with a refresh period R and a constant K as $L \geq (K+0.5) \times 1.5 \times R$. A suggested value for the constant K refers to 3, which makes $L \geq 5.25R$. In short, a value obtained by the formula (capture date/time 8011)+5.25×(refresh period 8033) is stored as the refresh timeout time 805.

For instance, in the first row entry where the refresh period 8033 is 30 seconds, the value of the formula 5.25×Refresh period refers to 2'37.5". The obtained value is added to the capture date/time value 2004/6/1 10:20:30.351, thereby obtaining a refresh timeout time 2004/6/1 10:23:07.851, which is stored as the refresh timeout time 805.

FIG. 10 is a configuration diagram of the link state information accumulating table 90.

The link state information accumulating table 90 is held in the link state information accumulating module 312.

The link state information accumulating table 90 contains columns of capture point information 901, IP header information 902 and OSPF link state information 903.

The capture point information 901 contains a capture date/time 9011 and a capturer monitoring agent identifier 9012. The capture date/time 9011 indicates the time when a GMPLS extended OSPF-TE message is captured. The capturer monitoring agent identifier 9012 indicates the identifier of the monitoring agent that has captured the message.

The IP header information 902 contains a sender IP address 9021 and a destination IP address 9022. Stored as 9021 and 9022 is IP header information of the captured GMPLS extended OSPF-TE message packet.

The OSPF link state information 903 contains an advertising router's identifier 9031, a link identifier 9032 and link attributes 9033 to 9035. Stored as 9031, 9032 and 9033 to 9035 are the exact values that have been entered in the corresponding fields of the captured GMPLS extended OSPF-TE message.

In other words, the advertising router's identifier 7031 of the GMPLS extended OSPF-TE message 70 is stored as the advertising router's identifier 9031. The link identifier 7032 of the GMPLS extended OSPF-TE message 70 is stored as the link identifier 9032. The link attributes 7033 to 7035 of the GMPLS extended OSPF-TE message 70 are stored as the link attributes 9033 to 9035, respectively.

An attribute metric stored as the link attribute n (9035) sometimes takes a specific value the infinite. This indicates that the link in question has become unusable. In GMPLS extended OSPF-TE, which band is available to a link and like other attributes can be exchanged as link attributes, and a link may be deemed as unusable when the link's available band drops below a given value.

The link state change detection module 313 monitors these values to detect a failure in a link.

The example of FIG. 10 shows a state of the table 90 at a certain moment when OSPF messages being exchanged among the GMPLS switches 31 to 33 in the communication network of FIG. 1 where received and accumulated.

Each entry indicates the state of a unidirectional link which extends from a GMPLS switch that is indicated by the advertising router's identifier 9031 toward a GMPLS switch that is indicated by the link identifier 9032. In OSPF, a link state advertisement created by a certain GMPLS switch is propagated throughout the network, and therefore plural monitoring agents capture the same message of the OSPF link state information 903. For instance, the first entry and second entry sown in FIG. 10 have the same value as that of the OSPF link state information 903 whereas they have different values in terms of those of the capture point information 901 and the IP header information 902. The first row entry is for a message created by the GMPLS switch A, which is indicated by an advertising router's identifier 192.168.100.1, and the second row entry is for a message transferred by the GMPLS switch B, which has received the message of the first row entry, to the GMPLS switch C. In other words, the entries of the first and second rows indicate the same link state.

Data of the link state information accumulating table 90 in FIG. 10 may be used to determine what data the interface connection relation management table 210 contains. A procedure thereof will be described. From the link state information accumulating table 90, combinations of four attribute values (the link identifier 9032, the link attribute 1 (9033) containing link_local_id, and the link attribute 2 (9034) containing link_remote_id) are taken out chronologically. When the link is judged as usable by estimating, for example, its attribute metric, the combinations of the four attribute values are respectively stored in the four fields of the interface connection relation management table 210 (the router's identifier A 21011, the I/F identifier A 21012, the router's identifier B 21021, and the I/F identifier B 21022). When a link is judged as unusable, entries of the interface connection relation management table 210 that match the combinations of the four attribute values are deleted.

FIG. 11 is a configuration diagram of an I/F state information accumulating table 100.

The I/F state information accumulating table 100 is held in the I/F state information accumulating module 322.

The I/F state information accumulating table 100 contains columns of obtained point information 1001, an interface identifier 1002, and an interface attribute 1003.

The obtained point information 1001 contains an obtained date/time 10011 and a router's identifier 10012. Stored as the obtained date/time 10011 is the date/time when the interface attribute 1003 is received. Stored as the router's identifier 10012 is a GMPLS switch identifier.

The interface identifier 1002 indicates the identifier of a communication interface of a GMPLS switch. Combined with the router's identifier 10012, the interface identifier 1002 identifies a communication interface uniquely throughout the communication network 2 to be managed.

The interface attribute 1003 contains an IP address 10031 and an operational state 10032. In the case of a network configuration where the IP address 10031 is not assigned to communication interfaces, cells for the IP address 10031 are left blank. When a value is stored as the IP address 10031, a communication interface of the GMPLS switch can be identified by the IP address 10031. The interface attribute 1003 may also contain communication interface attributes concerning the quality of communications, such as the number of packets passing through the communication interface, the power of received laser light, and a bit error rate (BER). In the case where the interface attribute 1003 includes information concerning the communication quality of a communication interface, the quality of an optical path can be grasped.

FIG. 12 is a configuration diagram of a cross connection information accumulating table 110.

The cross connection information accumulating table 110 is held in the cross connection information accumulating module 305.

The cross connection information accumulating table 110 contains columns of a state change date/time 1101, a router's identifier 1102, data incoming interface information 1103, data outgoing interface information 1104, an operational state 1105, and a session identifier 1106. The cross connection information accumulating table 110 use these pieces of information to show the state of a cross connection on the GMPLS switch.

The data incoming interface information 1103 contains an incoming interface identifier 11031 and an incoming label 11032. The data outgoing interface information 1104 contains an outgoing interface identifier 11041 and an outgoing label 11042.

Each entry of the table 110 is created in such a manner that the cross connection information deriving module 304 infers the state of a cross connection on the GMPLS switch by analogy based on data in the path establishment control information accumulating table 80 of the path establishment control information accumulating module 302 and data in the link state information accumulating table 90. The processing of deriving cross connection information will be described later with reference to FIG. 19 and FIGS. 22A to 22C.

The example of FIG. 12 shows a state of the cross connection information accumulating table 110 upon completion of the cross connection information deriving processing following reception of the PATH message captured information 521 and 522 and the RESV message captured information 523 and 524.

Figure 23:
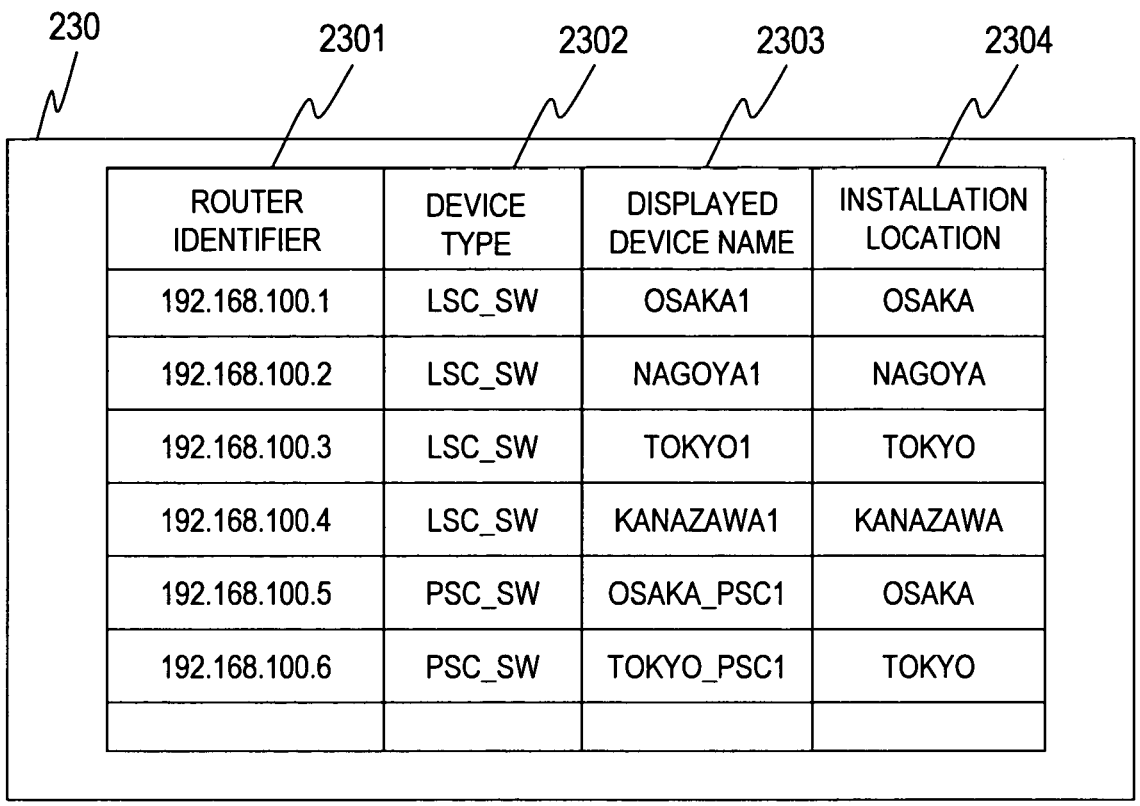
FIG. 23 is a configuration diagram of a device management table according to the first embodiment.

FIG. 23 is a configuration diagram of a device management table 230.

The device management table 230 is stored in the device information holding module 326.

The device management table 230 contains columns of a router identifier 2301, a device type 2302, a device display name 2303, and an installation location 2304. With these pieces of information, the device management table 230 shows attributes of the GMPLS switches A31 to C33 included in the communication network 2 for each GMPLS switch identified by the router identifier 2301. The device management table 230 is manually set by the network administrator in advance, and is kept permanently.

FIG. 24A is a configuration diagram of a path management table 240.

The path management table 240 is kept in the path information holding module 327.

The path management table 240 contains columns of a type of path 2401, a session identifier 2402, an LSP_ID 2403, an establishment status 2404 and a passing point list 2405. With these pieces of information, the path management table 240 shows attributes of a communication path established in the network 2 to be managed. Values in each row of the device management table 230 are derived through path establishment detecting processing of the cross connection information deriving module 304.

The type of path 2401 indicates a method of multiplexing a partial connection constituting a path, or a unit of switching cross connections. The type of path 2401 stores a value that is based on an attribute called a switching capability of a path in the GMPLS standard. In the example of FIG. 24A, the first row represents a path that is constituted of cross connections on a wavelength-basis in wavelength multiplexing and whose switching capability is LSC (Lambda Switching Capable). The value LSC is therefore stored as the type of path 2401.

Each row of path management table 240 is created by the cross connection information deriving module 304 by estimating the state of a cross connection in a GMPLS switch from the path establishment control information accumulating table 80 and from the link state information accumulating table 90 held in the path establishment control information accumulating module 302. The cross connection information deriving processing will be described later with reference to FIG. 19 and FIGS. 22A to 22C.

Thus the processing of deriving a cross connection state and a partial connection state to give the former to the cross connection information accumulating module 305 and the latter to the path establishment control information accumulating module 302 is completed, and now every piece of information necessary to manage the configuration of a control path is available.

The description will be made about a method to draw information for assisting the network management work by using the prepared information.

Figure 25:
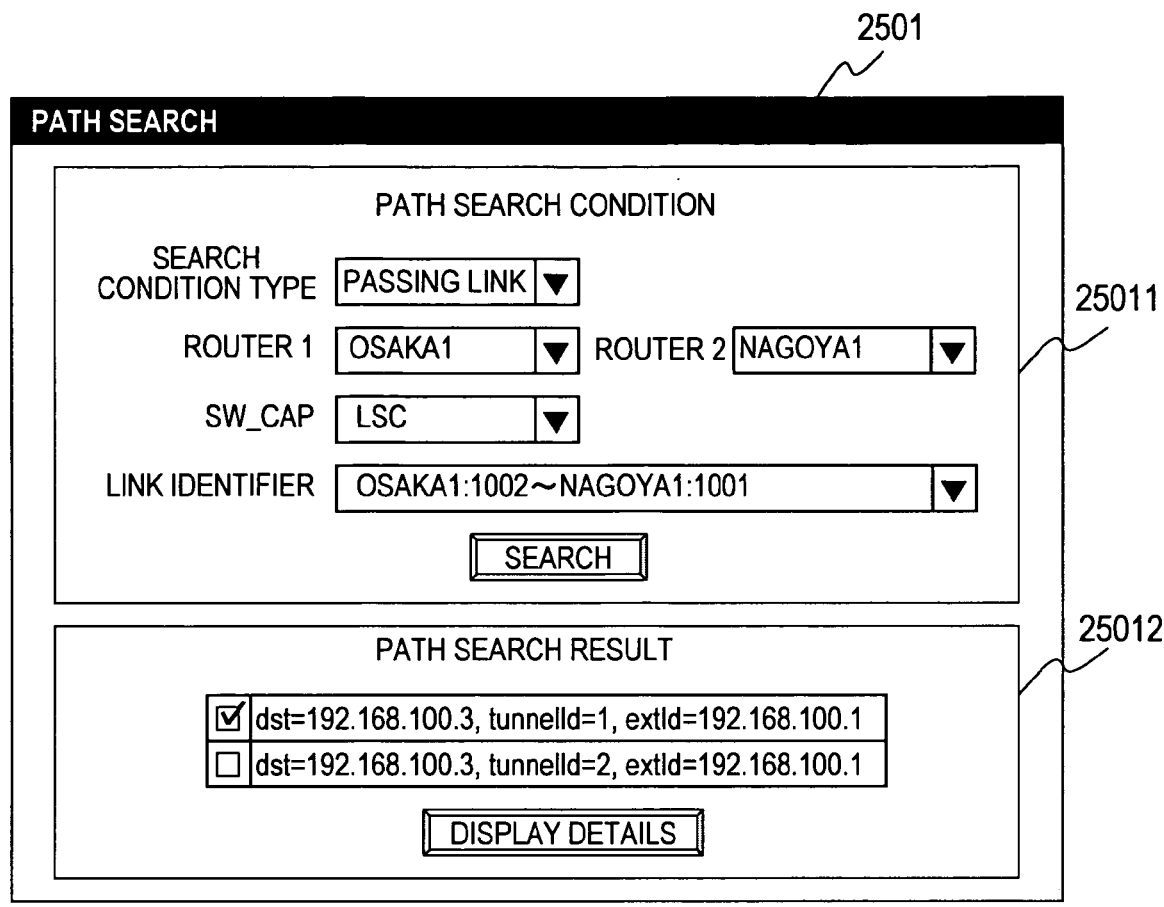
FIG. 25 is a diagram showing an example of a screen of a monitoring manager according to the first embodiment.

FIG. 25 shows a configuration example of a screen for receiving a path search request from an operator of the communication path management system 1. The screen is displayed on the input/output module 206 through processing of the monitoring result displaying module 315.

Figure 26A:
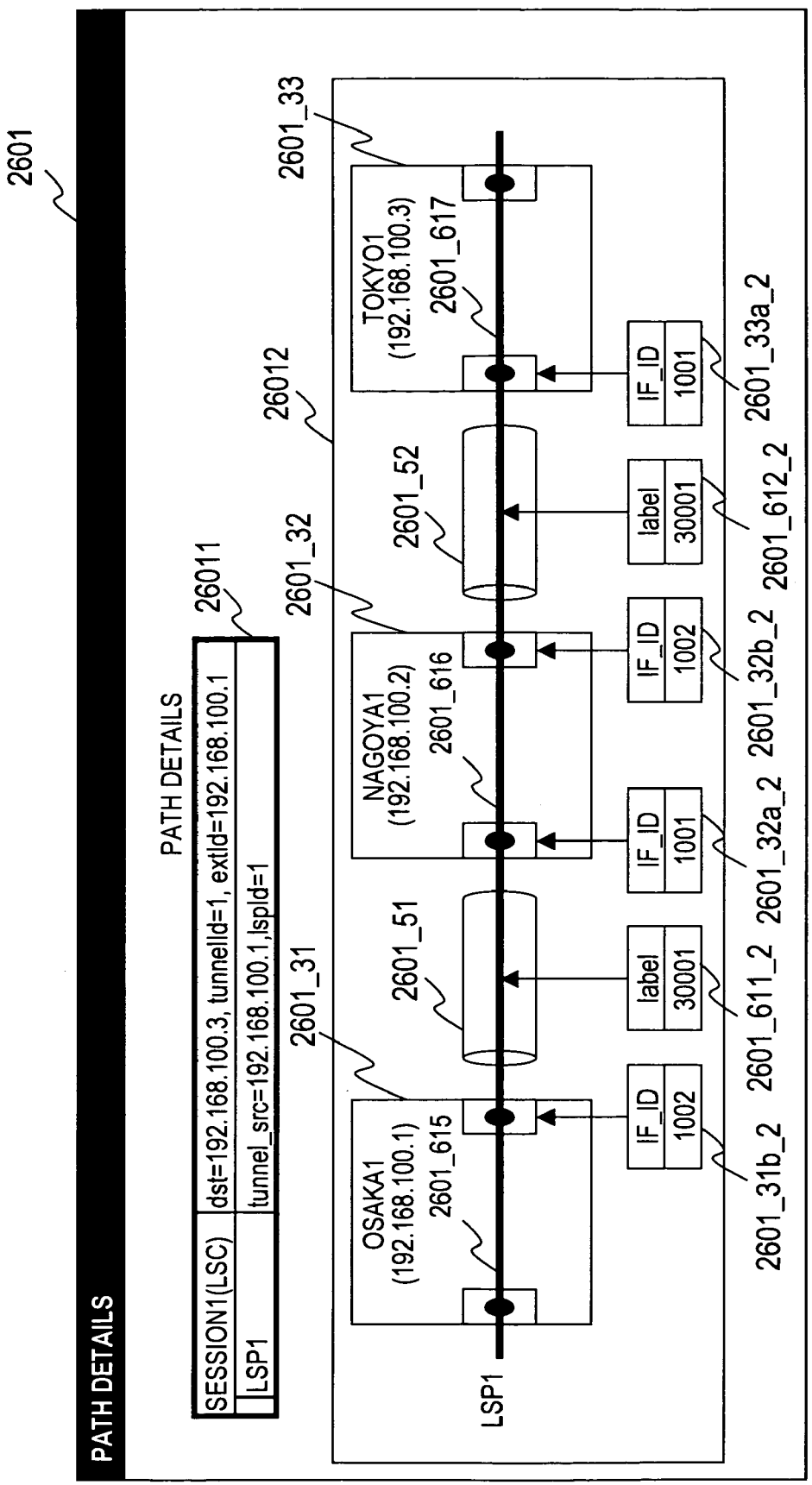
FIG. 26A is a diagram showing an example of a screen of a monitoring manager according to the first embodiment.
Figure 26B:
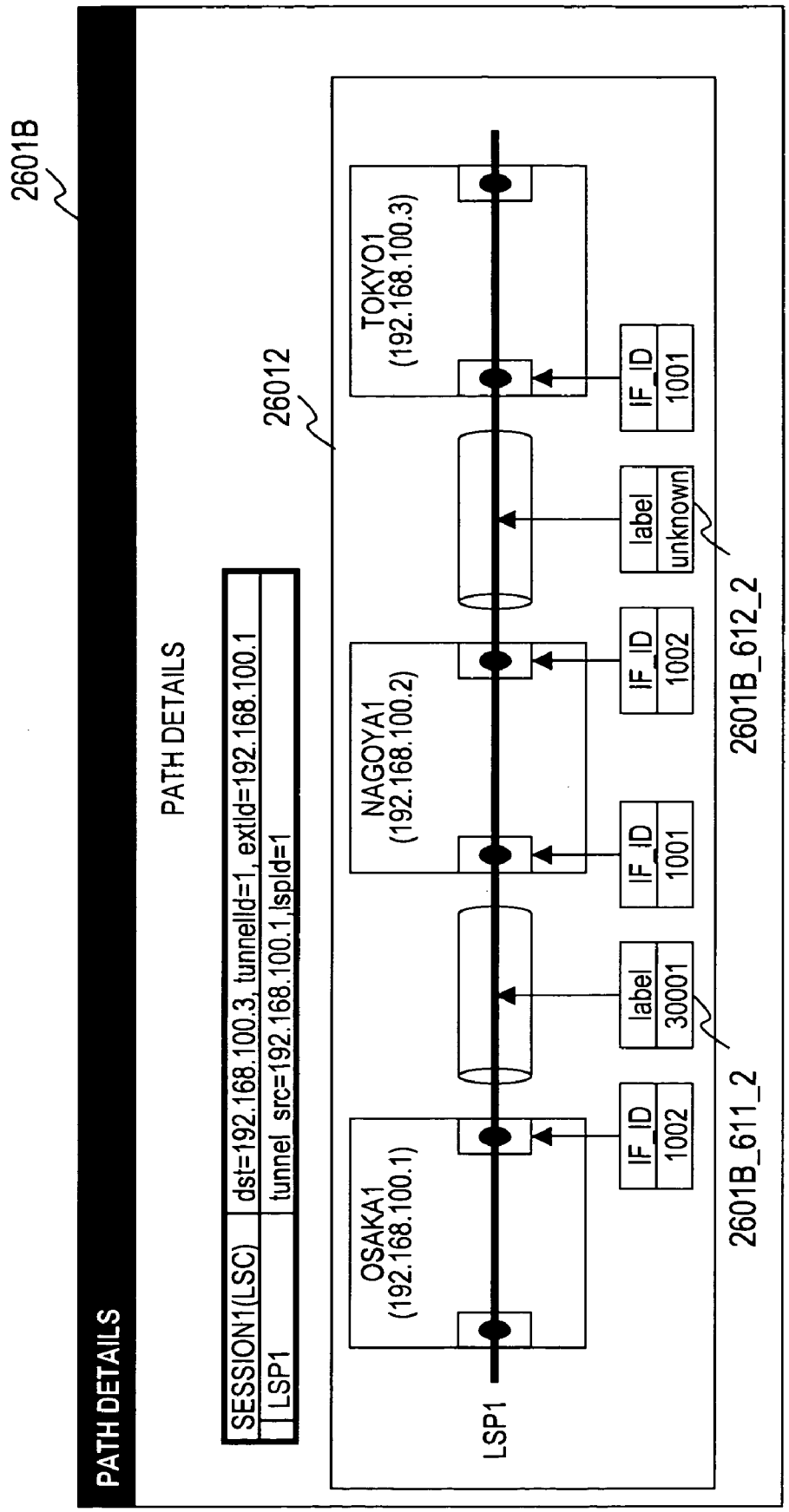
FIG. 26B is a diagram showing an example of a screen of a monitoring manager according to the first embodiment.

A path search request screen 2501 contains a path search condition area 25011 and a path search result area 25012. The operator enters conditions in accordance with the search condition type in the path search condition area 25011, and operates a search button. This causes the system to issue an inquiry to the service relationship searching module 314. A list of paths that meet the conditions is thus obtained and displayed in the path search result area 25012. From the displayed path list, the operator selects a path of which configuration the operator wishes to be displayed. When a details button is operated in this state, details of the path are displayed as follows:

FIG. 26A shows a configuration example of a screen for displaying path details. The screen is displayed on the input/output module 206 through processing of the monitoring result displaying module 315.

A path details displaying screen 2601 contains a path outline area 26011 and path details area 26012. The path details area 26012 shows path configuration details with GMPLS switch icons 2601_31 to 2601_33, link icons 2601_51 and 2601_52, communication interface attribute icons 2601_31b_2, 2601_32a_2, 2601_32b_2, and 2601_33a_2, partial path attribute icons 2601_611_2 and 2601_612_2, and the like.

Figure 13:
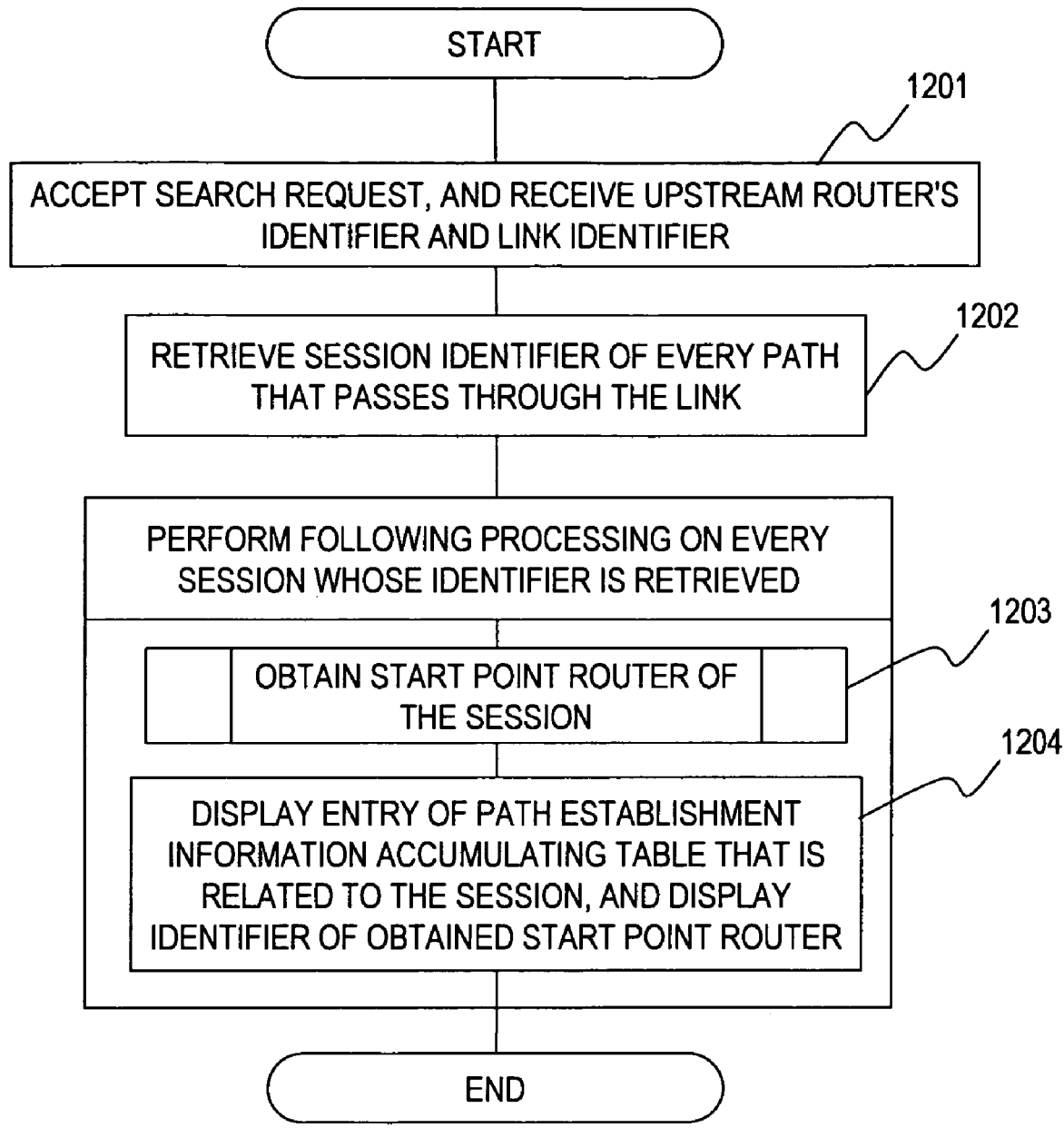
FIG. 13 is a flow chart of processing to derive a list of paths that pass through a designated link according to the first embodiment.

FIG. 13 is a flow chart of processing to derive a list of paths that pass through a designated link. This processing is executed when the service relationship searching module 314 receives a search request from an operator of the communication path management system 1. In other words, this processing is executed when the search button is operated on the path search request screen 2501 after "passing link" is chosen as the search condition type and a selection is made from the pull-down menus of router1, router2, SW_CAP, and link identifier.

First, the service relationship searching module 314 receives a router's identifier and a link identifier (1201). The router's identifier is of a router upstream of a link that is designated in a search request from an operator of the communication path management system 1 via the input/output module 206. The link identifier is of this designated link.

Thereafter, the session identifier 8032 of every path that passes through this link is retrieved from the path establishment control information accumulating table 80 (1202).

For every session of which the session identifier is retrieved from the table 80, a start point router of the session is obtained (1203). The processing of obtaining the start point router will be described later with reference to FIG. 14.

The identifier of the obtained start point router is outputted, along with an entry, which is related to this session, of the path establishment control information accumulating table 80, to the monitoring result displaying module 315 to be displayed on the input/output module 206 (1204).

The processing of the steps S1203 to S1204 is executed for every session of which the session identifier is retrieved from the table 80.

Figure 14:
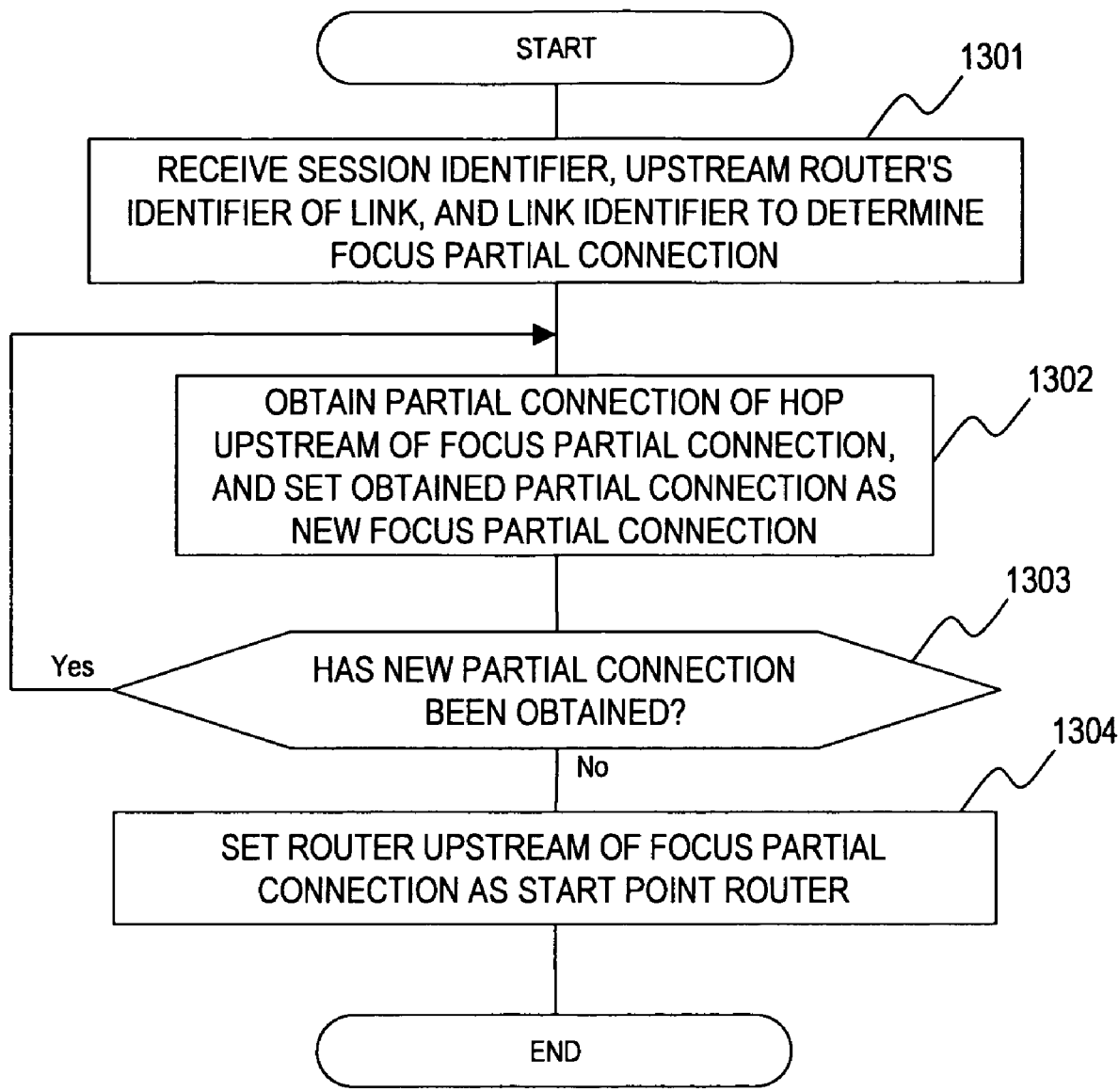
FIG. 14 is a flow chart of processing to obtain a starting point router of a designated session according to the first embodiment.

FIG. 14 is a flow chart of processing to obtain a starting point router of a designated session, and this processing is executed by the service relationship searching module 314.

First, a session identifier, the router's identifier of a router upstream of a link, and the identifier of the link are received. A partial connection identified by these identifiers is defined as a focus partial connection (1301).

Thereafter, the cross connection information accumulating table 110 is consulted to obtain a partial connection of an upstream hop with respect to the partial connection. The obtained partial connection of the upstream hop is defined as a new focus partial connection (1302).

Next, it is judged whether a new partial connection has been obtained (1303). When a new partial connection has been obtained, the processing returns to the step S1302, thereby obtaining a further upstream partial connection.

When a new partial connection has not been obtained, a router upstream of the focus partial connection is defined as the start point router (1304), thereby completing this processing.

Figure 15:
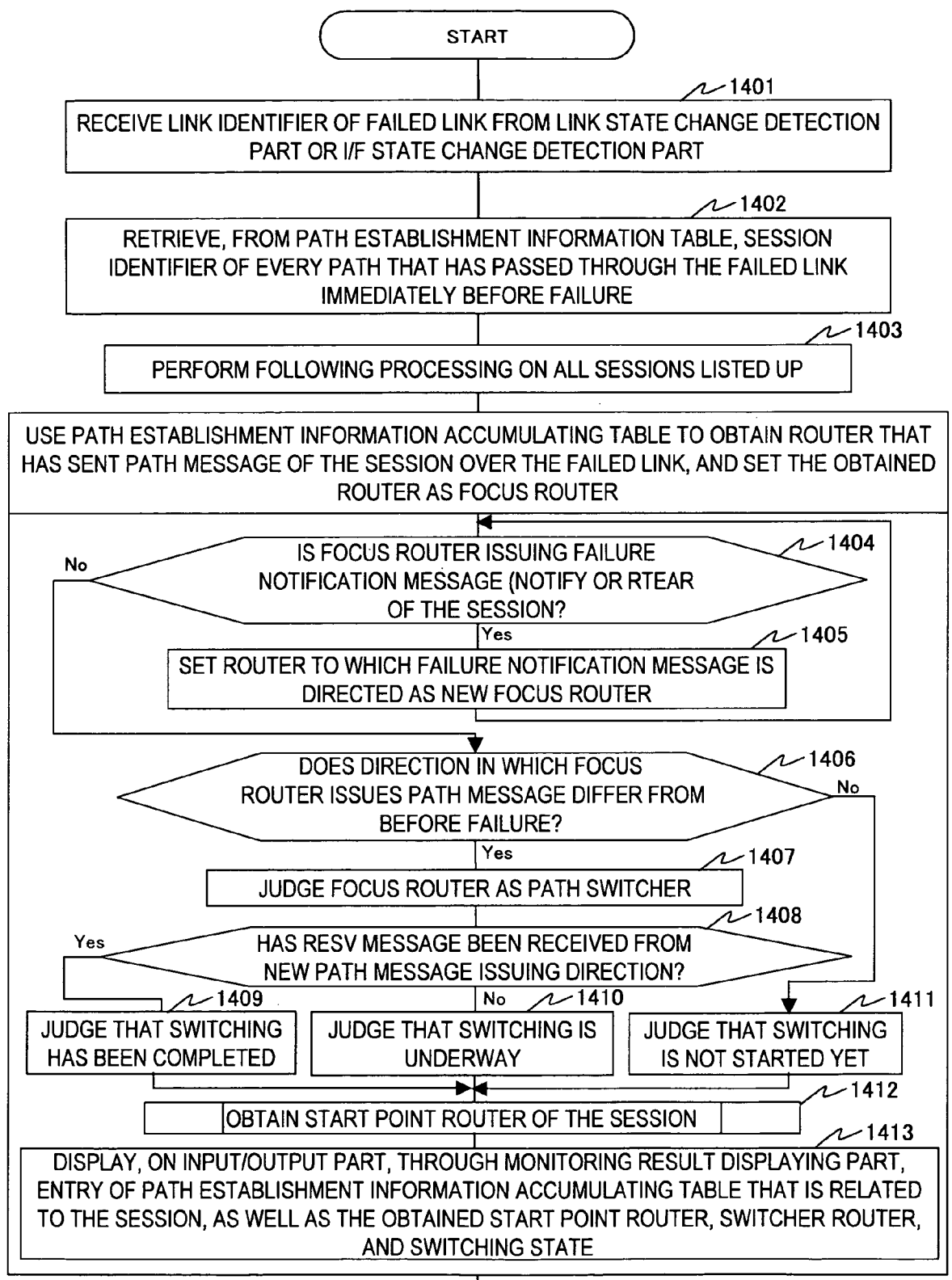
FIG. 15 is a flow chart of processing to derive which communication path is affected by a link failure upon detection of the failure according to the first embodiment.

FIG. 15 is a flow chart of processing to derive a communication path which will be affected by a link failure upon detection of the failure. This processing is executed by the service relationship searching module 314.

First, the link identifier of a link where a failure has occurred is received from the link state change detection module 313 or the I/F state change detection module 323 (1401).

Thereafter, the session identifier 8032 of every path that has passed through the failed link immediately before the occurrence of the failure is retrieved from the path establishment control information accumulating table 80 (1402).

Every session of which the session identifier is retrieved from the table 80 will be subjected to the following processing:

First, a router that has sent a PATH message of the above-mentioned session on the failed link is obtained with the use of the path establishment control information accumulating table 80, and is set as a focus router (1403). In the processing of obtaining the sender router, the path establishment control information accumulating table 80 is searched for an entry whose sender IP address 8021 matches the router's identifier contained in the designated link identifier and whose RSVP_HOP 8038 holds a communication interface identifier of the upstream router that matches the interface identifier contained in the designated link identifier.

Next, it will be judged whether the focus router is issuing a failure notification message (NOTIFY or RESV_TEAR) of this session (1404). When the focus router is issuing the failure notification message of the session, a router to which the failure notification message is directed is defined as a new focus router (1405). The processing then returns to the step S1404, where the failure notification message is traced further upstream.

On the other hand, when the focus router is not issuing a failure notification message of the session, the processing proceeds to step S1406.

In other words, a failure notification message of the session is traced upstream to locate a router issuing the message, and the process will be repeated until such a router is no longer found.

Next, the path establishment control information accumulating table 80 is used to judge whether the focus router is issuing a PATH message in a direction different from the one prior to the failure (1406). Whether the direction in which a PATH message is issued differs from before the failure is judged by whether the cross connection information accumulating table 110 has separate entries of the same session that hold date/time close to each other when the state change date/time 1101 is traced.

When it is judged as a result that the focused router is issuing a PATH message in a different direction, the focus router is regarded as a path switcher (1407). On the other hand, when the focus router is not issuing a PATH message in a different direction, it is judged that path switching has not started yet (1411).

Judged next is whether an RESV message has been received from the new PATH message issuing direction (1408). Whether an RESV message has been received is judged by whether the corresponding entry of the cross connection information accumulating table 110 is holding a value as the outgoing label 11042. When there is a value stored as the outgoing label 11042, it means that an RESV message has already been received. When there is no value stored as the outgoing label 11042, it means that no RESV message has been received.

When it is judged as a result that an RESV message has been received, path switching is regarded as completed (1409). On the other hand, when an RESV message has not been received yet, it is judged that path switching is underway (1410).

Then the method described above with reference to FIG. 14 is used to obtain the start point router of the session (1412). The obtained start point router, switcher router, and switching state are outputted, along with an entry of the path establishment control information accumulating table 80 that is related to the session, to the monitoring result displaying module 315 to be displayed on the input/output module 206 (1413).

The processing of the steps S1403 to S1413 is executed for every session of which the session identifier is retrieved from the table 80.

It should be noted that, during the processing of the steps S1403 to S1413, it is judged whether the operator has requested to cancel the display. In the case where the operator has not requested to cancel the display, the processing of the steps S1403 to S1413 is repeatedly executed for every session of which the session identifier is retrieved from the table 80. On the other hand, in the case where the operator has requested to cancel the display, the processing is terminated without finishing the processing for every session whose identifier is retrieved.

Figure 16:
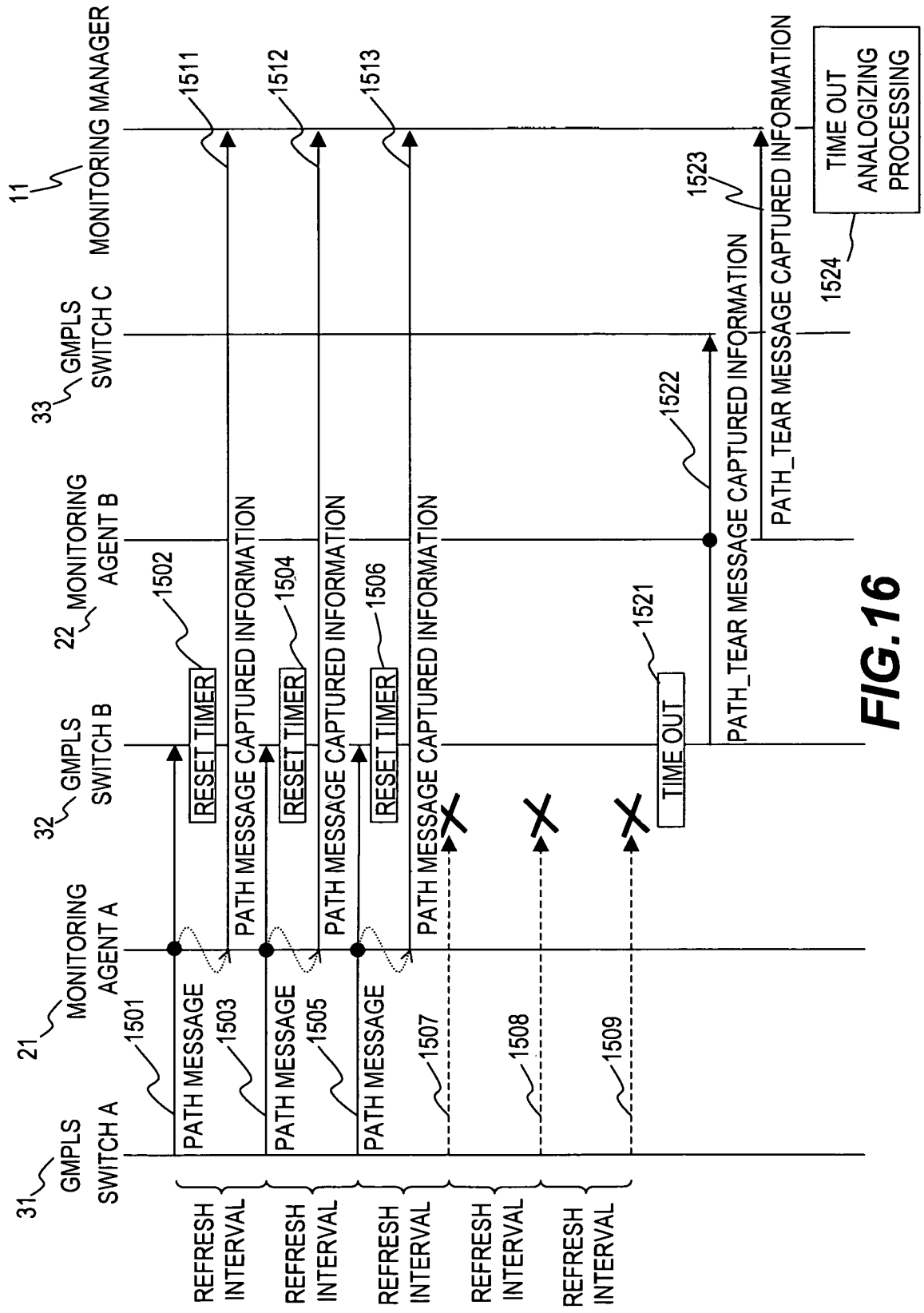
FIG. 16 is a sequential diagram of a situation in which an unplanned disconnection of a communication path occurs at the discretion of an intermediate node according to the first embodiment.

FIG. 16 is a sequential diagram of a situation in which an unplanned disconnection of a communication path occurs at the discretion of an intermediate node.

The sequence shown in FIG. 16 includes phenomena conforming to operation rules of GMPLS extended RSVP-TE plus exchanges with the communication path management system 1 according to this invention.

In GMPLS extended RSVP-TE, the GMPLS switches regularly exchange the same message in a cycle indicated by the refresh interval 604 of the GMPLS extended RSVP-TE message 60 (1501, 1503, 1505).

The GMPLS switch that receives the message resets the timer value each time the message is received (1502, 1504, 1506), and issues a PATH_TEAR message when the next message of the same session is not received within a certain period of time derived from the refresh interval 604 (for example, a time period three times longer than the refresh interval) (1522). With the issuance of the PATH_TEAR message, resources of downstream partial connections and cross connections are released. This is to prevent a situation where downstream resources are failed to be released due to a message loss, a failure in an intermediate node, or the like. However, the communication path 61 could be disconnected unexpectedly due to a temporary failure or a reduction in quality in the control message forwarding apparatus or in a link between the control message forwarding apparatus.

Although not shown in FIG. 16, a PATH message from the GMPLS switch B 32 to the GMPLS switch C 33, an RESV message from the GMPLS switch C 33 to the GMPLS switch B 32, and an RESV message from the GMPLS switch B 32 to the GMPLS switch A 31 are similarly issued for each refresh interval. The refresh interval may vary from one link to another or from one message type to another.

In the example of FIG. 16, PATH messages 1507 to 1509, which should be received by the GMPLS switch B 32, are lost. Because of the loss, the GMPLS switch B 32 judges as time out (1521) and downstream resources of the path 61 are erroneously released (1522).

The PATH messages 1501, 1503, and 1505 are captured by the monitoring agent A 21, and the monitoring manager 11 is notified of the capture (1511 to 1513). A PATH_TEAR message that is issued due to time out is captured by the monitoring agent B 22, and the monitoring manager 11 is notified of the capture (1523).

The monitoring manager 11 executes time out analogizing processing to judge whether the received PATH_TEAR message copy 1523 has been issued because of a normal path disconnection or because of an unplanned communication path disconnection due to time out or the like (1524). Details of the time out analogizing processing will be described later with reference to FIG. 18.

When it is judged as a result that the PATH_TEAR message is caused by an unplanned communication path disconnection due to time out or the like, a message to that effect is outputted to the monitoring result displaying module 315 to be displayed on the input/output module 206.

Figure 17:
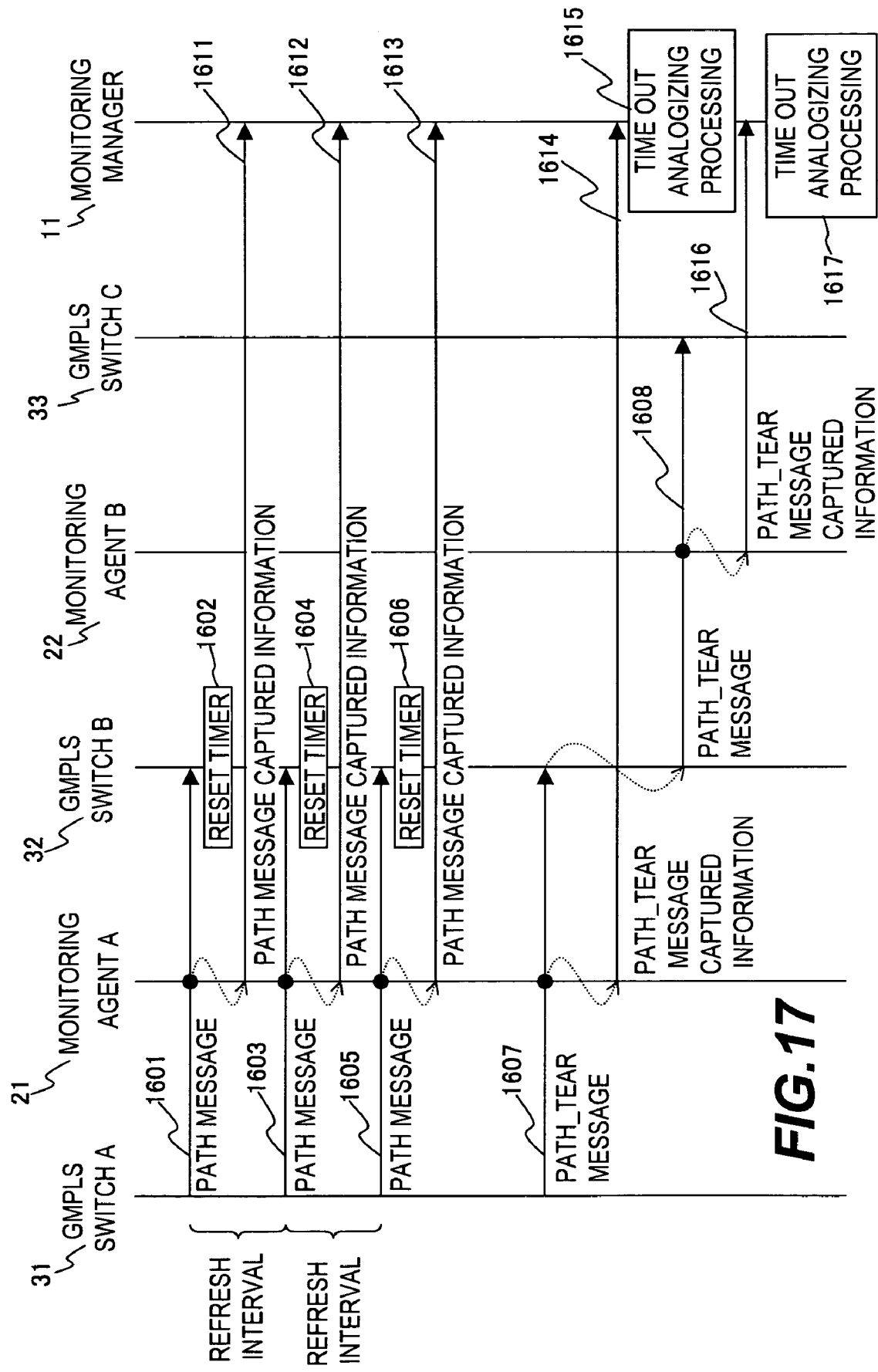
FIG. 17 is a sequential diagram of a situation in which a normal path disconnection takes place according to the first embodiment.

FIG. 17 is a sequential diagram of a situation in which a normal path disconnection takes place.

The sequence shown in FIG. 17 includes phenomena conforming to operation rules of GMPLS extended RSVP-TE plus exchanges with the communication path management system 1 according to this invention. As in the sequence shown in FIG. 16, the issuance of a PATH message from the GMPLS switch B 32 to the GMPLS switch C 33 and of an RESV message for each refresh interval is not shown in FIG. 17.

In the case of a normal path disconnection, PATH_TEAR messages are issued from the GMPLS switch A 31, which is the start point node of the communication path 61 to be disconnected, toward the GMPLS switch C 33, which is the end point node of the communication path 61 (1607, 1608). This releases all of partial connection and cross connection resources that are used by the communication path 61.

The PATH_TEAR messages 1607 and 1608 are captured by the monitoring agent A 21 or the monitoring agent B 22, and the monitoring manager 11 is notified of the capture (1614, 1616).

In a normal path disconnection, time out does not occur prior to the transmission and reception of the PATH_TEAR messages (1601, 1603, 1605). The PATH_TEAR messages are always transferred from the upstream to the downstream through each and every section of the communication path 61 without exception (1607, 1608).

Each time a PATH_TEAR message copy is received from one of the monitoring agents, the monitoring manager 11 executes time out analogizing processing to judge whether the received copy has been issued because of a normal path disconnection or because of an unplanned communication path disconnection due to time out or the like (1615, 1617). This time out analogizing processing is the same as the processing of the step S1524 of FIG. 16, and details of the processing will be described later with reference to FIG. 18.

When it is judged as a result that the PATH_TEAR message is caused by an unplanned communication path disconnection due to time out or the like, a message to that effect is outputted to the monitoring result displaying module 315 to be displayed on the input/output module 206. In the example of FIG. 17, it is judged that a normal path disconnection is the cause of issuance of the PATH_TEAR message.

Figure 18:
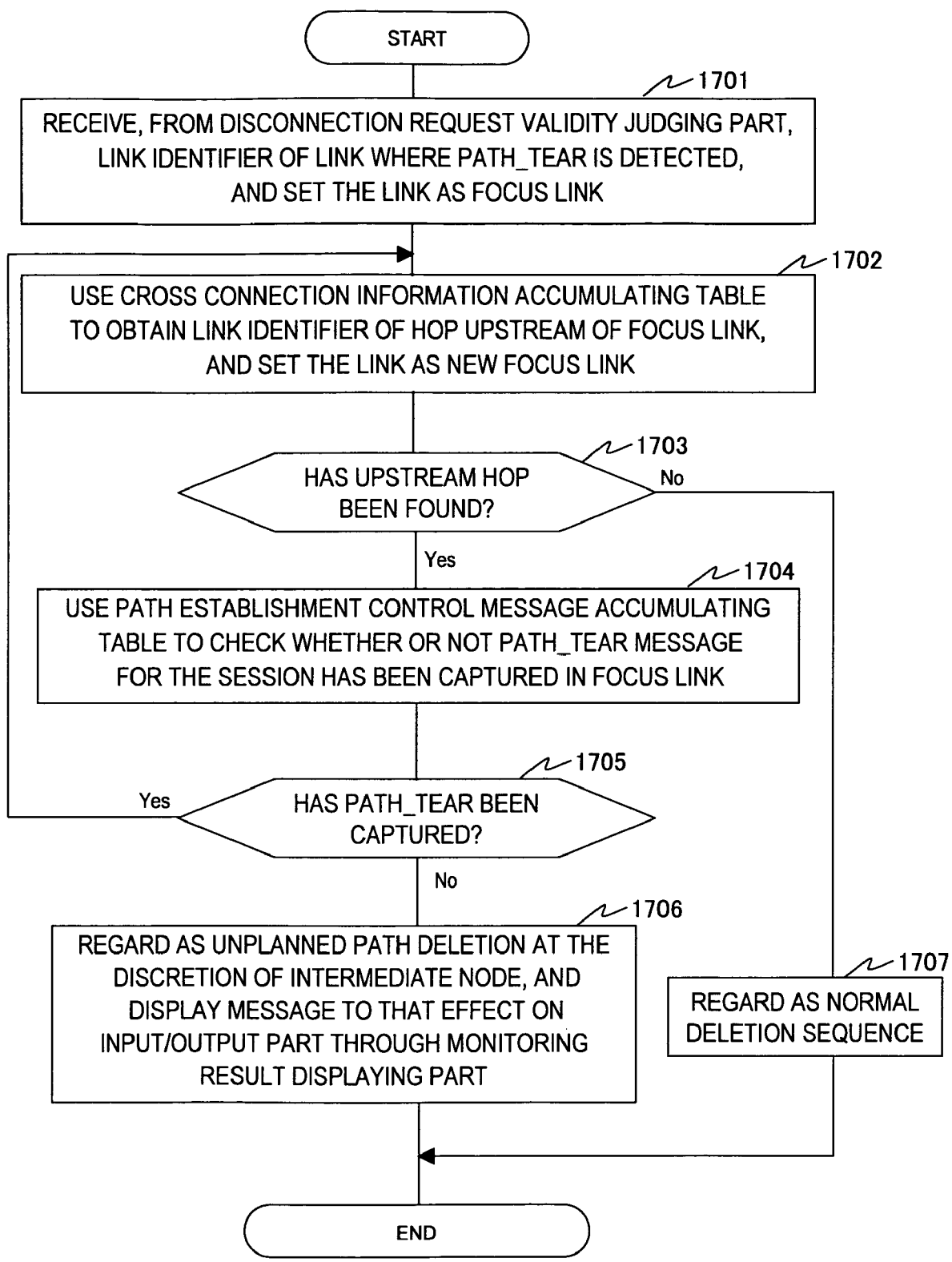
FIG. 18 is a flow chart of time out analogizing processing to derive an unplanned path disconnection at the discretion of an intermediate node according to the first embodiment.

FIG. 18 is a flow chart of time out analogizing processing to find out by analogy an unplanned path disconnection at the discretion of an intermediate node. This processing is executed by the disconnection request validity judging module 303.

The link identifier of a link where PATH_TEAR is detected is received from the disconnection request validity judging module 303, and this link is set as a focus link (1701).

Next, the cross connection information accumulating table 110 is consulted to obtain the link identifier of a link upstream of the focus link. The obtained link is defined as a new focus link (1702). Then, whether an upstream link (upstream hop) is found is judged (1703).

As a result, an upstream hop has not been found, it is judged as a normal deletion sequence (1707). In other words, a PATH_TEAR message is observed in every hop all the way to the start point router.

On the other hand, when an upstream hop has been found, the path establishment control information accumulating table 80 is consulted to check whether a PATH_TEAR message for the session has been captured in the focus link (1704).

Thereafter, whether the PATH_TEAR message has been captured is judged (1705).

When it is judged as a result that the PATH_TEAR message has been captured, the processing returns to the step S1702, where the link is traced further upstream. On the other hand, when the PATH_TEAR message has not been captured, it is judged that an unplanned communication path disconnection at the discretion of an intermediate node is the cause of issuance of the PATH_TEAR message. A message to that effect is outputted to the monitoring result displaying module 315 to be displayed on the input/output module 206 (1706).

Figure 19A:
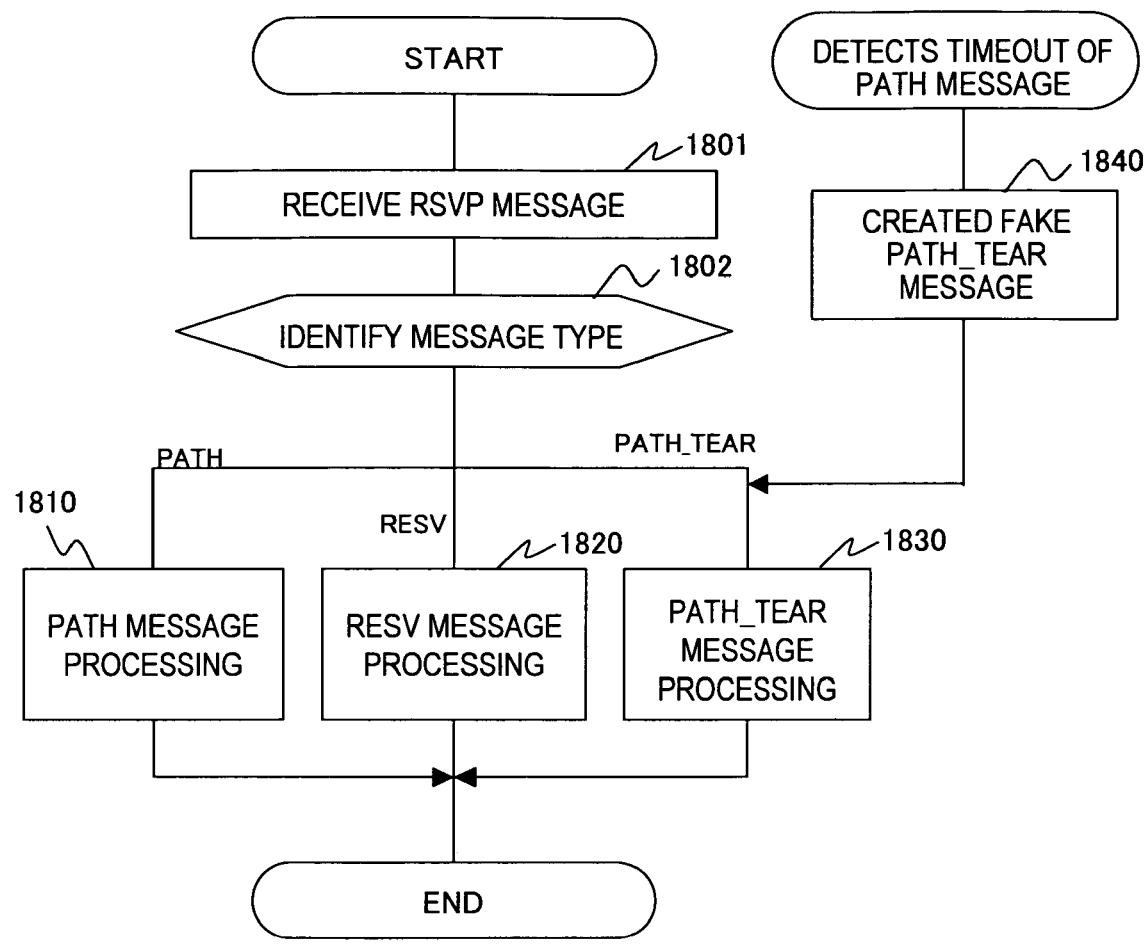
FIG. 19A is a flow chart of processing to derive a cross connection state according to the first embodiment.
Figure 19B:
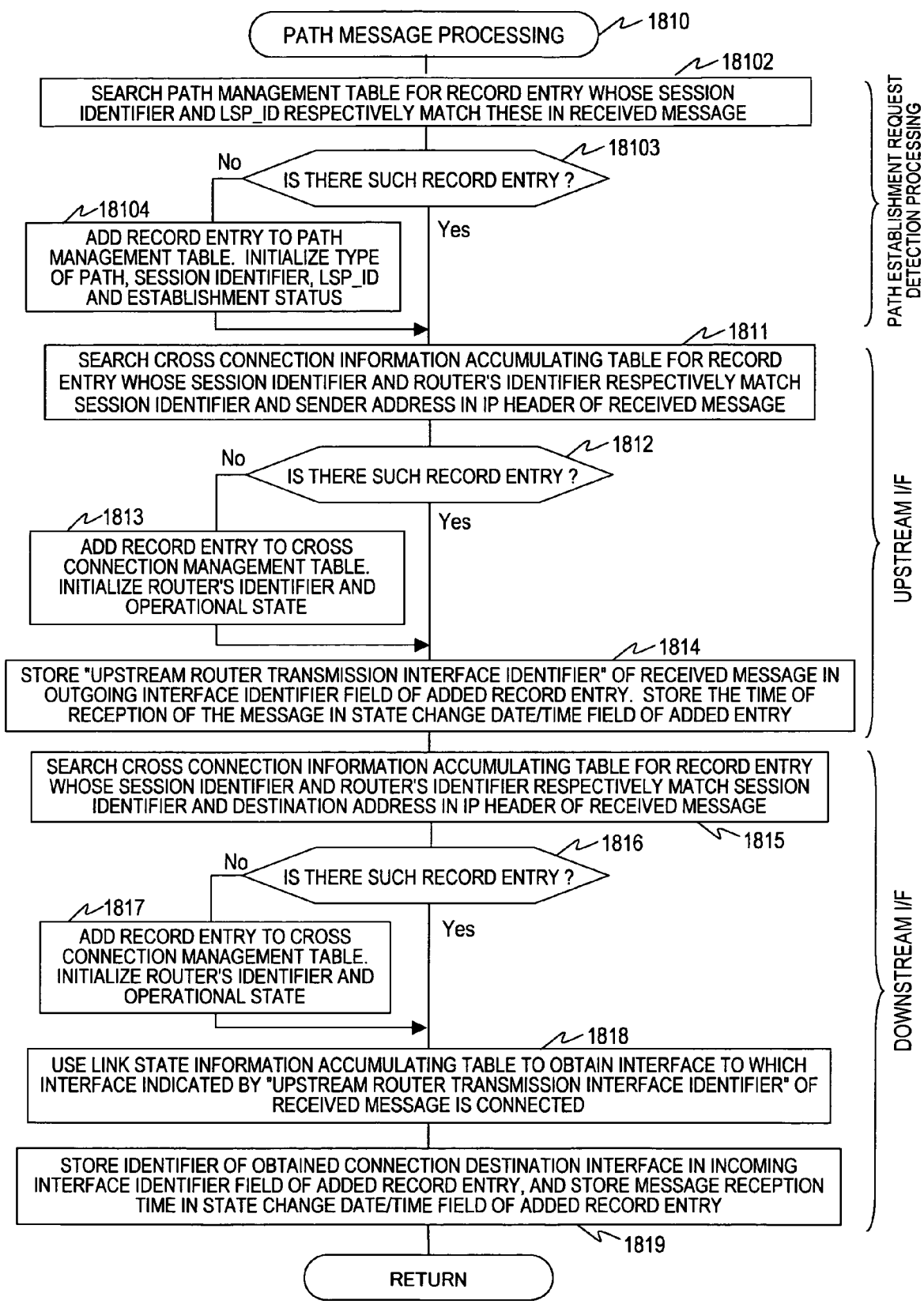
FIG. 19B is a flow chart of the processing to derive a cross connection state according to the first embodiment.
Figure 19C:
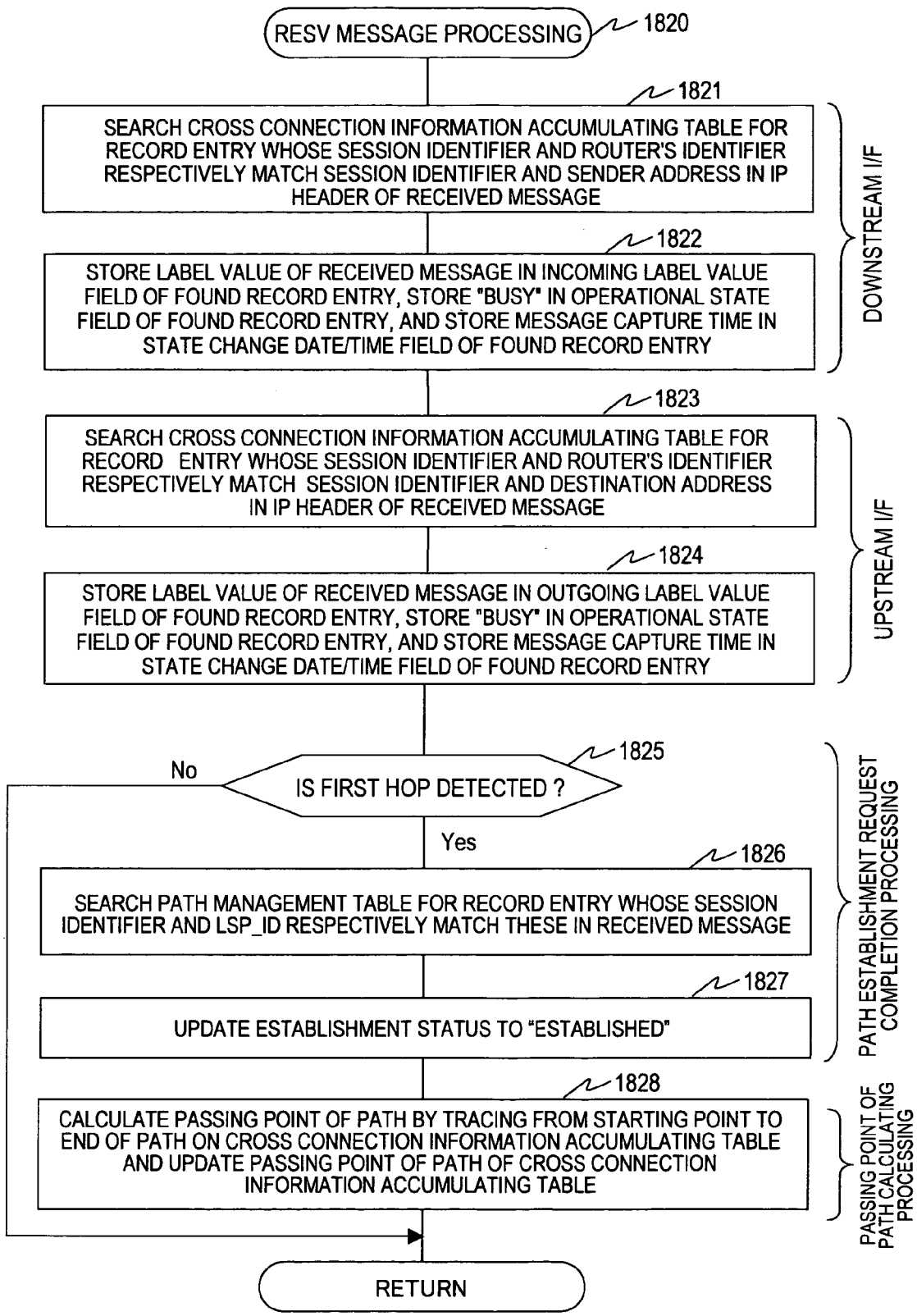
FIG. 19C is a flow chart of the processing to derive a cross connection state according to the first embodiment.
Figure 19D:
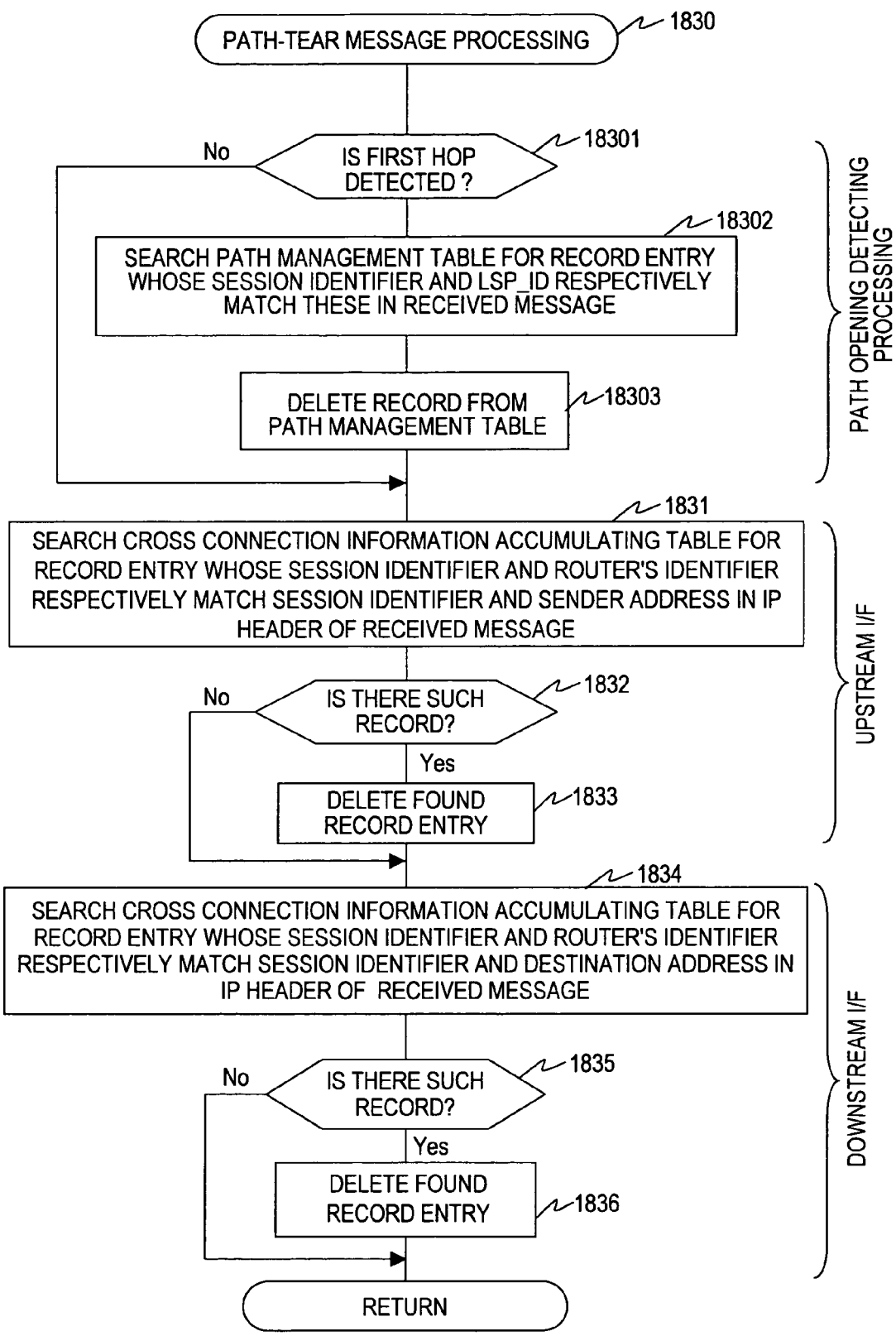
FIG. 19D is a flow chart of the processing to derive a cross connection state according to the first embodiment.

FIGS. 19A to 19D are flow charts of processing to derive a cross connection state. FIG. 19A shows main processing. FIG. 19B shows processing for a case where the received message is a PATH message. FIG. 19C shows processing for a case where the received message is an RESV message. FIG. 19D shows processing for a case where the received message is a PATH_TEAR message.

In this cross connection state deriving processing, the cross connection information deriving module 304 derives a cross connection state using the path establishment control information accumulating module 302 and the link state information accumulating module 312. The derived cross connection information is stored in the cross connection information deriving module 304. The cross connection state deriving processing is executed as entries of the path establishment control information accumulating table 302 are updated.

The cross connection information deriving module 304 receives an RSVP message (1801), and examines the RSVP message type 602 of the received RSVP message (1802).

As a result, when the received RSVP message is found out to be a PATH message, PATH message processing is executed (1810). When the received RSVP message is found out to be an RESV message, RESV message processing is executed (1820). When the received RSVP message is found out to be a PATH_TEAR message, PATH_TEAR message processing is executed (1830).

When the timer management module 325 detects the timeout of a PATH message, information equivalent to a PATH_TEAR message is created as a fake PATH_TEAR message (1840). Thus PATH_TEAR message processing is executed as if a PATH_TEAR message is received (1830). The fake PATH_TEAR message created at this point is obtained by employing the IP header information 802, session identifier 8032, RSVP_HOP 8038 and SENDER_TEMPLATE 8039 of a PATH message in the path establishment control information accumulating table 80 that is deemed as timeout, and by changing the value of the RSVP message type 8031 to PATH_TEAR.

Referring next to FIG. 19B, the processing 1810 for a case where the received RSVP message is a PATH message will be described. Also described with reference to FIGS. 22A and 22B is a change the cross connection information accumulating table 110 undergoes when the PATH message captured information 521 and 522 are received.

The first step of this processing is to conduct path establishment request detection and, in the case where a request to establish a new path is detected, the path is registered in the path management table (18102 to 18103). Next, a cross connection state that is related to a downstream interface of the link where the PATH message has been captured is updated (1815 to 1819).

The upstream interface here is, of the two interfaces at the ends of a link to be controlled with the PATH message, the one through which user data traveling toward the downstream (downstream user data) enters this link. The downstream interface here is the other of the two interfaces.

First, the path management table 240 is searched for a record entry whose session identifier 2402 matches the session identifier 8032 of the PATH message, and whose LSP_ID 2403 matches lspId in the SENDER_TEMPLATE 8039 of the PATH message (18102). When no such record entry is found, it is judged that the received message is a request to establish a new path, and a new record entry is added to the path management table 240 (18103 and 18104). In the new record entry, the value of the switching capability SC contained in a label_req object that is stored as the other objects 8035 is entered as the type of path 2401, and a value "establishing" is entered as the path establishment status 2404.

Next, the cross connection information accumulating table 110 is searched for a record entry whose session identifier 1106 matches the session identifier 603 of the received message and whose router's identifier 1102 matches the sender address of the IP header of the received message (1811). Then whether a record entry that meets the conditions is found is judged (1812).

When it is judged as a result that no record entry meets the conditions, a record entry is added to the cross connection information accumulating table 110. In the added entry, the router's identifier field 1102 holds a value written in the sender field of the IP header of the received message and the operational state field 1105 holds "idle" for initialization (1813).

A value entered as the "upstream router communication interface identifier 6092" of the received message is stored in the field of the outgoing interface identifier 11041 of the added entry. The capture date/time of the received PATH message captured information is stored in the field of the state change date/time 1101 of the added entry (1814).

Through the above steps, an update of the cross connection state related to the upstream interface is completed.

Next, the cross connection information accumulating table 110 is searched for a record entry whose session identifier 1106 matches the session identifier 603 of the received message and whose router's identifier 1102 matches the destination address of the IP header of the received message (1815). Then whether a record entry that meets the conditions has been found is judged (1816).

When it is judged as a result that no record entry meets the conditions, a record entry is added to the cross connection information accumulating table 110. In the added entry, the router's identifier field 1102 holds a value written in the sender field of the IP header of the received message and the operational state field 1105 holds "idle" for initialization (1817).

Next, the link state information accumulating table 90 is consulted to obtain an interface to which the interface indicated by the "upstream router communication interface identifier 6092" of the received message (1818) is to be connected.

Alternatively, the connection destination interface may be obtained by consulting connection destination information preset in the link state information accumulating table 90. In this way, OSPF format messages and other messages can equally be processed.

A value held by the interface identifier of the obtained connection destination interface is stored in the outgoing interface identifier field 11041 of the added entry. The capture date/time of the received PATH message captured information is stored in the state change date/time field 1101 of the added entry (1819).

When the PATH message captured information 521 is received, the first row entry of the table in FIG. 22A is created by the processing 1814, the second row entry is created by the processing 1819 and the record entry in the first row of FIG. 24B is created through the processing of Step 18104. When the PATH message captured information 522 is received, an outgoing interface identifier is stored in the second row entry of the table in FIG. 22B by the processing 1814 and the second row entry is created by the processing 1819.

Next, the processing for a case where the received RSVP message is an RESV message will be described with reference to FIG. 19C. Also described with reference to FIG. 22C and FIG. 12 is a change the cross connection information accumulating table 110 undergoes when the RESV message captured information 523 and 524 are received.

The first step of this processing is to update a cross connection state that is related to a downstream interface of a link where the RESV message has been captured (1821 and 1822). Next, a cross connection state that is related to an upstream interface of the link where the RESV message has been captured is updated (1823 and 1824). Next, path establishment completion detection is conducted and, in the case where the completion of path establishment is detected, the establishment status 2404 of the path management table 240 is updated to "established" (1825 to 1827). Then a passing point of the path is calculated and stored in the path management table 240 (1828).

The upstream interface here is, as in the case of the PATH message described above, the interface through which downstream user data enters this link, and the downstream interface here is the other interface of the link.

First, the cross connection information accumulating table 110 is searched for a record entry whose session identifier 1106 matches the session identifier 603 of the received message and whose router's identifier 1102 matches the sender address of the IP header of the received message (1821).

In a record entry that has been found as a result of the search, the value of the label 605 of the received message is stored in the incoming label field 11032. The capture date/time of the received RESV message captured information is stored in the state change date/time field 1101 of the found entry. Once incoming side and outgoing side information of this cross connection is obtained, "busy" is stored in the operational state field 1105 of the found entry (1822). However, in the case where all cells of the data outgoing interface information 1104 of this cross connection are blank, "busy" is stored in the operational state field 1105 when all pieces of incoming interface information are obtained.

Through the above steps, an update of the cross connection state related to the downstream interface is completed.

Next, the cross connection information accumulating table 110 is searched for a record entry whose session identifier 1106 matches the session identifier 603 of the received message and whose router's identifier 1102 matches the destination address of the IP header of the received message (1823).

In a record entry found through the search, the value of the label 605 of the received message is stored in the outgoing label field 11042. The capture date/time of the received RESV message captured information is stored in the state change date/time field 1101 of the found entry. Once incoming side and outgoing side information of this cross connection is obtained, "busy" is stored in the operational state field 1105 of the found entry (1824). However, in the case where all cells of the incoming interface information 1103 of this cross connection are blank, "busy" is stored in the operational state field 1105 when all pieces of outgoing interface information are obtained.

Next, the value of IPv4Addr contained as the RSVP_HOP object 8038 in the RESV message is compared with the value of tunnel_src contained as the SENDER_TEMPLATE 8039, and it is judged as the first hop when the two values are equal to each other whereas it is judged as the second or subsequent hop when the two values are different from each other (1825).

In the case where it is the first hop, the path management table 240 is searched for a record entry whose session identifier 2402 matches the session identifier 8032 of the PATH message, whose LSP_ID 2403 matches lspId in the SENDER_TEMPLATE 8039 of the PATH message (1826), and a value "established" is stored as the path establishment status 2404 of the record entry.

Next, the path is followed from its start point to the end point in the cross connection information accumulating table, to thereby obtain a list of passing points, and the passing point list 2404 of the record entry in the path management table 240 is updated (1828).

When the RESV message captured information 523 is received, the cells for the incoming label 11032 and the operational state 1105 in the third row entry of the table in FIG. 22C are filled by the processing 1822, and a value is stored in the outgoing label 11042 of the second row entry by the processing 1824. In the third row entry, cells for the data outgoing interface information 1104 are blank, and accordingly, "busy" is stored in the operational state field 1105 when all pieces of the data incoming interface information 1103 are obtained. In the second row entry, an incoming label is not stored despite that the field of the incoming interface identifier 11031 is holding an interface identifier 11031. Therefore, "idle" remains stored in the operational state field 1105 of the second row entry.

When the RESV message captured information 524 is received, an incoming interface identifier is stored in the second row entry of the table in FIG. 12 by the processing 1822, and a value is stored in the outgoing label 11042 of the first row entry by the processing 1824. In the second row entry, incoming side information and outgoing side information are both provided, and "busy" is therefore stored in the operational state field 1105. In the first row, cells for the data incoming interface information 1103 are blank and accordingly, "busy" is stored in the operational state field 1105 when all pieces of the data outgoing interface information 1104 are obtained. Further, in the field for the establishment status 2404 of the path management table 240, "established" is stored through the processing of Step 1827.

Further, the connection destination of a communication interface that is indicated by the pair of [the router identifier 1102, the outgoing interface identifier 11041] in the first row of the cross connection information accumulating table 110 is obtained from the interface connection relation management table 210. The cross connection information accumulating table 110 is searched for a record entry that has the obtained connection destination as the pair of [the router identifier 1101, the incoming interface identifier 11031]. The search reveals that the second row entry fulfills the condition. It is deduced from the above that this path runs through (nodeId=192.168.100.1, IF_ID=1002) and (nodeId=192.168.100.2, IF_ID=1001). Further, label values allocated to these communication interfaces are combined to obtain (nodeId=192.168.100.1, IF_ID=1002, label=30012), (nodeId=192.168.100.2, IF_ID=1001, label=30012), which are appended to the field of the passing point list 2405.

Subsequently, the same operation is performed on the pair of {the router identifier 1102, the outgoing interface identifier 11041} in each record entry found through the search. The resultant values of the passing point list field are, as shown in FIG. 24A, (nodeId=192.168.100.1, IF_ID=1002, label=30012), (nodeId=192.168.100.2, IF_ID=1001, label=30012), (nodeId=192.168.100.2, IF_ID=1002, label=30001), (nodeId=192.168.100.3, IF_ID=1002, label=30001).

Lastly, the processing for a case where the received RSVP message is a PATH_TEAR message will be described with reference to FIG. 19D.

The first step of this processing is to perform path opening detecting processing and, when a PATH_TEAR message is detected at the last hop, a relevant row is deleted from the path management table 240 (18301 to 18304). Next, a cross connection state that is related to an upstream interface of a link where the PATH_TEAR message has been captured is deleted (1831 to 1833). Next, a cross connection state that is related to a downstream interface of the link where the PATH_TEAR message has been captured is deleted (1834 to 1836).

First, the destination IP address 8022 of the PATH_TEAR message is compared against dst in the session identifier 8032, and it is judged as the last hop when the two values are equal to each other whereas it is judged as a hop previous to the last hop when the two values are different from each other (18301).

In the case where it is the last hop, the path management table 240 is searched for a record entry whose session identifier 2402 and LSP_ID 2403 respectively match the session identifier 8032 of the PATH_TEAR message and lspId in the SENDER_TEMPLATE 8039 of the PATH_TEAR message, and the found record entry is deleted from the table (18302 and 18303).

The cross connection information accumulating table 110 is searched for a record entry whose session identifier 1106 matches the session identifier 603 of the received message and whose router's identifier 1102 matches the sender address of the IP header of the received message (1831). Then it is judged whether a record entry that meets the conditions has been found (1832).

When it is judged as a result that a record entry that meets the conditions has been found, the found record entry is deleted from the cross connection information accumulating table 110 (1833).

Through the above steps, deletion of the cross connection state related to the upstream interface is completed.

Next, the cross connection information accumulating table 110 is searched for a record entry whose session identifier 1106 matches the session identifier 603 of the received message and whose router's identifier 1102 matches the destination address of the IP header of the received message (1834). Then it is judged whether a record entry that meets the conditions has been found (1835).

When it is judged as a result that a record entry that meets the conditions has been found, the found record entry is deleted from the cross connection information accumulating table 110 (1836).

The first embodiment described above attains the following objects.

Firstly, a list of communication paths and the operational state and route of a communication path are obtained solely from information that is not dependent on the type of switch or router, whereby the configuration of a communication path can be managed in a network whatever type of MPLS router or GMPLS switch constitutes the network, which has been difficult in the prior art.

Furthermore, a list of communication paths included in a link where a failure has occurred is obtained solely from information that is not dependent on the type of switch or router, whereby a communication path failure can be monitored in a network whatever type of MPLS router or GMPLS switch constitutes the network.

Moreover, when a communication path disconnection control signal is captured, whether a similar communication path disconnection control signal is being issued can be grasped for each and every hop that is upstream of where the signal is captured, to thereby detect whether there is a path that is disconnected unexpectedly due to time out or the like.

Second Embodiment

A second embodiment of this invention will be described below.

The second embodiment will be explained as to a case of employing GMPLS extended RSVP-TE or MPLS RSVP-TE (IETF RFC 3209, "RSVP-TE: Extensions to RSVP for LSP Tunnels") as a signaling protocol and GMPLS extended OSPF-TE or MPLS OSPF-TE as a link state routing protocol. However, this embodiment is applicable in a similar manner to other protocols such as IS-IS and GMPLS extended CR-LDP.

Figure 20:
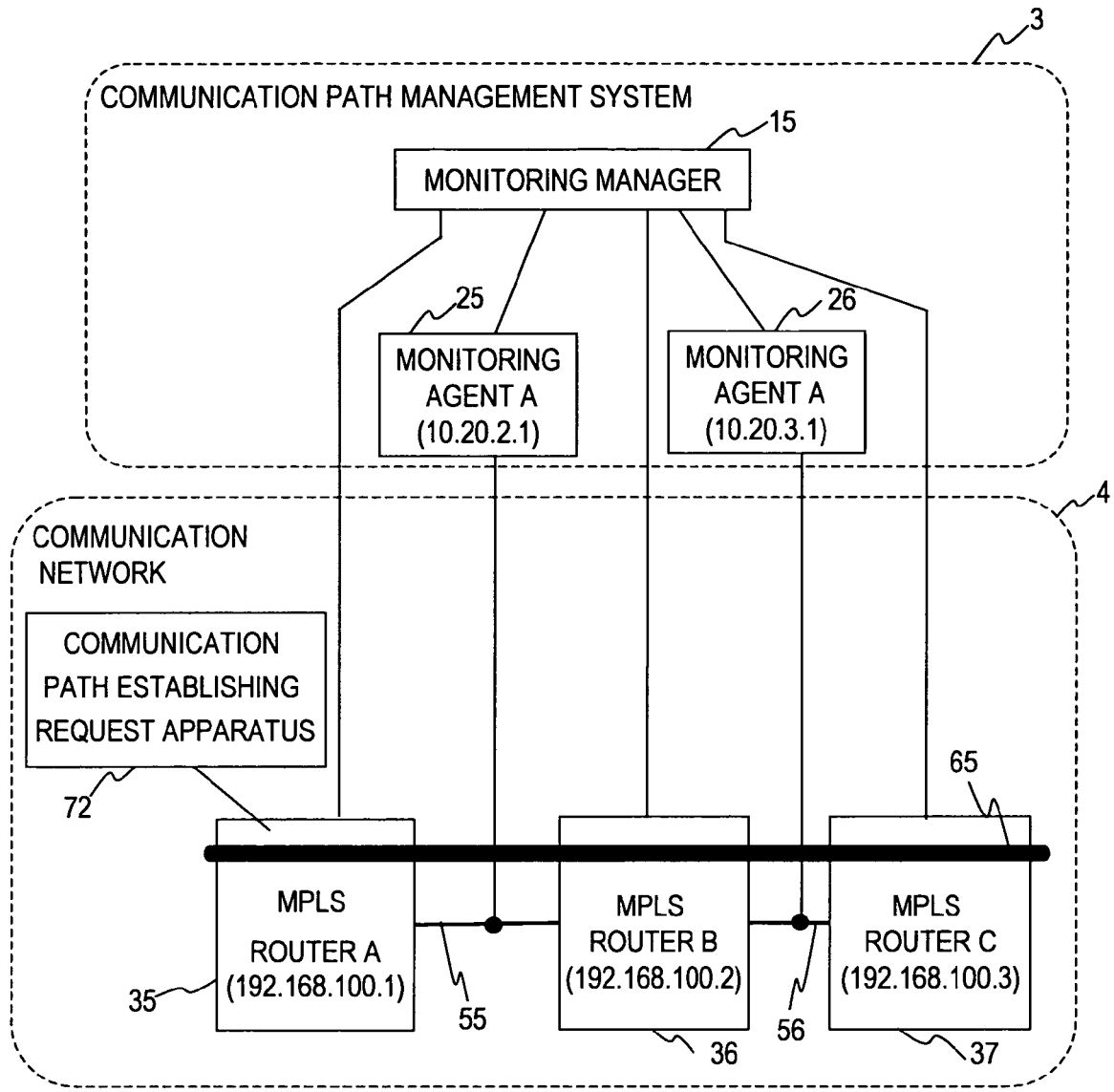
FIG. 20 is a block diagram of a network system according to a second embodiment.

FIG. 20 is a block diagram of a network system according to the second embodiment of this invention.

The network system of the second embodiment is a communication network controlled by MPLS. Alternatively, the network system of this embodiment may be a GMPLS network in which a signaling protocol and a link state routing protocol are exchanged over the same links 55 and 56 as a communication path 65 to be established.

In MPLS, a signaling protocol and a routing protocol are always sent and received over the same links 55 and 56 as the communication path 65, unlike the case of GMPLS. The network system of the second embodiment therefore does not have a device such as the control message forwarding apparatus A 41 and B 42 of the first embodiment.

For this reason, monitoring agents of this embodiment directly copy messages optically, magnetically, electrically, or on a packet basis over links between MPSL routers. Specifically, a monitoring agent A 25 copies a signaling protocol message and a link state routing protocol message on the link 55 between MPLS routers A 35 and B 36. A monitoring agent B 26 copies a signaling protocol message and a link state routing protocol message on the link 56 between MPLS routers B 36 and C 37. The same goes for a GMPLS network in which a signaling protocol and a link state routing protocol are sent and received over the same links 55 and 56 as the communication path 65 to be established in which a signaling protocol message and a link state routing protocol message are copied on the links 55 and 56.

The configuration and operation of the monitoring agents A 25 and B 26 are similar to the monitoring agents A 21 and B 22 described in the first embodiment. The configuration and operation of a monitoring manager 15 are similar to the monitoring manager 11 described in the first embodiment.

Third Embodiment

A third embodiment of this invention will be described below.

The third embodiment will be explained as to a case of employing GMPLS extended RSVP-TE as a signaling protocol and GMPLS extended OSPF-TE as a link state routing protocol. However, this embodiment is applicable in a similar manner to other cases employing protocols such as IS-IS and GMPLS extended CR-LDP.

Figure 21:
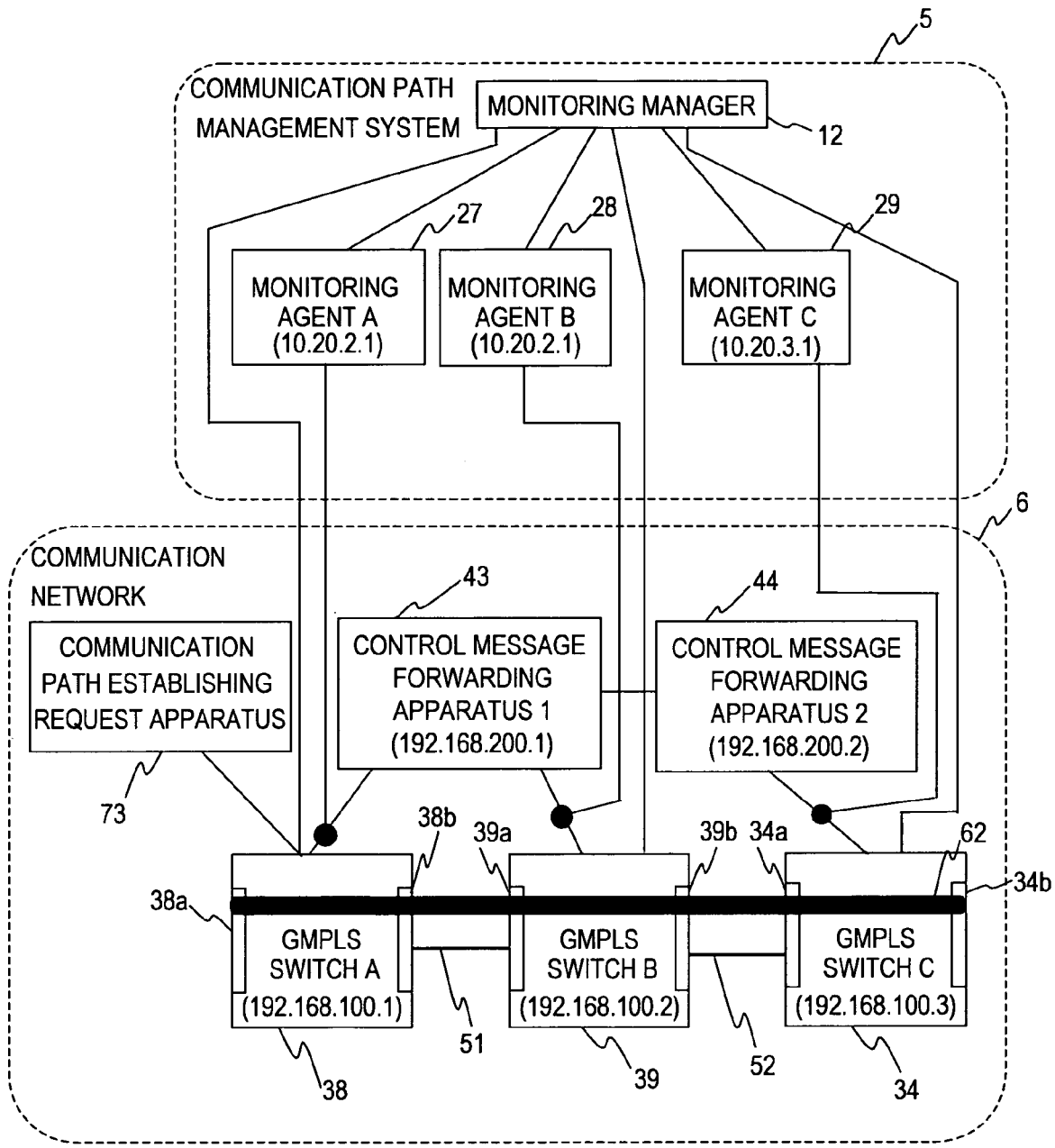
FIG. 21 is a block diagram of a network system according to a third embodiment.

FIG. 21 is a block diagram of a network system according to the third embodiment of this invention.

The network system of the third embodiment is, as in the first embodiment, a GMPLS network in which GMPLS extended RSVP-TE and GMPLS extended OSPF-TE messages are sent and received over links different from the communication path 61 to be established. While the monitoring agents A 21 and B 22 obtain messages from the control message forwarding apparatus A 41 and B 42 in the first embodiment, monitoring agents A 27, B 28 and C 29 of the third embodiment directly copy messages on links between GMPLS switches A 38, B 39 and C 34 and control message forwarding apparatus A 43 and B 44.

Specifically, the monitoring agent A 27 copies, optically, magnetically, electrically, or on a packet basis, a signaling protocol message and a link state routing protocol message on a link between the GMPLS switch A 38 and the control message forwarding apparatus A 43. The monitoring agent B 28 copies a signaling protocol message and a link state routing protocol message on a link between the GMPLS switch B 39 and the control message forwarding apparatus A 43. The monitoring agent C 29 copies a signaling protocol message and a link state routing protocol message on a link between the GMPLS switch A 38 and the control message forwarding apparatus B 44.

The configuration and operation of the monitoring agents A 27, B 28, and C 29 are similar to the monitoring agents A 21 and B 22 described in the first embodiment. The configuration and operation of a monitoring manager 12 are similar to the monitoring manager 11 described in the first embodiment.

Fourth Embodiment

A fourth embodiment of this invention will be described next.

In the fourth embodiment, description will be made of a case in which GMPLS extended RSVP-TE is employed as a signaling protocol and GMPLS extended OSPF-TE as a link state routing protocol. However, the fourth embodiment is also applicable to cases where other protocols such as IS-IS and GMPLS CR-LDP are employed.

Figure 27:
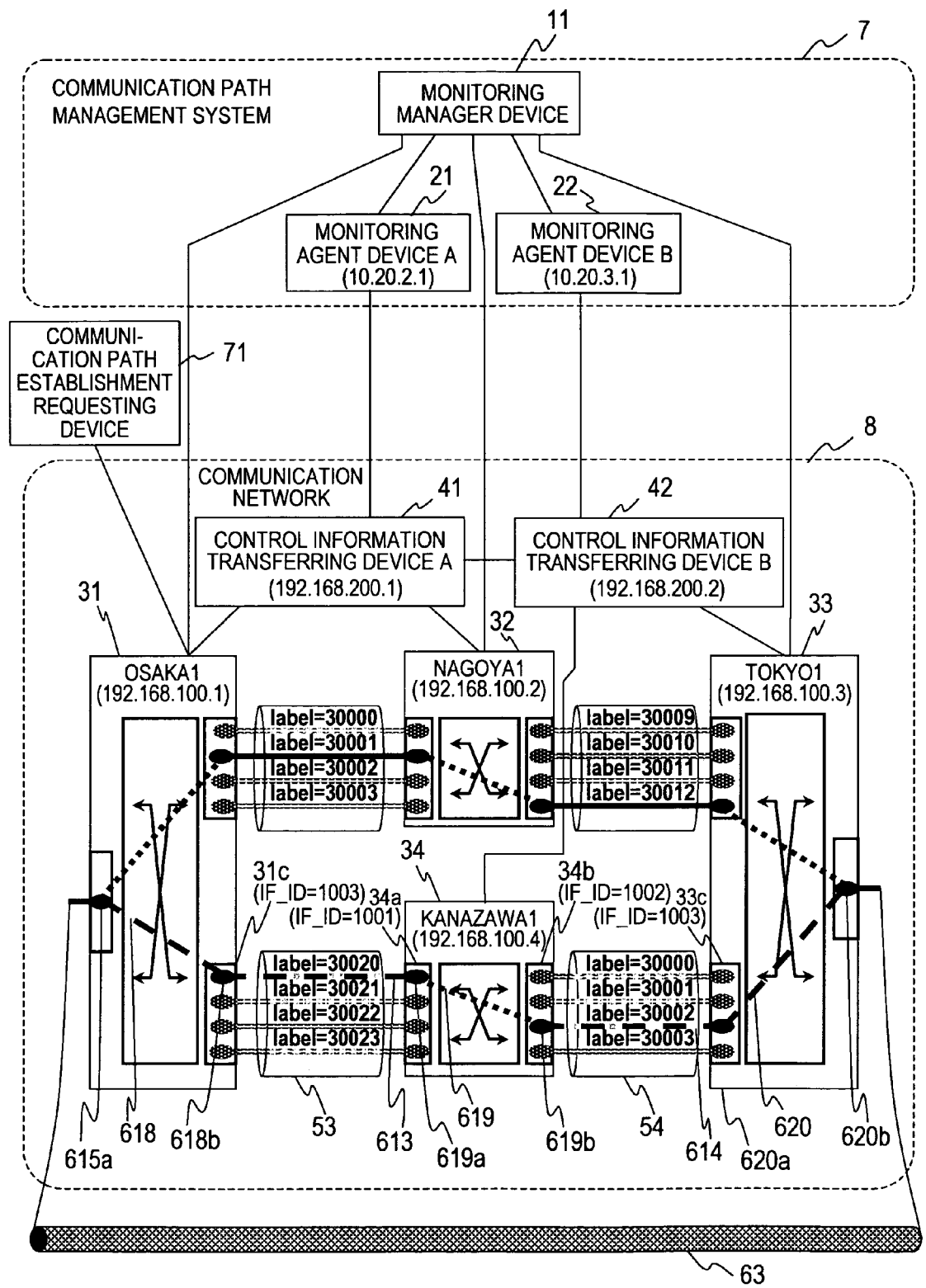
FIG. 27 is a block diagram of a network system according to a forth embodiment.

FIG. 27 is a block diagram of a network system according to the fourth embodiment of this invention.

The network system of the fourth embodiment is, as in the first and third embodiments, a GMPLS network in which GMPLS extended RSVP-TE messages and GMPLS extended OSPF-TE messages are sent and received over a link that is not the communication path 61 to be established. While one RSVP session controls only one path in the communication network 2 of the first embodiment and the communication network 6 of the third embodiment, plural paths are controlled through one RSVP session in the fourth embodiment.

In the example of FIG. 27, a communication network 8 has an automatic failure recovery function that is regulated by GMPLS path recovery (IETF, Internet-Draft, draft-ietf-ccamp-gmpls-recovery-functional-04, Jonathan P. Lang et al., "Generalized Multi-Protocol Label Switching (GMPLS) Recovery Functional Specification").

A communication path 63 has, for redundancy, a primary path, which passes through GMPLS switches OSAKA1 31, NAGOYA1 32 and TOKYO1 33, and a recovery path, which passes through GMPLS switches OSAKA1 31, KANAZAWA1 34 and TOKYO1 33.

According to the GMPLS path recovery specification mentioned above, the primary path and the recovery path are identified by their lspId values in the SENDER_TEMPLATE 8039 as shown in FIG. 28. Which one of the two paths is currently used is discriminated by the protection object 8035. These pieces of information are stored in the path management table 240 as the LSP_ID 2403 and the PROTECTION state 2406 as shown in FIG. 29 and, similarly, stored in the cross connection information accumulating table 110 as the SENDER_TEMPLATE 1107 and the PROTECTION state 1108 as shown in FIG. 30.

Figure 31:
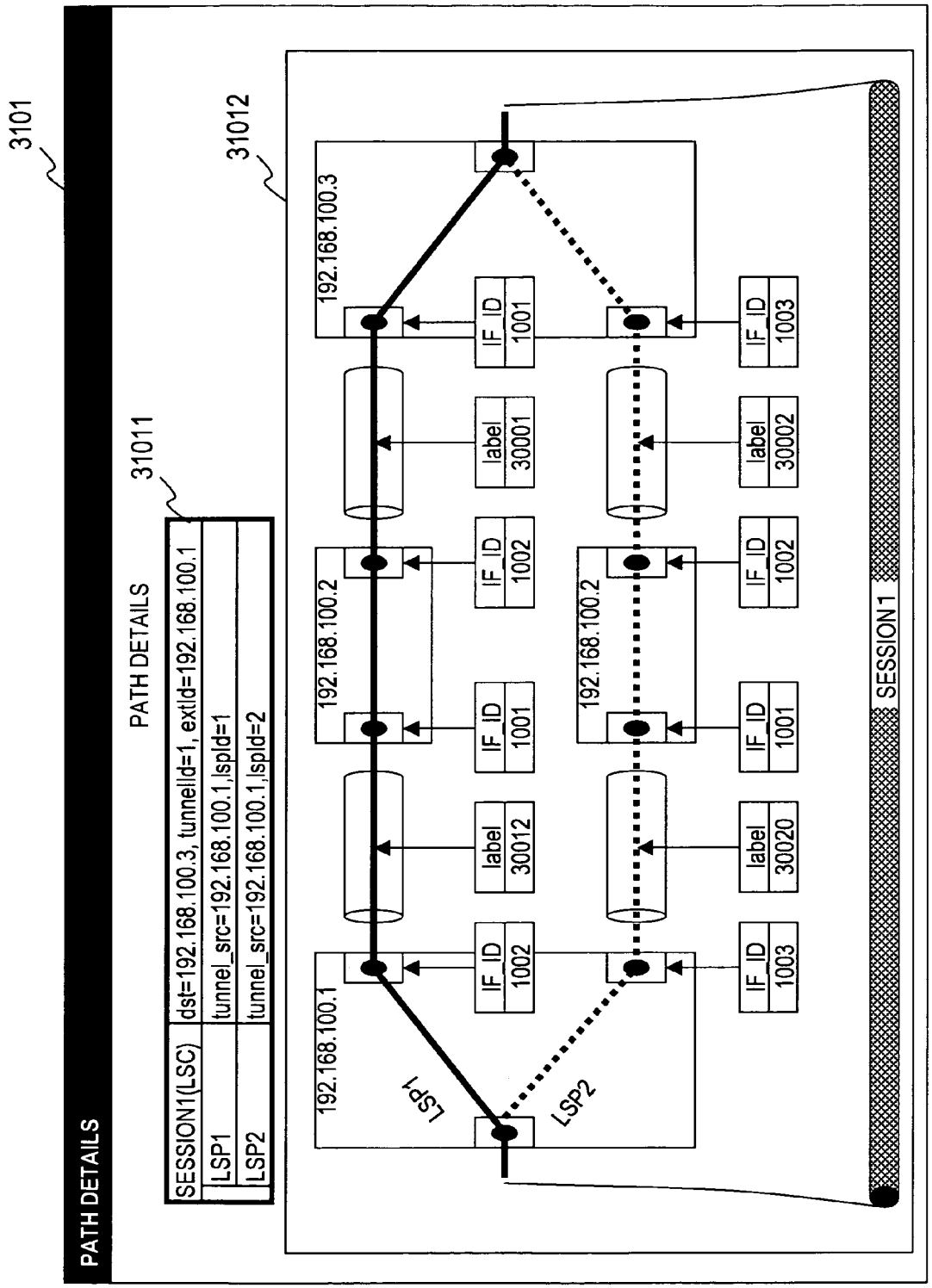
FIG. 31 is a diagram showing an example of a screen of a monitoring manager according to the forth embodiment.

From the above information, a path details screen 3101 is obtained as shown in FIG. 31. Plural paths that have the same value as the session identifier 2402 and different values as the LSP_ID 2403 in the path management table 240 are grouped together and displayed in a path outline area 31011. Passing points of each of the two communication paths are shown in a path details area 31012.

Fifth Embodiment

A fifth embodiment of this invention will be described next.

In the fifth embodiment, description will be made of a case in which GMPLS extended RSVP-TE is employed as a signaling protocol and GMPLS extended OSPF-TE as a link state routing protocol. However, the fifth embodiment is also applicable to cases where other protocols such as IS-IS and GMPLS CR-LDP are employed.

Figure 32:
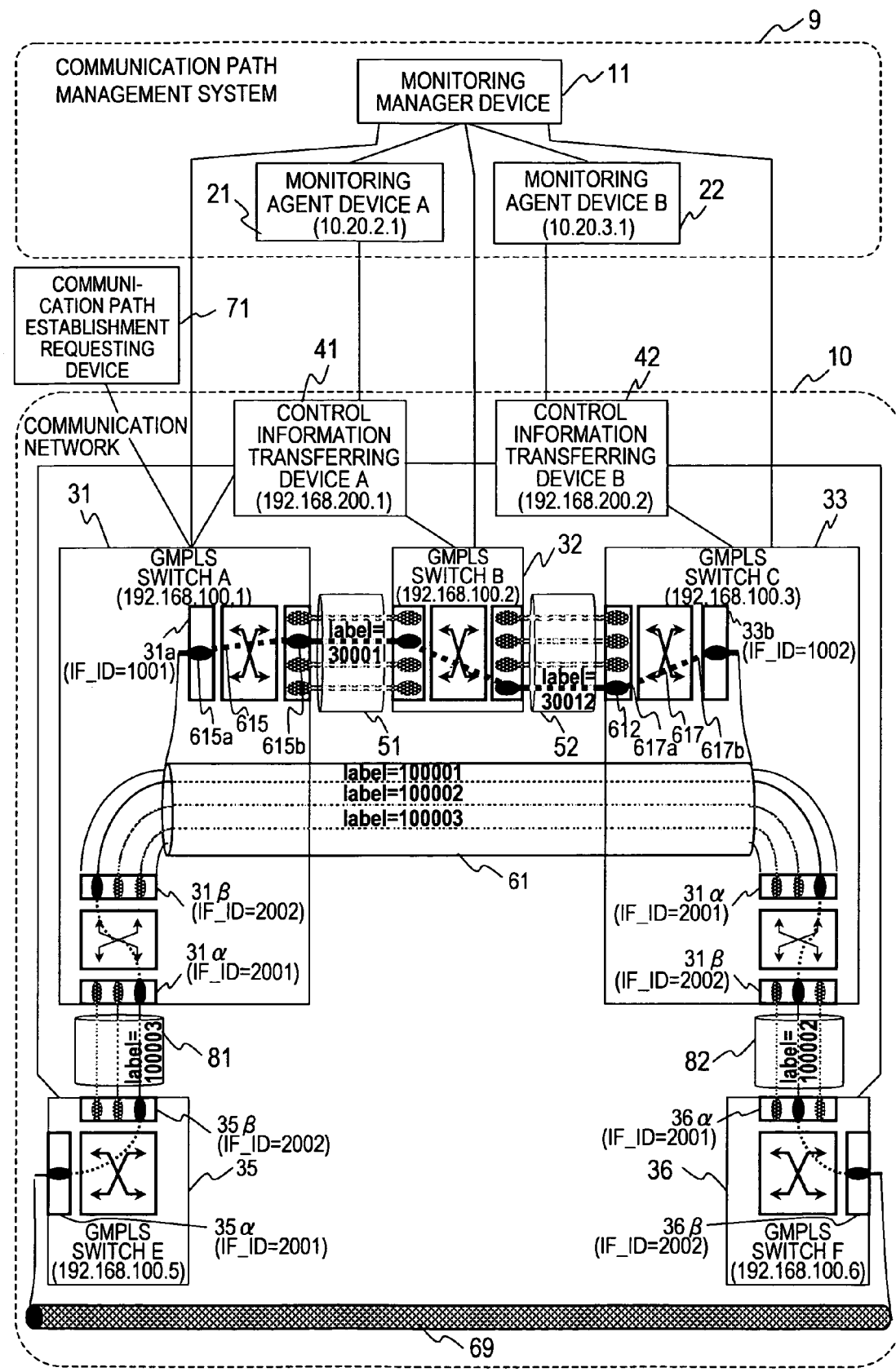
FIG. 32 is a block diagram of a network system according to a fifth embodiment.

FIG. 32 is a block diagram of a network system according to the fifth embodiment of this invention.

The network system of the fifth embodiment is, as in the first, third and fourth embodiments, a GMPLS network in which GMPLS extended RSVP-TE messages and GMPLS extended OSPF-TE messages are sent and received over a link that is not the communication path 61 to be established. There has been no clear description given in the first, third and fourth embodiments about how the communication networks 2, 4 and 6 handle a multi-layer communication path which is in a client-server relation with one communication path.

A communication network 10 in the network system of the fifth embodiment uses the communication path 61 to establish a communication path 69. In other words, the relation between the communication path 69 and the communication path 61 corresponds to a multilayer network in which the communication path 69 behaves as a client and the communication path 61 does as a server.

The end points of the communication path 61 are a communication interface 31β of the GMPLS switch A31 and a communication interface 31α of the GMPLS switch C33.

In this embodiment, the switching capabilities of the communication path 61 and the communication path 69 are LSC (Lambda Switching Capable) and PSC (Packet Switching Capable), respectively, and established through individual RSVP sessions.

The GMPLS standard regulates LSP_TUNNEL IF_ID as an object for notifying a client layer of a server layer's path end information in the multilayer network (IETF, RFC 3477, K. Kompella et al., "Signalling Unnumbered Links in Resource ReSerVation Protocol-Traffic Engineering (RSVP-TE)").

In a path establishment control information accumulating table of FIG. 33, a path controlled in the first to fourth rows is the communication path 61 and a path controlled in the fifth to tenth rows is the communication path 69.

In PATH messages of the first and second rows, "lsp_tunnel_ifid=2002" of the other RSVP objects 8036 indicates that the starting point of the communication path 61 is the communication interface 31β, which is represented by IF_ID=2002 in the start point router. Similarly, in RESV messages of the third and fourth rows, "lsp_tunnel_ifid=2001" of the other RSVP objects 8036 indicates that the ending point of the communication path 61 is a communication interface that is represented by IF_ID=2002 in the ending point router.

These interfaces are called tunnel interfaces. The start point and the end point router of the communication path 61 are indicated by tunnel_src of the SENDER TEMPLATE 8039 and dst of the session identifier 8032. These follow the GMPLS standard.

It is deduced from the above that the starting point and the ending point of the communication path 61 are, in the client layer, pairs of a router identifier and an interface identifier, [192.168.100.1, 2002] and [192.168.100.3, 1001]. This information is added to an interface connection relation management table as will be described later with reference to FIG. 37B.

FIGS. 37A and 37B are configuration diagrams of an interface connection relation management table 210 according to this embodiment. The interface connection relation management table 210 of this embodiment has the same fields as in the first to fourth embodiments. The difference is that, when a communication path is established by a message containing an LSP_TUNNEL IF_ID object, a new record entry holding values thereof is added to the interface connection relation management table 210.

In the case where a communication path that has been established by a message containing an LSP_TUNNEL IF_ID object is opened, a record entry added when the communication path has been established is deleted from the interface connection relation management table 210.

The interface connection relation management table 210 of this embodiment has an additional field for a server layer connection 2103 in order to distinguish a type of the link between a static link and a link generated by communication path establishment in the server layer. When the link has been generated by a communication path establishment in the server layer, a server layer communication path type and a session identifier are stored in the field of the server layer connection 2103.

FIG. 37A shows the initial state before the communication path 61 is established, and FIG. 37B shows a state after the communication path 61 is established.

The ninth and tenth rows of FIG. 37B are record entries added to the initial state table to show the connection relation between the tunnel interfaces that have been figured out to be the ends of the communication path 61. Information derived from the session identifier 8032 and the other objects 8035, namely, information indicating that the switching capability of the communication path 61 is "LSC" and that the session identifier is "dst=192.168.100.3, tunnelId=1, extId=192.168.100.1", is stored in the field of the server layer connection 2103 in the interface connection relation management table 210.

A change in link state caused in the client layer by communication path establishment in the server layer is reflected through the above operation.

On the other hand, a tunnel interface in the server layer is referred to by an RSVP_HOP object, an EXPLICIT_ROUTE object, a RECORD_ROUTE object in a sequence of establishing the communication path 69, which is the client layer.

Values [IPv4Addr=192.168.100.1, IF_ID=2002] and [IPv4Addr=192.168.100.3, IF_ID=2001] in the fields of the RSVP_HOP 8038 in the sixth and ninth rows of FIG. 33 represent a tunnel interface 31α of the GMPLS switch 31 and a tunnel interface 31β of the GMPLS switch 31, respectively, and indicate that the communication path 69 runs through these tunnel interfaces.

FIG. 34 is a configuration diagram of the path management table 240 according to the fifth embodiment.

The path management table 240 of the fifth embodiment has the same fields as in the first to fourth embodiments. The difference is that, in the fifth embodiment which deals with a multilayer network, the passing point list 2405 shows the relation between a client layer communication path and a server layer LSP.

In the second row of FIG. 34, (LSC_LSP, dst=192.168.100.3, tunnelId=1, extId=192.168.100.1) represents a server layer communication path that is used between passing points (nodeId=192.168.100.1, IF_ID=2002, label=100001) and (nodeId=192.168.100.3, IF_ID=2001, label=100001).

Figure 36:
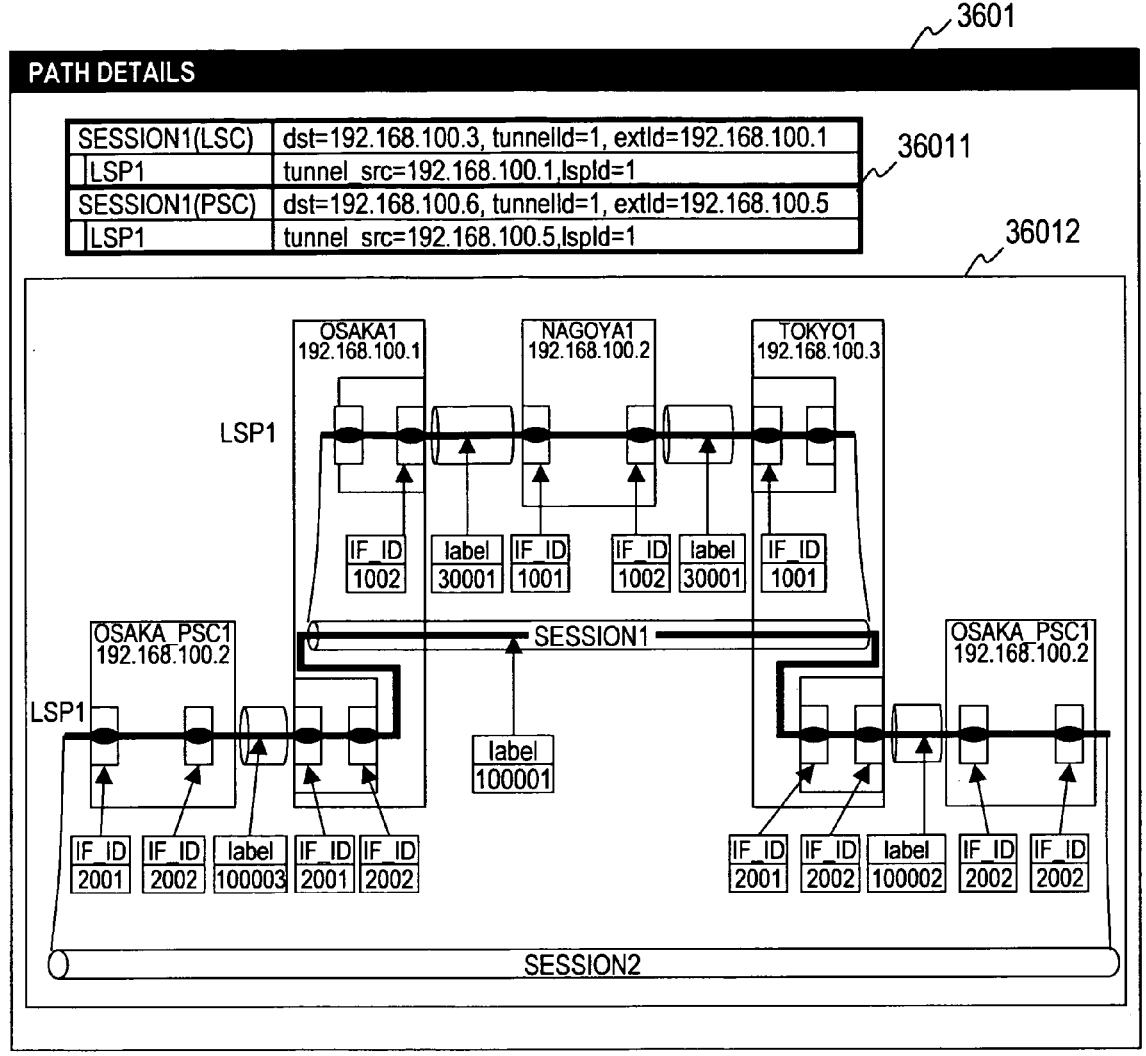
FIG. 36 is a diagram showing an example of a screen of a monitoring manager according to the fifth embodiment.

From the above information, a path details screen 3601 is obtained as shown in FIG. 36.

A path outline area 36011 lists two communication paths controlled through two individual sessions. Passing points of each of the two communication paths are shown in a path details area 36012. Also shown is the client-server relation between the two communication paths.

This invention is applicable to a network system in which a route is controlled by a routing protocol. This invention is particularly suitable for a GMPLS or MPLS network, in which a link state and a topology are collected by a link state protocol such as OSPF or IS-IS to be used to determine the route of a communication path to be established, and LSP is established using a GMPLS or MPLS signaling protocol, or MPLS RSVP-TE or GMPLS CR-LDP in accordance with the determined route of the communication path.

While the present invention has been described in detail and pictorially in the accompanying drawings, the present invention is not limited to such detail but covers various obvious modifications and equivalent arrangements, which fall within the purview of the appended claims.

What is claimed is:

1. A communication path management system for managing a communication network system in which one of communication paths to be formed is established by transferring communication path establishment control information between data switching apparatuses, comprising:

an information collecting module which collects the communication path establishment control information requesting that a communication path between data switching apparatuses be established;

an information accumulating module which accumulates the communication path establishment control information collected by the information collecting module; and an information searching module which searches the communication path establishment control information accumulated by the information accumulating module, wherein which communication path is established is derived from the communication path establishment control information searched by the information searching module; and wherein, to derive the established communication paths, timeout judging processing in the data switching apparatuses is imitated.

2. The communication path management system according to claim 1,
wherein communication path establishment control information accumulated in the information accumulating module include identification information for associating plural communication paths to one another, and
wherein, to derive the established communication paths, the established communication paths are associated with one another based on the associating identification information.

3. The communication path management system according to claim 1, wherein the identification information for associating plural communication paths is information that associates layers to one another.

4. The communication path management system according to claim 1, wherein the identification information for associating plural communication paths is switching control information for GMPLS path failure recovery.

5. The communication path management system according to claim 1,
wherein the communication path establishment control information accumulated in the information accumulating module include a link identifier, and
wherein information of communication paths that pass through a designated link is derived from an identifier of the designated link and the link identifiers accumulated in the information accumulating module.

6. The communication path management system according to claim 1, wherein the communication path establishment control information collected by the information collecting module conform to the MPLS RSVP-TE protocol and/or the GMPLS RSVP-TE protocol.

7. The communication path management system according to claim 1,
wherein, in the communication network, the communication path establishment control information are transferred via a control message forwarding apparatus, which is independent of the communication path to be managed, and
wherein the information collecting module obtains the communication path establishment control information from the control message forwarding apparatus.

8. The communication path management system according to claim 1, further comprising a state deriving module, wherein the information accumulating module accumulates a state of a link between the data switching apparatuses,
wherein the state deriving module derives a state of a switch in the data switching apparatuses from the link state accumulated in the information accumulating module and from the communication path establishment control information accumulated in the information accumulating module, and
wherein a communication path route between a start point and an end point is obtained based on the switch state which is derived by the state deriving module.

9. The communication path management system according to claim 8, further comprising a checking module,
wherein the checking module checks, when the collected communication path control information include a communication path disconnection request signal, whether the communication path disconnection request signal is collected also in the upstream of the requested communication path, and
wherein the validity of the communication path disconnection request signal is judged from the result of the checking by the checking module.

10. The communication path management system according to claim 1,
the communication path management system further comprises a state analogizing module,
wherein, in the communication network, a state of a link between the data switching apparatuses is transferred based on a link state routing protocol,
wherein the information collecting module collects signals of the link state routing protocol,
wherein the information accumulating module accumulates the link state routing protocol signals collected by the information collecting module,
wherein the state analogizing module obtains a state of a switch in the data switching apparatuses by analogy with the link state routing protocol signals accumulated by the information accumulating module and the communication path establishment control information accumulated in the information accumulating module, and
wherein a communication path route between a start point and an end point is obtained from the switch state which is obtained by analogy by the state analogizing module.

11. The communication path management system according to claim 10,
wherein the information collecting module collects routing protocol signals transferred between the data switching apparatuses,
wherein the information accumulating module accumulates, as link state information, link state advertisements of the routing protocol signals collected by the information collecting module,
wherein a topology and link state of the communication network is obtained from the link state information accumulated in the information accumulating module, and
wherein a state of a switch in the data switching apparatuses is obtained by analogy with the link state information accumulated in the information accumulating module and the communication path establishment control information accumulated in the information accumulating module, and the obtained switch state is accumulated as cross connection information.

12. The communication path management system according to claim 10, further comprising a failure detecting module,
wherein the communication path establishment control information accumulated in the information accumulating module include link identifiers,
wherein the failure detecting module detects a link failure by monitoring the collected link state routing protocol signals, and
wherein which communication path will be affected by the link failure is derived from an identifier of a link where the failure is detected and the link identifiers accumulated in the information accumulating module.

13. The communication path management system according to claim 10, further comprising a checking module,
wherein the checking module checks, when the collected communication path control signals include a communication path disconnection request signal, whether the communication path disconnection request signal is collected also in the upstream of the requested communication path, and
wherein the validity of the communication path disconnection request signal is judged from the result of the checking by the checking module.

14. The communication path management system according to claim 10, wherein the link state routing protocol signals collected by the information collecting module conform to MPLS OSPF and GMPLS OSPF.

15. The communication path management system according to claim 10,
wherein, in the communication network, at least one of the communication path establishment control information and the link state routing protocol signals are transferred via a control message forwarding apparatus, which is independent of communication path to be managed, and
wherein the information collecting module obtains at least one of the communication path establishment control information and the link state routing protocol signals from the control message forwarding apparatus.

16. A communication network system comprising:
a plurality of data switching apparatuses to transfer data;
a control message forwarding apparatus which relays communication path establishment control information transferred between the data switching apparatuses, the communication path establishment control information transferred between the data switching apparatuses being used to establish a communication path; and
a monitoring apparatus which collects the communication path establishment control information,
wherein the control message forwarding apparatus has an information capturing module, which captures the communication path establishment control information transferred between the data switching apparatuses and sends copies of the captured communication path establishment control information to the monitoring apparatus, and
wherein the monitoring apparatus includes an information accumulating module, which accumulates the collected communication path establishment control information, and an information searching module, which searches the communication path establishment control information accumulated in the information accumulating module, and
wherein the monitoring apparatus derives which communication path is established from the communication path establishment control information searched by the information searching module.

17. The communication network system according to claim 16, wherein the monitoring apparatus comprises a monitoring agent and a monitoring manager,
wherein the monitoring agent collects the communication path establishment control information, and
wherein the monitoring manager accumulates the communication path establishment control information collected by the monitoring agent.

18. The communication network system according to claim 17,
wherein at least one of the control message forwarding apparatus and the monitoring agent comprises selecting module for screening the communication path establishment control information and selecting only necessary information, and
wherein the monitoring agent sends communication path establishment control information selected by the selecting module to the monitoring manager.

* * * * *